(12) United States Patent
Cruise

(10) Patent No.: US 11,699,083 B2
(45) Date of Patent: Jul. 11, 2023

(54) SWARM SYSTEM INCLUDING AN OPERATOR CONTROL SECTION ENABLING OPERATOR INPUT OF MISSION OBJECTIVES AND RESPONSES TO ADVICE REQUESTS FROM A HETEROGENEOUS MULTI-AGENT POPULATION INCLUDING INFORMATION FUSION, CONTROL DIFFUSION, AND OPERATOR INFUSION AGENTS THAT CONTROLS PLATFORMS, EFFECTORS, AND SENSORS

(71) Applicant: UNITED STATES OF AMERICA AS REPRESENTED BY THE SECRETARY OF THE NAVY, Arlington, VA (US)

(72) Inventor: Robert Bruce Cruise, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 523 days.

(21) Appl. No.: 16/436,910

(22) Filed: Jun. 10, 2019

(65) Prior Publication Data

US 2020/0134491 A1 Apr. 30, 2020

Related U.S. Application Data

(60) Provisional application No. 62/682,511, filed on Jun. 8, 2018.

(51) Int. Cl.
*G06N 5/043* (2023.01)
*G06N 20/00* (2019.01)
*H04L 67/10* (2022.01)

(52) U.S. Cl.
CPC .............. *G06N 5/043* (2013.01); *G06N 20/00* (2019.01); *H04L 67/10* (2013.01)

(58) Field of Classification Search
None
See application file for complete search history.

(56) References Cited

PUBLICATIONS

Hocraffer, Amy, and Chang S. Nam. "A meta-analysis of human-system interfaces in unmanned aerial vehicle (UAV) swarm management." Applied ergonomics 58 (2017): 66-80. (Year: 2017).*

(Continued)

*Primary Examiner* — Vincent Gonzales
(74) *Attorney, Agent, or Firm* — Naval Surface Warfare Center, Crane Division

(57) ABSTRACT

Systems and methods are provided relating to a complex adaptive command guided swarm system including an operator section comprising a first command and control section and a plurality of networked swarm of semi-autonomously agent controlled system of systems platforms (SAASoSPs). The first command and control section includes a user interface, computer system, network interface, and plurality of command and control systems executed or running on the computer system. The networked SAASoSPs each include a second command and control section, wherein the second command and control section utilizes artificial intelligence (AI) configured with a combination of both symbolic and probabilistic machine learning for various functions including pattern recognition and new pattern identification. The AI is also configured to combine advice-based learning with active learning, wherein the AI solicits advice from a domain expert user via the first command and control section as necessary during both training and operational stages of the system.

18 Claims, 54 Drawing Sheets

(56) References Cited

PUBLICATIONS

S. Russell and P. Norvig, Artificial Intelligence: A Modern Approach, 2nd Ed., 2003, chapt. 22-25, pp. 790-946. (Year: 2003).*

Wei, Yi, M. Brian Blake, and Gregory R. Madey. "An operation-time simulation framework for UAV swarm configuration and mission planning." Procedia Computer Science 18 (2013): 1949-1958. (Year: 2013).*

Roberge, Vincent, Mohammed Tarbouchi, and Gilles Labonte. "Comparison of parallel genetic algorithm and particle swarm optimization for real-time UAV path planning." IEEE Transactions on industrial informatics 9.1 (2012): 132-141. (Year: 2012).*

Boskovic, Jovan, et al. "Collaborative mission planning & autonomous control technology (compact) system employing swarms of uavs." AIAA Guidance, Navigation, and Control Conference. 2009.) (Year: 2009).*

Dreslinski RG, Zheng Q, Higgins RP, Hauswald J, Blaauw D, Mudge T, Chakrabarti C, Ballast J, Snapp W. An architecture for low-power high-performance embedded computing. In GOMACTech Conference (GOMAC), Thirty ninth Annual Apr. 2014 (pp. 423-426). (Year: 2014).*

Müller W, Kuwertz A, Mühlenberg D, Sander J. Semantic information fusion to enhance situational awareness in surveillance scenarios. In 2017 IEEE International Conference on Multisensor Fusion and Integration for Intelligent Systems (MFI) Nov. 16, 2017 (pp. 397-402). IEEE. (Year: 2017).*

Roberts LG, Wessler BD. Computer network development to achieve resource sharing. In Proceedings of the May 5-7, 1970, spring joint computer conference May 5, 1970 (pp. 543-549 (Year: 1970).*

Ma L, Fu T, Li M. Active learning for object-based image classification using predefined training objects. International Journal of Remote Sensing. May 3, 2018;39(9):2746-65. (Year: 2018).*

Zha YB, Yue SG, Yin QJ, Liu XC. Activity recognition using logical hidden semi-Markov models. In 2013 10th International Computer Conference on Wavelet Active Media Technology and Information Processing (ICCWAMTIP) Dec. 17, 2013 (pp. 77-84). IEEE. (Year: 2013).*

Odom P, Natarajan S. Actively interacting with experts: A probabilistic logic approach. In Joint European conference on machine learning and knowledge discovery in databases Sep. 19, 2016 (pp. 527-542). Springer, Cham. (Year: 2016).*

Odom P, Natarajan S. Probabilistic Logic Learning via Active Advice Seeking. In First Workshop on Human is More Than a Labeler (BeyondLabeler) 2016. (Year: 2016).*

Stuart Russell and Peter Norvig, Artificial Intelligence: A Modern Approach, 2nd ed., 2010, pp. 375-461, chapters 11 and 12, Upper Saddle River, NJ.

Pedro Domingos and Daniel Lowd, Markov logic networks, in Machine Learning, Feb. 1, 2006, pp. 107-136, vol. 62 issue 1-2, Springer, US.

Tushar Khot, Sriraam Natarajan, Krisitian Kersting and Jude Shavlik, Gradient-based boosting for statistical relational learning: the Markov logic network and missing data cases, in Machine Learning, Jul. 1, 2015, pp. 75-100, vol. 100, issue 1, Springer, US.

Philip Odom, Tushar Khot and Sriraam Natarajan, Learning probabilistic models with human advice, The Association for the Advancement of Artificial Intelligence (AAAI), Mar. 23, 2015.

Philip Odom and Ariraam Natarahan, Active advice seeking for inverse reinforcement learning, International Conference on Autonomous Agents and Multiagent Systems (AAMAS), May 9, 2016.

Stuart Russell and Peter Norvig, Artificial Intelligence: A Modern Approach, 3rd ed 2010, pp. 375-461, chapters 10 and 11, Upper Saddle River, NJ.

Mayukh Das, Philip Odom, Sriraam Nararajan, et al., Preference-guided planning: an active elicitation approach, International Conference on Autonomous Agents and Multiagent Systems (AAMAS), Jul. 11, 2018.

Jason Marden and Jeff Shamma, Game theoretic learning in distributed control, in Basar and Zaccour (eds.), Handbook of Dynamic Game Theory, Nov. 2017, Springer International Publishing, AG.

Robert Cruise, Erik Blasch, Sriraam Natarajan, and Ali Raz, Cyber-physical command-guided swarm, in DSIAC Journal, Jun. 12, 2018, pp. 23-20, vol. 5, No. 2, Defense Systems Information Analysis Center (DSIAC).

* cited by examiner

| COORDINATE MULTIPLE DISCIPLINES | CHARACTERIZE TIME |
|---|---|
| MERGE EXPERTISE IN SOFTWARE, COMPUTER, RADAR, ELECTRO-OPTICS, RF COMMUNICATIONS, PLATFORM WEAPON (BOTH KINETIC AND ELECTRONIC), HUMAN INTERFACE, AND CONTROL ENGINEERING<br><br>EMPHASIZE COMPONENT DEPENDENCIES VIA MODEL BASED SYSTEMS ENGINEERING (MBSE)<br><br>AGGRESSIVE CGS SoS MODELING ESSENTIAL FOR DESIGN PLUS TEST AND EVALUATION (T&E) | RECONCILE DISCRETE TIME OF CYBER COMPONENTS WITH CONTINUOUS TIME OF PHYSICAL COMPONENTS<br><br>RECONCILE INSTANTANEOUS CONTROL ASSUMPTIONS WITH INDETERMINATE SOFTWARE LATENCIES<br><br>RECONCILE TIME SCALES OF TARGET ASSESSMENT AND WEAPON CONTROL, WITH SITUATION ASSESSMENT AND SWARM FORCE POSITIONING, WITH THREAT ASSESSMENT AND MISSION PLANNING |
| GUARANTEE CLOCK SYNCHRONIZATION | ESTABLISH REAL-TIME SCHEDULING |
| PRECISELY SYNCHRONIZE CONTROL OF SENSORS, WEAPONS, AND PLATFORMS<br><br>DETERMINE CLOCK DRIFT DESIGN TOLERANCE ACROSS ENTIRE CYBER-PHYSICAL CGS SoS<br><br>MAINTAIN SYNCHRONIZATION THROUGHOUT MULTI-TOUR SWARM MISSIONS | SPECIFY SOFTWARE TIMING CONSTRAINTS<br><br>VERIFY SOFTWARE SYNCHRONIZATION WITH THE PHYSICAL COMPONENTS<br><br>FORMULATE SCHEDULING AND COORDINATION BETWEEN SENSING, INFORMATION FUSION PROCESSING, ENGAGEMENT RESOURCE PLANNING, PLATFORM CONTROL, AND WEAPON FIRES |
| DETERMINE COMPONENT INTERACTIONS | DESIGN FOR WIRELESS COMMUNICATIONS |
| SPECIFY INTERACTIONS AMONG ALL CYBER AND PHYSICAL COMPONENTS<br><br>RESEARCH ASYNCHRONOUS SHARED MEMORY INTERACTION DESIGN APPROACH<br><br>INCORPORATE ARTIFICIAL INTELLIGENCE AGENTS WHICH LEARN TO MINE DATA STORES FOR APPROPRIATE INPUT, AND GENERATE SUITABLE OUTPUT FOR DEPOSIT IN OTHER DATA STORES | DESIGN COMMUNICATIONS PROTOCOL TO MANAGE CHANNEL ACCESS, SHARED MEMORY ACCESS, COMMUNICATION TRIGGERS, DATA/PACKET STRUCTURES, ROUTING PLUS NETWORK NODE HOPPING, AND SECURITY<br><br>MAINTAIN COMMUNICATIONS RELIABILITY DESPITE RF OR OPTICAL LINK DEGRADATION |
| MAXIMIZE SWARM INTEGRITY | ENSURE CYBER SECURITY |
| CYBER-PHYSICAL CGS SoS PERFORMANCE MAINTAINED DESPITE DEGRADATION, CORRUPTION, OR FAILURE OF SOME OF ITS CYBER AND PHYSICAL NODES/COMPONENTS<br><br>QUANTIFY COMPONENT CRITICALLY AND OVERALL TOLERANCE FOR DEGRADATION | CYBER ATTACKS THREATEN BOTH CYBER COMPONENTS AND PHYSICAL COMPONENTS (E.G., STUXNET)<br><br>TRADITIONAL CYBER SECURITY APPROACHES CANNOT ANALYZE ATTACKS ON PHYSICAL REALM<br><br>CYBER SECURITY DESIGN AUGMENTED WITH SYSTEMS THEORY TO DESIGN EFFECTIVE ATTACK COUNTERMEASURES |

*FIG. 1*

| AGENT TYPE | AGENT FUNCTIONAL OVERVIEW | AGENT INTERACTION OVERVIEW |
|---|---|---|
| INFORMATION *FUSION* AGENTS 27 (E.G. SEE FIGS. 4, 5, 6, 7, ETC) | *FUSION OR PATTERN RECOGNITION* WITHIN MULTIPLE INFORMATION VECTORS; E.G., RECOGNIZE FEATURES, OBJECTS, SITUATIONS, AND IMPACTS OR THREATS | MULTIPLE INFORMATION FUSION AGENTS DIVIDE UP PATTERN RECOGNITION WORKLOAD E.G., FEATURE, OBJECT, SITUATION, IMPACTS OR THREATS, BY PLAYING A GAME TO DECIDE WHICH INFORMATION FUSION (E.G., FEATURE ASSESSMENT) AGENT WILL UPDATE A GIVEN INFORMATION VECTOR, E.G., FEATURE VECTOR, STORED IN A DATABASE THAT IS EITHER LOCAL TO A UXS PLATFORM OR A DISTRIBUTED DATABASE (E.G., ACROSS A GROUP OR SWARM) |
| CONTROL DIFFUSION AGENTS 29 | DIFFUSION OR PATTERN GENERATION OF MULTIPLE ACTION VECTORS (OR SIMPLY ACTIONS); E.G., GENERATE DEVICE CONTROL SIGNALS, UXS ACTIONS, INTEGRATED ENGAGEMENT ACTIONS, AND MISSION ACTIONS | MULTIPLE CONTROL DIFFUSION AGENTS DIVIDE UP PATTERN GENERATION OR PLANNING WORKLOAD BY PLAYING A GAME TO DECIDE WHICH CONTROL DIFFUSION AGENT WILL DECOMPOSE AN ACTION VECTORS OR ACTIONS |
| OPERATOR INFUSION AGENT 31 | INFUSION OR PARTNERING OF THE HUMAN OPERATOR AND THE INFORMATION FUSION & CONTROL DIFFUSION AGENT POPULATION; E.G., INFUSION OF THE HUMAN OPERATOR'S PREFERENCES (E.G., VIA ACTIVE MACHINE LEARNING AND ADVICE-SEEKING TECHNIQUES) FOR SITUATION ASSESSMENT WITH THE SITUATION ASSESSMENT AGENTS' KNOWLEDGE, FOR IMPACT OR THREAT ASSESSMENT WITH THE THREAT ASSESSMENT AGENTS' KNOWLEDGE, FOR INTEGRATED ENGAGEMENT PLANNING WITH THE INTEGRATED ENGAGEMENT CONTROL AGENTS' KNOWLEDGE, AND FOR MISSION PLANNING WITH THE MISSION CONTROL AGENTS' KNOWLEDGE | MULTIPLE OPERATOR INFUSION AGENTS SHARE AMONG THEMSELVES ACCESS TO THE HUMAN OPERATOR SUCH THAT THE HUMAN IS NOT COGNITIVELY OVERLOADED; E.G., ALL OPERATOR INFUSION AGENTS, EACH ABOARD A DIFFERENT FORCE/TACTICAL GROUP 34, MUST DIVIDE UP OR ALLOCATE AMONG THEMSELVES THE CHANNELS OF THE USER INTERFACE BY PLAYING A GAME TO DECIDE WHICH OPERATOR INFUSION AGENT WILL ACCESS A GIVEN USER INTERFACE CHANNEL FOR PURPOSES OF DIRECT COMMUNICATION WITH THE HUMAN OPERATOR |

*FIG. 3B*

| PARALLEL PROCESSING AGENTS ((E.G., SIMD) PROCESSING AGENTS COMPRISING MULTIPLE PROCESSING ELEMENTS) | NON-PARALLEL PROCESSING AGENTS |
|---|---|
| OPERATOR INFUSION SIMD AGENT 85 (OPERATOR INFUSION AGENT 27 CLASS) | SENSOR CONTROL AGENT 51 (A SUB-CLASS OF THE CONTROL DIFFUSION CLASS 29) |
| MISSION CONTROL (MC) SIMD AGENTS 91 (A SUB-CLASS OF THE CONTROL DIFFUSION CLASS 29) | WEAPON CONTROL AGENT 53 (A SUB-CLASS OF THE CONTROL DIFFUSION CLASS 29) |
| INTEGRATED ENGAGEMENT CONTROL (IEC) SIMD AGENTS 73 (A SUB-CLASS OF THE CONTROL DIFFUSION CLASS 29) | PLATFORM CONTROL AGENT 55 (A SUB-CLASS OF THE CONTROL DIFFUSION CLASS 29) |
| SITUATION ASSESSMENT AGENT SIMD AGENT 71 (A SUB-CLASS OF THE INFORMATION FUSION CLASS 27) | SENSOR CONTROL SIGNALING AGENT (CONTROL DIFFUSION AGENT SUBCLASS 29) |
| THREAT OR IMPACT ASSESSMENT AGENT SIMD AGENT 81 (A SUB-CLASS OF THE INFORMATION FUSION CLASS 27) | WEAPON (OR EFFECTOR) CONTROL SIGNALING AGENT 43 (A SUB-CLASS OF THE CONTROL DIFFUSION CLASS 29) |
| | PLATFORM CONTROL SIGNALING AGENT 44 (A SUB-CLASS OF THE CONTROL DIFFUSION CLASS 29) |
| | OBJECT ASSESSMENT AGENT 41 (A SUB-CLASS OF THE INFORMATION FUSION CLASS 27) |
| | FEATURE ASSESSMENT AGENT 61 (A SUB-CLASS OF THE INFORMATION FUSION CLASS 27) |

*FIG. 3C*

| CD AGENTS (E.G., USING SRL) | CD AGENT ACTION INPUT | CD AGENT ACTION OUTPUT |
|---|---|---|
| MISSION CONTROL AGENT | HIGH-LEVEL MISSION OBJECTIVE (HLMO) | MISSION ACTIONS FORMING A PLAN |
| INTEGRATED ENGAGEMENT CONTROL AGENT | ACTION TAKEN FROM A MISSION PLAN | INTEGRATED ENGAGEMENT ACTIONS FORMING A PLAN |
| SENSOR CONTROL AGENT | SENSING ACTION TAKEN FROM AN INTEGRATED ENGAGEMENT PLAN | SENSOR CONTROL ACTIONS FORMING A PLAN |
| WEAPON CONTROL AGENT | FIRES ACTION TAKEN FROM AN INTEGRATED ENGAGEMENT PLAN | WEAPON CONTROL ACTIONS FORMING A PLAN |
| PLATFORM CONTROL AGENT | PLATFORM ACTION TAKEN FROM AN INTEGRATED ENGAGEMENT PLAN | PLATFORM CONTROL ACTIONS FORMING A PLAN |
| SENSOR CONTROL SIGNALING AGENT | ACTION TAKEN FROM A SENSOR CONTROL PLAN | SENSOR CONTROL SIGNALS (ATOMIC ACTIONS) |
| WEAPON CONTROL SIGNALING AGENT | ACTION TAKEN FROM A WEAPON CONTROL PLAN | WEAPON CONTROL SIGNALS (ATOMIC ACTIONS) |
| PLATFORM CONTROL SIGNALING AGENT | ACTIONS TAKEN FROM A PLATFORM CONTROL PLAN | PLATFORM CONTROL SIGNALS (ATOMIC ACTIONS) |

*FIG. 5C1*

| IF SRL MODEL NAME | IF SRL MODEL FEATURE VECTOR INPUT | IF SRL MODEL FEATURE VECTOR OUTPUT |
|---|---|---|
| BATTLESPACE FEATURE ASSESSMENT AGENT | SENSOR PIXEL VECTORS FORMING A PATTERN | BATTLESPACE FEATURE VECTOR |
| OBJECT STATE ASSESSMENT AGENT | BATTLESPACE FEATURE VECTORS FORMING A PATTERN | OBJECT STATE VECTOR |
| SITUATION ASSESSMENT AGENT | OBJECT STATE VECTORS FORMING A PATTERN | SITUATION VECTOR |
| THREAT ASSESSMENT AGENT | SITUATION VECTORS FORMING A PATTERN | THREAT VECTOR |

*FIG. 5C2*

| IF SRL MODEL | CD SRL MODEL |
|---|---|
| INPUT/OUTPUT - E.G., FEATURE VECTORS | INPUT/OUTPUT - ACTIONS |
| PATTERN RECOGNITION METHOD - INPUTS A SET OF LOWER-LEVEL FEATURE VECTORS, AND OUTPUTS A HIGHER-LEVEL FEATURE VECTOR TERMED A PATTERN | ACTION DECOMPOSITION METHOD - INPUTS A HIGHER-LEVEL ACTION, AND OUTPUTS A SET OF LOWER-LEVEL ACTIONS TERMED A PLAN |
| STRUCTURE - FIRST-ORDER LOGICAL FORMULAE CONSTITUTING PATTERN RECOGNITION METHODS | STRUCTURE - FIRST-ORDER LOGICAL FORMULAE CONSTITUTING ACTION DECOMPOSITION METHODS |
| WEIGHTS - RELATIVE IMPORTANCE OF LOGICAL FORMULAE AND PATTERN RECOGNITION METHODS | WEIGHTS - RELATIVE IMPORTANCE OF LOGICAL FORMULAE AND ACTION DECOMPOSITION METHODS |
| MACHINE LEARNING METHODOLOGY - LEARNING MODEL STRUCTURE AND WEIGHTS USING RFGB | MACHINE LEARNING METHODOLOGY - LEARNING MODEL STRUCTURE AND WEIGHTS USING RFGB |
| ACTIVE ADVICE-SEEKING *IF-THEN* RULES - QUERY TRIGGERED BY HIGH-ENTROPY WEIGHT DISTRIBUTION; QUERY SEEKS HUMAN OPERATOR'S PATTERN RECOGNITION METHOD PREFERENCES | ACTIVE ADVICE-SEEKING *IF-THEN* RULES - QUERY TRIGGERED BY HIGH-ENTROPY WEIGHT DISTRIBUTION; QUERY SEEKS HUMAN OPERATOR'S ACTION DECOMPOSITION METHOD PREFERENCES |

*FIG. 5C3*

| AGENT NAME | DESCRIPTION |
|---|---|
| FEATURE ASSESSMENT AGENT (FA)(LNFORMATION FUSION AGENT) 41 | GENERALLY, A COLLECTION OF EXEMPLARY FA AGENTS 41 EXECUTE REPEATED PLAYS OF A GAME THAT INCLUDES PLACING BIDS FOR DETERMINING WHICH FA AGENT 41 WILL UPDATE FEATURE VECTORS BASED ON A MATHEMATICAL FA UTILITY FUNCTION AND FEATURE VECTOR DATABASE INFORMATION UNTIL THE FA AGENT 41 GAME REACHES NASH EQUILIBRIUM (WHICH EACH AGENT'S UTILITY FUNCTION IS OPTIMIZED WHERE FURTHER CHANGES RESULT IN ONE OR MORE FA AGENT UTILITY VALUES GOING DOWN. FA AGENTS 41 THEN EXECUTES TASKS BASED ON GAME SELECTED FEATURE VECTORS THE FA AGENT 41 WILL UPDATE. THE FA AGENT 41 RECEIVES INPUTS (E.G., PIXEL OUTPUT) AND GENERATES OUTPUTS (E.G., FA AGENT 41 GAME SELECTED FEATURE VECTORS). IN PARTICULAR, A PHYSICAL SENSOR OUTPUTS PIXEL VECTORS INTO A FA AGENT 41. |
| SENSOR CONTROL SIGNALING AGENT (SCSA) 42 (E.G., 42A, 42B, ETC) (CONTROL DIFFUSION AGENT) | GENERALLY, A COLLECTION OF EXEMPLARY SCSAS, E.G., 42A, 42B, 42C, ETC EXECUTE REPEATED PLAYS OF A GAME THAT INCLUDES PLACING BIDS FOR DETERMINING WHICH SCSA 42A,B,C, ETC WILL SELECT/DECOMPOSE ONE OF A NUMBER OF SENSOR CONTROL ACTIONS (WHERE A COMPLETED SENSOR CONTROL PLAN IS A COLLECTION OF SELECTED SENSOR CONTROL ACTIONS) STORED IN THE LOCAL UXS SENSOR CONTROL PLANS DATABASE 45B BASED ON A SCSA MATHEMATICAL UTILITY FUNCTION AND SENSOR CONTROL PLAN DATABASE 45B INFORMATION UNTIL THE COLLECTIVE SCSA GAME REACHES NASH EQUILIBRIUM. SCSA AGENTS 42 THEN EXECUTES TASKS BASED ON GAME SELECTED SENSOR CONTROL ACTIONS THE SCSA 42 WILL UPDATE. |
| WEAPON (OR EFFECTOR) CONTROL SIGNALING AGENT (WCSA) 43 (CONTROL DIFFUSION AGENT) | GENERALLY, WCSAS 43 (43A, 43B, 43C, ETC) CAN CONTROL VARIOUS ITEMS SUCH AS EQUIPMENT (E.G., 13A, 13B, ETC)(E.G., TOOLS OF VARIOUS TYPES) OR WEAPONS, ETC. GENERALLY, A COLLECTION OF EXEMPLARY WCSAS, E.G., 43A, 43B, 43C, ETC EXECUTE REPEATED PLAYS OF A GAME THAT INCLUDES PLACING BIDS FOR DETERMINING WHICH WCSAS 43A,B,C, ETC WILL SELECT/DECOMPOSE ONE OF A NUMBER OF EFFECTOR (E.G., WEAPON) CONTROL ACTIONS (WHERE A COMPLETED EFFECTOR OR WEAPON CONTROL PLAN IS A COLLECTION OF SELECTED EFFECTOR OR WEAPON CONTROL ACTIONS) STORED IN THE LOCAL UXS EFFECTOR OR WEAPON CONTROL PLANS DATABASE 45C BASED ON A WCSA MATHEMATICAL UTILITY FUNCTION AND EFFECTOR OR WEAPON CONTROL PLAN DATABASE 45C INFORMATION UNTIL THE COLLECTIVE ECSA GAME REACHES NASH EQUILIBRIUM. WCSAS 43A, B, C, ETC THEN EXECUTES TASKS (E.G., INPUT, OUTPUT) BASED ON GAME SELECTED EFFECTOR OR WEAPON CONTROL ACTIONS THE WCSA 43A, B, C, ETC WILL UPDATE. |
| PLATFORM CONTROL SIGNALING AGENT 44A (CONTROL DIFFUSION AGENT) | A PHYSICAL PLATFORM WITH GUIDANCE, MOVEMENT/FLIGHT CONTROL, AND PROPULSION (SEE FIG. 4) THAT IS A PART OF A UXS 3 WHICH CARRIES EFFECTORS/WEAPONS AND SENSORS IS CONTROLLED BY SERVO/ACTUATOR CONTROL SIGNALING ACTIONS. EACH SERVO/ACTUATOR CONTROL SIGNALING ACTION INCLUDES AN ARRAY OF APPLICABILITY CONDITIONS, PRECONDITIONS, AND EFFECTS DESCRIBING ELEMENTARY DATUM OF CONTROL INFORMATION. A PATTERN OF MULTIPLE PLATFORM SERVO/ACTUATOR CONTROL SIGNALING ACTIONS IS A PLATFORM CONTROL ACTION. PLATFORM CONTROL SIGNALING AGENTS TAKE PLATFORM CONTROL ACTIONS AS INPUT, UNDERTAKE ACTION DECOMPOSITION OR DIFFUSION (E.G., SIMILAR TO A HARDWARE DRIVER PROGRAM), AND OUTPUT PATTERNS (AKA COMMANDS OR COMMAND SIGNALS) FOR PLATFORM SERVO/ACTUATOR CONTROL SIGNALING ACTIONS. BECAUSE EACH UXS COMPRISES ONE AND ONLY ONE PLATFORM, EACH UXS HOSTS ONLY ONE PLATFORM CONTROL SIGNALING AGENT. THIS SINGLE PLATFORM CONTROL SIGNALING AGENT DECOMPOSES EACH PLATFORM CONTROL ACTION STORED IN THE LOCAL UXS PLATFORM CONTROL PLANS DATABASE. |

*FIG. 8A*

| AGENT NAME | DESCRIPTION |
|---|---|
| OBJECT ASSESSMENT AGENT 61 (INFORMATION FUSION AGENT) | EXEMPLARY OBJECT ASSESSMENT AGENTS 61 CAN INCLUDE A LEARNING MACHINE CAPABILITY THAT IS TRAINED OR PROGRAMMED TO RECOGNIZE OBJECTS. IN AT LEAST ONE EMBODIMENT, A PATTERN OF MULTIPLE FEATURE VECTORS (SEE FEATURE VECTOR ASSESSMENT DISCUSSION) IS AN OBJECT, WHICH IN TURN IS DESCRIBED BY AN OBJECT STATE VECTOR. EACH EXEMPLARY OBJECT ASSESSMENT AGENT 61 TAKE MULTIPLE FEATURE VECTORS AS INPUT (E.G., FROM FEATURE VECTOR DATA STORE 45A), UNDERTAKE PATTERN RECOGNITION OR FUSION (E.G., USING A STATISTICAL RELATIONAL LEARNING SYSTEM, E.G. A MARKOV LOGIC NETWORK SYSTEM RECEIVES INPUT FEATURE VECTORS; NOTE, EMBODIMENTS OF AN OBJECT ASSESSMENT AGENT 61 CAN OPTIONALLY DRAW FROM A KNOWLEDGE BASE OR AN OBJECT INTELLIGENCE LIBRARY 64), AND OUTPUT OBJECT STATE VECTORS WHICH ARE STORED IN OBJECT STATE VECTOR DATA STORE 65. A COHORT OF OBJECT ASSESSMENT AGENTS 61 ACROSS A SINGLE FORCE TACTICAL GROUP OF UXSS PARTICIPATE IN REPEATED PLAY OF A GAME (SEE, E.G., FIG. 12) TO DETERMINE WHICH OBJECT ASSESSMENT AGENT UPDATES WHICH OBJECT STATE VECTOR STORED IN THE GROUP-DISTRIBUTED OBJECT STATE VECTOR DATABASE. GENERALLY, AN EXEMPLARY OBJECT ASSESSMENT AGENT 61 INCLUDES A GAME SECTION (E.G., SEE FIG. 12) THAT CAN BE PLAYED BY A SINGLE LEVEL 1 OBJECT ASSESSMENT AGENT WITH OBJECT ASSESSMENT AGENTS ABOARD OTHER UXSS WITHIN A LOCAL FORCE OR TACTICAL GROUP TO POPULATE A DISTRIBUTED OBJECT STATE VECTORS DATABASE 65 WHERE THE OBJECT ASSESSMENT AGENT 61 USES OBJECT RECOGNITION SYSTEMS TO MATCH STORED PATTERNS WITH FEATURE VECTORS 45A. |
| A SENSOR CONTROL AGENT 51 (CONTROL DIFFUSION AGENT) | A SENSOR CONTROL AGENT 51 INCLUDES A SENSOR CONTROL FUSION FUNCTION PLUS A DISTRIBUTED GAME FUNCTION WHERE MULTIPLE SENSOR CONTROL AGENTS ENGAGE IN A GAME ACTIVITY TO DETERMINE WHICH SENSOR CONTROL AGENT 51 IS BEST ABLE TO DECOMPOSE A GIVEN INTEGRATED ENGAGEMENT SENSING ACTION AMONG A COHORT OF SENSOR CONTROL AGENTS. IN AT LEAST SOME EMBODIMENTS, SOME OR A COMPLETE SENSOR SUITE ONBOARD A SINGLE UXS IS CONTROLLED BY SENSOR CONTROL ACTIONS. A SENSOR CONTROL ACTION MAY IDENTIFY A SPATIAL LOCATION REQUIRING SENSING (ANGULAR COORDINATES AND RANGE), A SENSING SPECTRAL REQUIREMENT, OR ACTIVATION TIMING FOR A SENSOR ABOARD A SINGLE UXS. A SENSOR CONTROL ACTION GENERALLY WILL NOT SPECIFY WHICH SPECIFIC SENSOR ABOARD THE UXS SHOULD EXECUTE THE SENSOR CONTROL ACTION. A PATTERN OF MULTIPLE SENSOR CONTROL ACTIONS IS AN INTEGRATED ENGAGEMENT SENSING ACTION. SENSOR CONTROL AGENTS TAKE INTEGRATED ENGAGEMENT SENSING ACTIONS 151 FROM AN INTEGRATED ENGAGEMENT PLAN DATABASE 69 AS INPUT (AS WELL AS OBJECT STATE VECTOR DATA 153 FROM OBJECT STATE VECTOR DATABASE 65 AND INDIVIDUAL CAPABILITY PLAN LIBRARY 66 DECOMPOSITION METHODS 143C), UNDERTAKE ACTION DECOMPOSITION OR DIFFUSION, AND OUTPUT PATTERNS (AKA PLANS) OF SENSOR CONTROL ACTIONS 159. THE COHORT OF SENSOR CONTROL AGENTS ACROSS OR WITHIN A SINGLE FORCE/TACTICAL GROUP, EACH SENSOR CONTROL AGENT HOSTED BY ONE UXS, PARTICIPATE IN REPEATED PLAY OF A GAME TO DETERMINE WHICH SENSOR CONTROL AGENT DECOMPOSES WHICH INTEGRATED ENGAGEMENT SENSING ACTION WHICH ARE THEN STORED IN THE GROUP-DISTRIBUTED INTEGRATED ENGAGEMENT PLANS DATABASE 45B. |

*FIG. 8B*

| AGENT NAME | DESCRIPTION |
|---|---|
| A WEAPONS (OR EFFECTOR) CONTROL AGENT 53 (CONTROL DIFFUSION AGENT) | A COMPLETE WEAPON (OR EFFECTOR) SUITE ONBOARD A SINGLE UXS IS CONTROLLED BY WEAPON CONTROL ACTIONS. A WEAPON CONTROL ACTION MAY IDENTIFY A SPATIAL LOCATION REQUIRING ENGAGEMENT (ANGULAR COORDINATES AND RANGE), A WEAPON PROJECTILE/PAYLOAD REQUIREMENT, OR ACTIVATION TIMING FOR A WEAPON ABOARD A SINGLE UXS. A WEAPON CONTROL ACTION GENERALLY WILL NOT SPECIFY WHICH SPECIFIC WEAPON ABOARD THE UXS SHOULD EXECUTE THE WEAPON CONTROL ACTION. A PATTERN OF MULTIPLE WEAPON CONTROL ACTIONS IS AN INTEGRATED ENGAGEMENT FIRES ACTION.<br><br>WEAPON CONTROL AGENTS TAKE INTEGRATED ENGAGEMENT FIRES ACTIONS AS INPUT, UNDERTAKE ACTION DECOMPOSITION OR DIFFUSION, AND OUTPUT PATTERNS (AKA PLANS) OF WEAPON CONTROL ACTIONS. THE COHORT OF WEAPON CONTROL AGENTS ABOARD A SINGLE FORCE/TACTICAL GROUP, EACH WEAPON CONTROL AGENT HOSTED BY ONE UXS, PARTICIPATE IN REPEATED PLAY OF A GAME TO DETERMINE WHICH WEAPON CONTROL AGENT DECOMPOSES WHICH INTEGRATED ENGAGEMENT FIRES ACTION STORED IN THE GROUP-DISTRIBUTED INTEGRATED ENGAGEMENT PLANS DATABASE. |
| A PLATFORM CONTROL AGENT 53 (CONTROL DIFFUSION AGENT) | AN EXEMPLARY PLATFORM OF A SINGLE UXS 3 CAN BE CONTROLLED BY PLATFORM CONTROL ACTIONS. A PLATFORM CONTROL ACTION MAY IDENTIFY A SPATIAL LOCATION REQUIRING OCCUPATION, A POSTURE/ORIENTATION REQUIREMENT, OR MANEUVER TIMING FOR THE UXS PLATFORM. A PATTERN OF MULTIPLE PLATFORM CONTROL ACTIONS IS AN INTEGRATED ENGAGEMENT PLATFORM ACTION. PLATFORM CONTROL AGENTS TAKE INTEGRATED ENGAGEMENT PLATFORM ACTIONS AS INPUT, UNDERTAKE ACTION DECOMPOSITION OR DIFFUSION, AND OUTPUT PATTERNS (AKA PLANS) OF PLATFORM CONTROL ACTIONS. THE COHORT OF PLATFORM CONTROL AGENTS ABOARD A SINGLE FORCE/TACTICAL GROUP, EACH PLATFORM CONTROL AGENT HOSTED BY ONE UXS, PARTICIPATE IN REPEATED PLAY OF A GAME TO DETERMINE WHICH PLATFORM CONTROL AGENT DECOMPOSES WHICH INTEGRATED ENGAGEMENT PLATFORM ACTION STORED IN THE GROUP-DISTRIBUTED INTEGRATED ENGAGEMENT PLANS DATABASE. |

*FIG. 8C*

| AGENT NAME | DESCRIPTION |
|---|---|
| SIMD INTEGRATED ENGAGEMENT CONTROL (IEC) AGENT 73 (CONTROL DIFFUSION AGENT) | A SINGLE FORCE/TACTICAL GROUP OF UXSS IS CONTROLLED BY INTEGRATED ENGAGEMENT SENSING ACTIONS, INTEGRATED ENGAGEMENT FIRES ACTIONS, AND INTEGRATED ENGAGEMENT PLATFORM ACTIONS. AN INTEGRATED ENGAGEMENT ACTION MAY DESCRIBE THE DEPLOYMENT OR ACTIVITY OF THE SENSING SUITES, OR THE FIRES SUITES, OR THE PLATFORMS WITHIN A SINGLE FORCE/TACTICAL GROUP. AN INTEGRATED ENGAGEMENT ACTION CAN BE ONE OF THREE ACTION TYPES: SENSING ACTION WHICH ADDRESSES THE SENSOR SUITE ABOARD A SINGLE UXS WITHIN THE GROUP; FIRES ACTION WHICH ADDRESSES THE WEAPON SUITE ABOARD A SINGLE UXS WITHIN THE GROUP; PLATFORM ACTION WHICH ADDRESSES A SINGLE UXS PLATFORM WITHIN THE GROUP. SEVERAL SIMULTANEOUS INTEGRATED ENGAGEMENT ACTIONS WILL COORDINATE (INTEGRATE) SENSING, FIRES, AND PLATFORM CONTROL AMONG MULTIPLE SENSOR SUITES, WEAPON SUITES, AND PLATFORMS WITHIN THE FORCE/TACTICAL GROUP. AN INTEGRATED ENGAGEMENT ACTION GENERALLY WILL NOT SPECIFY WHICH PARTICULAR SENSOR SUITE, WEAPON SUITE, OR PLATFORM WITHIN THE FORCE/TACTICAL GROUP SHOULD EXECUTE THE INTEGRATED ENGAGEMENT ACTION. INTEGRATED ENGAGEMENT CONTROL AGENTS TAKE MISSION ACTIONS AS INPUT, UNDERTAKE ACTION DECOMPOSITION OR DIFFUSION, AND OUTPUT PATTERNS (AKA PLANS) OF INTEGRATED ENGAGEMENT SENSING, FIRES, AND PLATFORM CONTROL ACTIONS. THE COHORT OF INTEGRATED ENGAGEMENT CONTROL AGENTS ABOARD THE ENTIRE COMMAND-GUIDED SWARM, EACH INTEGRATED ENGAGEMENT CONTROL AGENT HOSTED BY ONE FORCE TACTICAL GROUP OF UXSS, PARTICIPATE IN REPEATED PLAY OF A GAME TO DETERMINE WHICH INTEGRATED ENGAGEMENT CONTROL AGENT DECOMPOSES WHICH MISSION ACTION STORED IN THE SWARM-DISTRIBUTED MISSION PLANS DATABASE. |
| MISSION CONTROL AGENT 91 (CONTROL DIFFUSION AGENT) | A COMPLETE COMMAND-GUIDED SWARM IS CONTROLLED BY MISSION ACTIONS. A MISSION ACTION MAY DESCRIBE THE DEPLOYMENT, MANEUVER, POSITIONING, POSTURING, SENSING, AND/OR ENGAGEMENT ACTIVITIES OF A FORCE/TACTICAL GROUP. A MISSION ACTION GENERALLY WILL NOT SPECIFY WHICH PARTICULAR FORCE/TACTICAL GROUP SHOULD EXECUTE THE ACTION.<br><br>MISSION CONTROL AGENTS TAKE HIGH-LEVEL MISSION OBJECTIVES (EACH OBJECTIVE IS AN ACTION, NOT OF THE SWARM, BUT ON THE ENVIRONMENT) AS INPUT, UNDERTAKE ACTION DECOMPOSITION OR DIFFUSION, AND OUTPUT PATTERNS (AKA PLANS) OF MISSION ACTIONS. THE COHORT OF MISSION CONTROL AGENTS ABOARD THE ENTIRE COMMAND-GUIDED SWARM, EACH AGENT HOSTED BY ONE FORCE/TACTICAL GROUP OF UXSS, PARTICIPATE IN REPEATED PLAY OF A GAME TO DETERMINE WHICH MISSION CONTROL AGENT DECOMPOSES WHICH HIGH-LEVEL MISSION OBJECTIVE STORED IN THE SWARM-DISTRIBUTED HIGH-LEVEL MISSION OBJECTIVES DATABASE. |

*FIG. 8D*

| AGENT SYSTEMS | DESCRIPTION |
|---|---|
| SIMD SITUATION ASSESSMENT AGENT 71 (INFORMATION FUSION AGENT) | SITUATION ASSESSMENT AGENTS TAKE OBJECT STATE VECTORS AS INPUT, UNDERTAKE PATTERN RECOGNITION OR FUSION, AND OUTPUT SITUATION VECTORS. AN EXEMPLARY COHORT OF SITUATION ASSESSMENT AGENTS ABOARD AN ENTIRE COMMAND-GUIDED SWARM, EACH HOSTED BY ONE FORCE/TACTICAL GROUP OF UXSS, PARTICIPATE IN REPEATED PLAY OF A GAME TO DETERMINE WHICH SITUATION ASSESSMENT AGENT UPDATES WHICH SITUATION VECTOR STORED IN THE SWARM-DISTRIBUTED SITUATION VECTOR DATABASE. |
| THREAT ASSESSMENT AGENT 81 (INFORMATION FUSION AGENT) | A PATTERN OF MULTIPLE SITUATION VECTORS IS AN IMPACT OR THREAT, WHICH IN TURN IS DESCRIBED BY A THREAT VECTOR. THREAT ASSESSMENT AGENTS TAKE SITUATION VECTORS AS INPUT, UNDERTAKE PATTERN RECOGNITION OR FUSION, AND OUTPUT THREAT VECTORS. THE COHORT OF THREAT ASSESSMENT AGENTS ABOARD THE ENTIRE COMMAND-GUIDED SWARM, EACH HOSTED BY ONE FORCE/TACTICAL GROUP OF UXSS, PARTICIPATE IN REPEATED PLAY OF A GAME TO DETERMINE WHICH THREAT ASSESSMENT AGENT UPDATES WHICH THREAT VECTOR STORED IN THE SWARM-DISTRIBUTED THREAT VECTOR DATABASE. A FORCE/TACTICAL UXS GROUP HOSTS A SINGLE LEVEL 3 THREAT ASSESSMENT (TA) AGENT 81. THIS EXEMPLARY TA AGENT 81 UTILIZES THE COMPUTING RESOURCES OF ALL THE UXSS IN A FORCE/TACTICAL GROUP, AND CAN INCLUDE AN AI AGENT BASED ON PARALLEL MESSAGE-PASSING PROCESSES. |

*FIG. 8E*

| AGENT NAME | DESCRIPTION |
|---|---|
| OPERATOR INFUSION AGENT 85 | A HUMAN OPERATOR EXERTS REAL-TIME CONTROL OVER THE ENTIRE COMMAND-GUIDED SWARM THROUGHOUT MISSION EXECUTION BY PROVIDING THE FOLLOWING FIVE INFORMATION/CONTROL ELEMENTS: INITIAL AND UPDATED/REVISED HIGH-LEVEL SWARM MISSION OBJECTIVES; SITUATION ASSESSMENT PREFERENCES GIVEN OBJECT STATE INFORMATION; THREAT ASSESSMENT PREFERENCES GIVEN SITUATION INFORMATION; MISSION PLANNING PREFERENCES FOR THE COMMAND-GUIDED SWARM GIVEN HIGH-LEVEL MISSION OBJECTIVES; AND INTEGRATED ENGAGEMENT PLANNING PREFERENCES FOR FORCE/TACTICAL GROUPS GIVEN MISSION ACTIONS. AN EXEMPLARY ROLE OF A HUMAN OPERATOR INCLUDES LEADER, ADVISOR, AND TEACHER TO THE SWARM'S MULTIAGENT INTELLIGENCE THROUGHOUT MISSION EXECUTION. EXEMPLARY OPERATOR INFUSION AGENTS HAVE IMPLEMENTING DESIGNS OR SOFTWARE WITH THE FOLLOWING FUNCTIONALITIES: ANALYZE THREAT VECTORS FORMULATED/UPDATED BY A FORCE/TACTICAL GROUP'S THREAT ASSESSMENT AGENT, AND PREPARE GRAPHICAL/TEXTUAL/AURAL PRESENTATIONS OF THESE IMPACTS/THREATS TO THE HUMAN OPERATOR; RECEIVE ACTIVE ADVICE-SEEKING QUERIES FROM A FORCE/TACTICAL GROUP'S INFORMATION FUSION OR CONTROL DIFFUSION AGENT, AND PREPARE GRAPHICAL/TEXTUAL/AURAL PRESENTATIONS OF THESE QUERIES FOR THE HUMAN OPERATOR; SUBSEQUENTLY RECEIVE AND RELAY BACK TO THE AGENT THE HUMAN OPERATOR'S RESPONSES/PREFERENCES WITH RESPECT TO THESE QUERIES. IN AT LEAST SOME EMBODIMENTS, FOUR TYPES OF QUERIES AND THE AGENTS INVOLVED ARE: SITUATIONAL QUERIES FROM A FORCE/TACTICAL GROUP'S SITUATION ASSESSMENT AGENT; IMPACT/THREAT QUERIES FROM A FORCE/TACTICAL GROUP'S THREAT ASSESSMENT AGENT; SWARM MISSION PLANNING QUERIES FROM A FORCE/TACTICAL GROUP'S MISSION CONTROL AGENT; FORCE/TACTICAL GROUP INTEGRATED ENGAGEMENT QUERIES FROM A FORCE/TACTICAL GROUP'S INTEGRATED ENGAGEMENT CONTROL AGENT. A COHORT OF OI AGENTS85 CAN BE ASSOCIATED WITH A COMMAND-GUIDED SWARM, EACH HOSTED OR OPERATED BY ONE FORCE/TACTICAL GROUP OF UXSS, PARTICIPATE IN REPEATED PLAY OF A GAME TO DETERMINE WHICH OPERATOR INFUSION AGENT ACCESSES WHICH USER-DEFINED OPERATING PICTURE (UDOP) CHANNEL FOR PURPOSES OF DIRECT COMMUNICATION WITH THE HUMAN OPERATOR. |

*FIG. 8F*

GENERAL OVERVIEW OF CONTROL DIFFUSION AGENTS AND OVERVIEW OF
MANAGEMENT/MONITORING FLOW OF CONTROL BETWEEN TWO PLAN RESPOSITORIES

GENERAL DIAGRAM OF DIFFUSION OR DECOMPOSITION BY AGENT $D_i$ OF HIGH-LEVEL ACTION $a_i$ INTO LOW-LEVEL PLAN $D_i$

| INFORMATION FUSION VECTOR NAME | INFORMATION FUSION VECTOR DESCRIPTION | INFORMATION FUSION VECTOR ATTRIBUTE OUTPUTS |
|---|---|---|
| FEATURE VECTOR (FV) PARAMETERS STORERD IN FV DATABASE 45 | A FEATURE VECTOR COMPRISES AN OUTPUT FROM A FEATURE ASSESSMENT AGENT 41 THAT IS STORED IN THE FEATURE VECTOR LOCAL DATABASE. A FEATURE VECTOR EMERGES FROM A GROUPING OF SENSOR PIXELS AT A FIXED MOMENT IN TIME. THE GROUPING IS BASED ON A LINKAGE OR FORMED PATTERN AMONG THE PIXELS. A FEATURE VECTOR CAN ALSO BE DEFINED AS A SPATIAL ZOOMING OUT FROM THIS PIXEL-LEVEL GROUPING. | 1. FV ID ASSOCIATED WITH A SPECIFIC OBSERVED FEATURE THAT PERSISTS OVER TIME, AND TIMESTAMP OF MOST RECENT UPDATE; THE COLLECTION OF UPDATED AND TIMESTAMPED FVS (SHARING THE SAME ID) IS A SPECIFIC FEATURE TRACK.<br>2. FEATURE GEOSPATIAL LOCATION<br>3. FEATURE LOCATION DOMAIN AND CURRENT DOMAIN CHARACTERISTICS<br>4. FEATURE GEOSPATIAL VELOCITY VECTOR PARAMETERS<br>5. FEATURE SENSING SPECTRA (RF, RADAR, IR, VISIBLE, AND/OR ACOUSTIC, ETC.<br>6. FEATURE REFLECTIVITY AND DENSITY<br>7. FEATURE SHAPE CLASSIFICATION<br>8. FEATURE COLOR CLASSIFICATION<br>9. FEATURE CROSS SECTIONAL SIZING<br>10. FEATURE ORIENTATION<br>11. FEATURE ASSESSMENT (F) AGENT UPDATE HISTORY (WHEN THIS FV WAS UPDATED AND BY WHICH FA AGENT) |
| OBJECT STATE VECTOR (OSV) PARAMETERS | AN OBJECT STATE VECTOR EMERGES FROM A GROUPING OF FEATURE VECTORS WITH TIMESTAMPS THROUGHOUT A FIXED INTERVAL IN TIME. THE GROUPING IS BASED ON A LINKAGE OR FORMED PATTERN AMONG THE FEATURES. AN OBJECT STATE VECTOR IS A SPATIAL AND TEMPORAL ZOOMING OUT FROM THIS FEATURE-LEVEL GROUPING | 1. OSV ID ASSOCIATED WITH A SPECIFIC BATTLESPACE OBJECT THAT PERSISTS OVER TIME, AND TIMESTAMP OF MOST RECENT UPDATE; THE COLLECTION OF UPDATED AND TIMESTAMPED OSVS (SHARING THE SAME ID) IS A SPECIFIC OBJECT TRACK<br>2. OBJECT GEOSPATIAL LOCATION<br>3. OBJECT LOCATION DOMAIN AND CURRENT DOMAIN CHARACTERISTICS<br>4. OBJECT GEOSPATIAL VELOCITY VECTOR PARAMETERS<br>5. OBJECT TYPE/CLASSIFICATION AND IDENTIFICATION<br>6. FV IDS OF FEATURE VECTORS CONTRIBUTING TO MOST RECENT UPDATE OF THIS OSV<br>7. OBJECT ASSESSMENT (OA) AGENT UPDATE HISTORY (WHEN THIS OSV WAS UPDATED AND BY WHICH OA AGENT) |

*FIG. 9A*

| INFORMATION FUSION VECTOR NAME | INFORMATION FUSION VECTOR DESCRIPTION | INFORMATION FUSION VECTOR ATTRIBUTES |
|---|---|---|
| SITUATION VECTOR (SV) PARAMETERS | A SITUATION VECTOR EMERGES FROM A GROUPING OF OBJECT STATE VECTORS AT A FIXED MOMENT IN TIME. THE GROUPING IS BASED ON A LINKAGE OR FORMED PATTERN AMONG THE OBJECTS. A SITUATION VECTOR IS A SPATIAL ZOOMING OUT FROM THIS OBJECT-LEVEL GROUPING. | 1. SV ID ASSOCIATED WITH A SPECIFIC SITUATION THAT PERSISTS OVER TIME, AND TIMESTAMP OF MOST RECENT UPDATE; THE COLLECTION OF UPDATED AND TIMESTAMPED SVS (SHARING THE SAME ID) IS A SPECIFIC SITUATION TRACK<br>2. GEOSPATIAL LOCATION OF SITUATION (REGION OCCUPIED BY THE GROUPED OBJECTS)<br>3. SITUATION LOCATION DOMAIN AND CURRENT DOMAIN CHARACTERISTICS<br>4. SITUATION CATEGORY OR TYPE/CLASSIFICATION<br>5. PARTIAL OSV OF EACH OBJECT COMPOSING THIS SITUATION<br>6. ROLE OF EACH OBJECT COMPOSING THIS SITUATION<br>7. RELATIONSHIPS/INTEGRATION WITHIN SELECTED SUBSETS OF OBJECTS COMPOSING THIS SITUATION<br>8. SITUATION ASSESSMENT (SA) AGENT UPDATE HISTORY (WHEN THIS SV WAS UPDATED AND BY WHICH SA AGENT) |
| THREAT VECTOR (TV) PARAMETERS | A THREAT VECTOR EMERGES FROM A GROUPING OF SITUATION VECTORS WITH TIMESTAMPS THROUGHOUT A FIXED INTERVAL IN TIME. THE GROUPING IS BASED ON A LINKAGE OR FORMED PATTERN/SEQUENCE AMONG THE SITUATIONS. A THREAT VECTOR IS A SPATIAL AND TEMPORAL ZOOMING OUT FROM THIS SITUATION-LEVEL GROUPING. | 1. TV ID ASSOCIATED WITH A SPECIFIC THREAT THAT PERSISTS OVER TIME, AND TIMESTAMP OF MOST RECENT UPDATE; THE COLLECTION OF UPDATED AND TIMESTAMPED TVS (SHARING THE SAME ID) IS A SPECIFIC THREAT TRACK<br>2. GEOSPATIAL LOCATION OF THREAT (REGION OCCUPIED BY THE SITUATION GROUPING)<br>3. THREAT LOCATION DOMAIN AND CURRENT DOMAIN CHARACTERISTICS<br>4. THREAT CATEGORY OR TYPE/CLASSIFICATION<br>5. TIMESTAMPED SEQUENCES OF PARTIAL SVS OF EACH SITUATION COMPOSING THIS THREAT<br>6. PREDICTION/PROJECTION/EXTRAPOLATION TO SOME FUTURE MOMENT IN TIME OF THE SITUATIONS COMPOSING THIS THREAT, INCLUDING FUTURE TIMESTAMPED PARTIAL SVS<br>7. THREAT ASSESSMENT (TA) AGENT UPDATE HISTORY (WHEN THIS TV WAS UPDATED AND BY WHICH TA AGENT) |

*FIG. 9B*

| CONTROL DIFFUSION ACTION NAMES | CONTROL DIFFUSION ACTION DESCRIPTION | CONTROL DIFFUSION ACTION ATTRIBUTES |
|---|---|---|
| HIGH LEVEL MISSION OBJECTIVE (HLMO) 89A | A HLMO IS ONE OF SEVERAL DISTINCT STAGES OR STEPS WITHIN A TRANSITION. AN OVERALL INTENDED EFFECT OF A SWARM MISSION IS THE TRANSITION OF THE BATTLESPACE FROM ITS PRE-MISSION STATE TO A GOAL STATE DESIRED BY THE HUMAN OPERATOR AT MISSION END. LIKE PLAN ACTIONS, A HLMO IS SPECIFIED BY ITS PRECONDITIONS AND EFFECTS. | 1. HLMO ID AND TIMESTAMP OF MOST RECENT UPDATE BY THE HUMAN OPERATOR<br>2. GEOSPATIAL LOCATION WITHIN THE BATTLESPACE OF THE SPECIFIC HLMO EFFECTS (REGION THROUGHOUT WHICH THE SPECIFIC HLMO EFFECTS ARE TO OCCUR)<br>3. HLMO EFFECTS LOCATION DOMAIN AND CURRENT DOMAIN CHARACTERISTICS<br>4. HLMO CATEGORY OR TYPE/CLASSIFICATION<br>5. CURRENT THREAT VECTOR(S) (TV ID) IN THE SWARM-DISTRIBUTED TV DATABASE THAT MOTIVATE OR MAY BE ADDRESSED BY THIS HLMO<br>6. HLMO PRECONDITIONS (CONJUNCTION OF FUNCTION FREE POSITIVE LITERALS)<br>7. HLMO EFFECTS (CONJUNCTION OF FUNCTION FREE POSITIVE OR NEGATIVE LITERALS)<br>8. ORDERING CONSTRAINTS OF THIS HLMO WITH RESPECT TO OTHER HLMOS<br>9. PAIRWISE CAUSAL CONSTRAINTS, IF ANY, OF THIS HLMO TO OTHER HLMOS<br>10. STATUS OF HLMO PRECONDITION FLAGS INDICATING IF THE HLMO'S PRECONDITIONS HAVE BEEN ACHIEVED<br>11. STATUS OF HLMO EFFECT FLAGS INDICATING IF THE HLMO'S EFFECTS HAVE BEEN ACHIEVED<br>12. HUMAN OPERATOR UPDATE HISTORY (WHEN THIS HLMO WAS UPDATED)<br>13. MISSION CONTROL (MC) AGENT DECOMPOSITION HISTORY (WHEN THIS HLMO WAS DECOMPOSED INTO A MISSION PLAN (MP) AND BY WHICH MC AGENT) |

*FIG. 9C*

| CONTROL DIFFUSION ACTION NAMES | CONTROL DIFFUSION ACTION DESCRIPTION | CONTROL DIFFUSION ACTION ATTRIBUTES |
|---|---|---|
| MISSION PLAN ACTION | A SWARM MISSION PLAN (MP) DESCRIBES THE DEPLOYMENT AND ACTIVITIES OF THE SWARM'S FORCE/TACTICAL GROUPS THROUGHOUT MISSION EXECUTION. EXCEPT FOR SPECIAL CIRCUMSTANCES, A MP ACTION TYPICALLY WILL NOT SPECIFY WHICH PARTICULAR FORCE/TACTICAL GROUP SHOULD EXECUTE THE ACTION. A MP ACTION WILL INVOLVE MANEUVER, POSITIONING, POSTURING, SENSING, AND/OR ENGAGEMENT ACTIVITIES OF A FORCE/TACTICAL GROUP. A SWARM MP IS AN ASSEMBLY OR STITCHING TOGETHER OF ALL THE INDIVIDUAL HLMO DECOMPOSITIONS PRODUCED BY THE SWARM'S MC AGENTS. THESE HLMO DECOMPOSITIONS AND THE ASSEMBLED MP ARE STORED IN THE SWARM-DISTRIBUTED MP DATABASE. TO FORM THE COMPLETE MP, THE VARIOUS HLMO DECOMPOSITIONS ARE STITCHED TOGETHER ACCORDING TO THE ORDERING CONSTRAINTS AND CAUSAL LINKS OF THE ORIGINAL HLMOS. THE MP ACTION SET MAY BE TOTALLY OR PARTIALLY ORDERED, DEPENDING UPON THE ORDERING CONSTRAINTS AND CAUSAL LINKS OF THE HLMOS AND WITHIN THE HLMO DECOMPOSITIONS. | 1. MP ACTION ID AND TIMESTAMP OF MOST RECENT UPDATE<br>2. GEOSPATIAL LOCATION WITHIN THE BATTLESPACE OF THE SPECIFIC MP ACTION EFFECTS (REGION THROUGHOUT WHICH THE SPECIFIC MP ACTION EFFECTS ARE TO OCCUR)<br>3. MP ACTION EFFECTS LOCATION DOMAIN AND CURRENT DOMAIN CHARACTERISTICS<br>4. MP ACTION CATEGORY OR TYPE/CLASSIFICATION<br>5. CURRENT THREAT VECTOR(S) (TV ID) IN THE SWARM-DISTRIBUTED TV DATABASE THAT MOTIVATE OR MAY BE ADDRESSED BY THIS MP ACTION<br>6. MP ACTION PRECONDITIONS (CONJUNCTION OF FUNCTION FREE POSITIVE LITERALS)<br>7. MP ACTION EFFECTS (CONJUNCTION OF FUNCTION FREE POSITIVE OR NEGATIVE LITERALS)<br>8. ORDERING CONSTRAINTS OF THIS MP ACTION WITH RESPECT TO OTHER MP ACTIONS<br>9. PAIRWISE CAUSAL CONSTRAINTS OF THIS MP ACTION TO OTHER MP ACTIONS<br>10. STATUS OF MP ACTION PRECONDITION FLAGS INDICATING IF THE ACTION'S PRECONDITIONS HAVE BEEN ACHIEVED<br>11. STATUS OF MP ACTION EFFECT FLAGS INDICATING IF THE ACTION'S EFFECTS HAVE BEEN ACHIEVED<br>12. MC AGENT UPDATE HISTORY (WHEN THIS MP ACTION WAS UPDATED DURING AN HLMO DECOMPOSITION AND BY WHICH MC AGENT)<br>13. IEC AGENT DECOMPOSITION HISTORY (WHEN THIS MP ACTION WAS DECOMPOSED INTO AN INTEGRATED ENGAGEMENT PLAN AND BY WHICH IEC AGENT) |

*FIG. 9D*

| CD ACTION NAMES | CONTROL DIFFUSION ACTION DESCRIPTION | CONTROL DIFFUSION ACTION ATTRIBUTES |
|---|---|---|
| INTEGRATED ENGAGEMENT PLAN | AN INTEGRATED ENGAGEMENT PLAN (IEP) DESCRIBES THE DEPLOYMENT AND ACTIVITIES OF THE SENSING SUITES, FIRES SUITES, AND PLATFORMS WITHIN A SINGLE FORCE/TACTICAL GROUP THROUGHOUT THE EXECUTION OF A SINGLE MP ACTION. AN IEP ACTION WILL BE ONE OF THREE POSSIBLE ACTION TYPES: SENSING ACTION WHICH ADDRESSES A SENSOR SUITE ABOARD A SINGLE UXS; FIRES ACTION WHICH ADDRESSES A WEAPON SUITE ABOARD A SINGLE UXS; A PLATFORM ACTION WHICH ADDRESSES A SINGLE UXS PLATFORM THE MP DECOMPOSITION LIBRARY, THE REFERENCE RESOURCE USED BY IEC AGENTS IN CONSTRUCTING IEPS, SUPPORTS MP ACTION DECOMPOSITION INTO IEPS INCLUDING OF THESE THREE ACTION TYPES. EXCEPT FOR SPECIAL CIRCUMSTANCES, AN IEP ACTION TYPICALLY WILL NOT SPECIFY WHICH PARTICULAR SENSOR SUITE, WEAPON SUITE, OR PLATFORM WITHIN THE FORCE/TACTICAL GROUP SHOULD EXECUTE THE IEP ACTION. WITHIN THE IEP, SEVERAL SIMULTANEOUS ACTIONS WILL COORDINATE SENSING, FIRES, AND PLATFORM CONTROL AMONG MULTIPLE SENSOR SUITES, WEAPON SUITES, AND PLATFORMS WITHIN THE GROUP. HENCE, AN IEP OF NECESSITY WILL BE A PARTIAL-ORDER PLAN WITH PARALLEL ACTIONS (MULTIPLE ACTIONS SHARING THE SAME ORDERING CONSTRAINTS AND CAUSAL LINKS). THIS MP ACTION DECOMPOSITION COMPRISING THE IEP IS STORED IN THE GROUP-DISTRIBUTED IEP DATABASE. | 1. IEP ACTION ID AND TIMESTAMP OF MOST RECENT UPDATE; <br> 2. IF IEP ACTION IS A SENSING ACTION: <br> A. IEP SENSING ACTION CATEGORY OR TYPE/CLASSIFICATION; B. GEOSPATIAL LOCATION OF THE BATTLESPACE REGION TO BE SENSED; C. DOMAIN OF BATTLESPACE REGION TO BE SENSED; D. COORDINATED SENSING REQUIREMENTS; E. REGION(S) OF SPECTRUM APPROPRIATE FOR THIS SENSING ACTION; F. PASSIVE OR ACTIVE SENSING NEEDS; G. ATMOSPHERIC IMPEDIMENTS, SPECTRAL NOISE, OR PHYSICAL OBSTRUCTIONS THAT MAY IMPAIR SENSING. <br> 3. IF IEP ACTION IS A FIRES ACTION: A. IEP FIRES ACTION CATEGORY OR TYPE/CLASSIFICATION; B. GEOSPATIAL LOCATION OF THE BATTLESPACE REGION TO BE ENGAGED C. DOMAIN OF BATTLESPACE REGION TO BE ENGAGED D. COORDINATED FIRES REQUIREMENTS; E. FIRES TYPE(S) APPROPRIATE FOR THIS ENGAGEMENT ACTION F. IMPEDIMENTS OR OBSTRUCTIONS THAT MAY IMPAIR ENGAGEMENT; <br> 4. IF IEP ACTION IS A PLATFORM ACTION: <br> A. IEP PLATFORM ACTION CATEGORY OR TYPE/ CLASSIFICATION; B. GEOSPATIAL LOCATION OF THE BATTLESPACE REGION TO BE OCCUPIED BY PLATFORM; C. DOMAIN OF BATTLESPACE REGION TO BE OCCUPIED BY PLATFORM; D. ORIENTATION AND POSTURE OF PLATFORM E. COMMUNICATION REQUIREMENTS OF PLATFORM; F. STEALTH/EMCON REQUIREMENTS OF PLATFORM; G. PLATFORM TYPE(S) APPROPRIATE FOR THIS ACTION; H. IMPEDIMENTS OR OBSTRUCTIONS TO PLATFORM ACTION; <br> 5. CURRENT SITUATION VECTOR(S) (SV ID) IN THE SWARM-DISTRIBUTED SV DATABASE THAT MOTIVATE OR MAY BE ADDRESSED BY THIS IEP ACTION; (CONTINUED BELOW) |

*FIG. 9E*

| CD ACTION NAMES | CONTROL DIFFUSION ACTION DESCRIPTION | CONTROL DIFFUSION ACTION ATTRIBUTES |
|---|---|---|
| INTEGRATED ENGAGEMENT PLAN (IEP) (CONTINUED) | | 6. IEP ACTION PRECONDITIONS (CONJUNCTION OF FUNCTION FREE POSITIVE LITERALS);<br>7. IEP ACTION EFFECTS (CONJUNCTION OF FUNCTION FREE POSITIVE OR NEGATIVE LITERALS)<br>8. ORDERING CONSTRAINTS OF THIS IEP ACTION WITH RESPECT TO OTHER IEP ACTIONS;<br>9. PAIRWISE CAUSAL CONSTRAINTS OF THIS IEP ACTION TO OTHER IEP ACTIONS;<br>10. STATUS OF IEP ACTION PRECONDITION FLAGS INDICATING IF THE ACTION'S PRECONDITIONS HAVE BEEN ACHIEVED;<br>11. STATUS OF IEP ACTION EFFECT FLAGS INDICATING IF THE ACTION'S EFFECTS HAVE BEEN ACHIEVED;<br>12. IEC AGENT UPDATE HISTORY (WHEN THIS IEP ACTION WAS UPDATED DURING A MP ACTION DECOMPOSITION AND BY WHICH IEC AGENT);<br>13. AGENT DECOMPOSITION HISTORY:<br>A. SENSOR CONTROL (SC) AGENT DECOMPOSITION HISTORY (IF THIS IEP ACTION IS A SENSOR ACTION, WHEN THIS IEP ACTION WAS DECOMPOSED INTO A SENSOR CONTROL PLAN (SCP) AND BY WHICH SC AGENT) B. WEAPON CONTROL (WC) AGENT DECOMPOSITION HISTORY (IF THIS IEP ACTION IS A WEAPON ACTION, WHEN THIS IEP ACTION WAS DECOMPOSED INTO A WEAPON CONTROL PLAN (WCP) AND BY WHICH WC AGENT); C. PLATFORM CONTROL (PC) AGENT DECOMPOSITION HISTORY (IF THIS IEP ACTION IS A PLATFORM ACTION, WHEN THIS IEP ACTION WAS DECOMPOSED INTO A PLATFORM CONTROL PLAN (PCP) AND BY WHICH PC AGENT) |

*FIG. 9F*

| CD ACTION NAMES | CONTROL DIFFUSION ACTION DESCRIPTION | CONTROL DIFFUSION ACTION ATTRIBUTES |
|---|---|---|
| SENSOR CONTROL PLAN (SCP) ACTION | A SENSOR CONTROL PLAN (SCP) PROVIDES THE SPATIAL LOCATIONS REQUIRING SENSING (ANGULAR COORDINATES AND RANGE), SENSING SPECTRAL REQUIREMENTS, AND TIMING OF ACTIVATION STATES FOR THE SENSORS ABOARD A SINGLE UXS THROUGHOUT EXECUTION OF A SINGLE IEP SENSING ACTION. EXCEPT FOR SPECIAL CIRCUMSTANCES, A SCP ACTION TYPICALLY WILL NOT SPECIFY WHICH SPECIFIC SENSOR ABOARD THE UXS SHOULD EXECUTE THE SCP ACTION. WITHIN THE SCP, SEVERAL SIMULTANEOUS ACTIONS WILL COORDINATE SENSING AMONG MULTIPLE SENSORS ABOARD THE SINGLE UXS. HENCE, A SCP OF NECESSITY WILL BE A PARTIAL-ORDER PLAN WITH PARALLEL ACTIONS (MULTIPLE ACTIONS SHARING THE SAME ORDERING CONSTRAINTS AND CAUSAL LINKS). THIS IEP SENSING ACTION DECOMPOSITION COMPRISING THE SCP IS STORED IN THE LOCAL SCP DATABASE ABOARD THE SINGLE UXS | 1. SCP ACTION ID AND TIMESTAMP OF MOST RECENT UPDATE<br>2. SCP ACTION CATEGORY OR TYPE/CLASSIFICATION<br>3. SPATIAL LOCATION TO BE TARGETED BY A SENSOR (ANGULAR COORDINATES AND RANGE)<br>4. DOMAIN OF SPATIAL LOCATION TO BE TARGETED BY A SENSOR<br>5. REQUIREMENTS FOR COORDINATION WITH OTHER SENSORS ABOARD THE SINGLE UXS<br>6. SPECTRAL REQUIREMENTS OF SCP ACTION<br>7. SCP ACTION'S PASSIVE OR ACTIVE SENSING NEEDS<br>8. ATMOSPHERIC IMPEDIMENTS, SPECTRAL NOISE, OR PHYSICAL OBSTRUCTIONS THAT MAY IMPAIR SENSOR OPERATION<br>9. CURRENT OBJECT STATE VECTOR(S) (OSV ID) IN THE GROUP-DISTRIBUTED OSV DATABASE THAT REPRESENTS THE TARGET(S) OF THIS SCP ACTION<br>10. SCP ACTION PRECONDITIONS (CONJUNCTION OF FUNCTION FREE POSITIVE LITERALS)<br>11. SCP ACTION EFFECTS (CONJUNCTION OF FUNCTION FREE POSITIVE OR NEGATIVE LITERALS)<br>12. ORDERING CONSTRAINTS OF THIS SCP ACTION WITH RESPECT TO OTHER ACTIONS IN THE SCP<br>13. PAIRWISE CAUSAL CONSTRAINTS OF THIS SCP ACTION TO OTHER ACTIONS IN THE SCP<br>14. STATUS OF SCP ACTION PRECONDITION FLAGS INDICATING IF THE ACTION'S PRECONDITIONS HAVE BEEN ACHIEVED<br>15. STATUS OF SCP ACTION EFFECT FLAGS INDICATING IF THE ACTION'S EFFECTS HAVE BEEN ACHIEVED<br>16. SC AGENT UPDATE HISTORY (WHEN THIS SCP ACTION WAS UPDATED DURING AN IEP SENSING ACTION DECOMPOSITION AND BY THE UXS'S SC AGENT)<br>17. SENSOR CONTROL SIGNALING (SCS) AGENT DECOMPOSITION HISTORY (WHEN THIS SCP ACTION WAS DECOMPOSED INTO SENSOR SERVO/ACTUATION SIGNALS AND BY WHICH SCS AGENT) |

*FIG. 9G*

| CD ACTION NAMES | CONTROL DIFFUSION ACTION DESCRIPTION | CONTROL DIFFUSION ACTION ATTRIBUTES |
|---|---|---|
| WEAPON CONTROL PLAN ACTION | A WEAPON CONTROL PLAN (WCP) PROVIDES THE SPATIAL LOCATIONS REQUIRING ENGAGEMENT (ANGULAR COORDINATES AND RANGE), ENGAGEMENT REQUIREMENTS SUCH AS KINETIC OR ELECTROMAGNETIC DELIVERY AND PAYLOAD SPECIFICATIONS, AND TIMING OF FIRES FOR THE WEAPONS ABOARD A SINGLE UXS THROUGHOUT EXECUTION OF A SINGLE IEP FIRES ACTION. EXCEPT FOR SPECIAL CIRCUMSTANCES, A WCP ACTION TYPICALLY WILL NOT SPECIFY WHICH SPECIFIC WEAPON ABOARD THE UXS SHOULD EXECUTE THE WCP ACTION. WITHIN THE WCP, SEVERAL SIMULTANEOUS ACTIONS WILL COORDINATE FIRES AMONG MULTIPLE WEAPONS ABOARD THE SINGLE UXS. HENCE, A WCP OF NECESSITY WILL BE A PARTIAL-ORDER PLAN WITH PARALLEL ACTIONS (MULTIPLE ACTIONS SHARING THE SAME ORDERING CONSTRAINTS AND CAUSAL LINKS). THIS IEP FIRES ACTION DECOMPOSITION COMPRISING THE WCP IS STORED IN THE LOCAL WCP DATABASE ABOARD THE SINGLE UXS. | 1. WCP ACTION ID AND TIMESTAMP OF MOST RECENT UPDATE<br>2. WCP ACTION CATEGORY OR TYPE/CLASSIFICATION<br>3. SPATIAL LOCATION TO BE TARGETED BY A WEAPON (ANGULAR COORDINATES AND RANGE)<br>4. DOMAIN OF SPATIAL LOCATION TO BE TARGETED BY A WEAPON<br>5. REQUIREMENTS FOR COORDINATION WITH OTHER WEAPONS ABOARD THE SINGLE UXS<br>6. DELIVERY REQUIREMENTS OF WCP ACTION<br>7. PAYLOAD REQUIREMENTS OF WCP ACTION<br>8. ATMOSPHERIC IMPEDIMENTS OR PHYSICAL OBSTRUCTIONS THAT MAY IMPAIR WEAPON OPERATION<br>9. CURRENT OBJECT STATE VECTOR(S) (OSV ID) IN THE GROUP-DISTRIBUTED OSV DATABASE THAT REPRESENTS THE TARGET(S) OF THIS WCP ACTION<br>10. WCP ACTION PRECONDITIONS (CONJUNCTION OF FUNCTION FREE POSITIVE LITERALS)<br>11. WCP ACTION EFFECTS (CONJUNCTION OF FUNCTION FREE POSITIVE OR NEGATIVE LITERALS)<br>12. ORDERING CONSTRAINTS OF THIS WCP ACTION WITH RESPECT TO OTHER ACTIONS IN THE WCP<br>13. PAIRWISE CAUSAL CONSTRAINTS OF THIS WCP ACTION TO OTHER ACTIONS IN THE WCP<br>14. STATUS OF WCP ACTION PRECONDITION FLAGS INDICATING IF THE ACTION'S PRECONDITIONS HAVE BEEN ACHIEVED<br>15. STATUS OF WCP ACTION EFFECT FLAGS INDICATING IF THE ACTION'S EFFECTS HAVE BEEN ACHIEVED<br>16. WC AGENT UPDATE HISTORY (WHEN THIS WCP ACTION WAS UPDATED DURING AN IEP FIRES ACTION DECOMPOSITION AND BY THE UXS'S WC AGENT)<br>17. WEAPON CONTROL SIGNALING (WCS) AGENT DECOMPOSITION HISTORY (WHEN THIS WCP ACTION WAS DECOMPOSED INTO WEAPON SERVO/ACTUATION SIGNALS AND BY WHICH WCS AGENT) |

*FIG. 9H*

| CD ACTION NAMES | CONTROL DIFFUSION ACTION DESCRIPTION | CONTROL DIFFUSION ACTION ATTRIBUTES |
|---|---|---|
| PLATFORM CONTROL PLAN ACTION | A PLATFORM CONTROL PLAN (PCP) PROVIDES THE BATTLESPACE LOCATIONS REQUIRING OCCUPATION (LAT/LONG OR MGRS COORDINATES AND ORIENTATION) AND THE TIMING OF POSITIONING AND POSTURE OF A SINGLE UXS PLATFORM THROUGHOUT EXECUTION OF A SINGLE IEP PLATFORM ACTION. A PCP ACTION IS INTENDED FOR A SINGLE UXS PLATFORM. HENCE, A PCP OF NECESSITY WILL BE A TOTAL-ORDER PLAN WITH SEQUENTIAL ACTIONS FOR THE SINGLE UXS PLATFORM. THIS IEP PLATFORM ACTION DECOMPOSITION COMPRISING THE PCP IS STORED IN THE LOCAL PCP DATABASE ABOARD THE SINGLE UXS. | 1. PCP ACTION ID AND TIMESTAMP OF MOST RECENT UPDATE<br>2. PCP ACTION CATEGORY OR TYPE/CLASSIFICATION<br>3. BATTLESPACE LOCATION TO BE OCCUPIED BY THE PLATFORM (LAT/LONG OR MGRS COORDINATES AND ORIENTATION)<br>4. DOMAIN OF SPATIAL LOCATION TO BE OCCUPIED BY THE PLATFORM<br>5. ATMOSPHERIC IMPEDIMENTS OR PHYSICAL OBSTRUCTIONS THAT MAY IMPAIR PLATFORM OPERATION<br>6. CURRENT OBJECT STATE VECTOR(S) (OSV ID) IN THE GROUP-DISTRIBUTED OSV DATABASE THAT REPRESENTS THE TARGET(S) OF THIS PCP ACTION<br>7. PCP ACTION PRECONDITIONS (CONJUNCTION OF FUNCTION FREE POSITIVE LITERALS)<br>8. PCP ACTION EFFECTS (CONJUNCTION OF FUNCTION FREE POSITIVE OR NEGATIVE LITERALS)<br>9. ORDERING CONSTRAINTS OF THIS PCP ACTION WITH RESPECT TO OTHER ACTIONS IN THE PCP<br>10. PAIRWISE CAUSAL CONSTRAINTS OF THIS PCP ACTION TO OTHER ACTIONS IN THE PCP<br>11. STATUS OF PCP ACTION PRECONDITION FLAGS INDICATING IF THE ACTION'S PRECONDITIONS HAVE BEEN ACHIEVED<br>12. STATUS OF PCP ACTION EFFECT FLAGS INDICATING IF THE ACTION'S EFFECTS HAVE BEEN ACHIEVED<br>13. PC AGENT UPDATE HISTORY (WHEN THIS PCP ACTION WAS UPDATED DURING AN IEP PLATFORM ACTION DECOMPOSITION AND BY THE UXS'S PC AGENT)<br>14. PLATFORM CONTROL SIGNALING (PCS) AGENT DECOMPOSITION HISTORY (WHEN THIS PCP ACTION WAS DECOMPOSED INTO PLATFORM SERVO/ACTUATION SIGNALS BY THE UXS'S PCS AGENT) |

*FIG. 9I*

301 — INPUTTING OR UPDATING, USING AN OPERATOR CONTROL STATION 33, NEW OR UPDATED HIGH-LEVEL MISSION OBJECTIVES DATA 131 THAT ARE TRANSMITTED OR COMMUNICATED TO THE OPERATOR INFUSION SIMD AGENTS 85 ACROSS A PLURALITY OF PLATFORMS 3A, 3B, 3C, ETC WITHIN EITHER A DESIGNATED FORCE/TACTICAL GROUP COMPRISING A PLURALITY OF THE UXS PLATFORMS 3 OR ALL OF THE UXS PLATFORMS 3 WITHIN A SWARM WHICH IN TURN UPDATES THE SWARM-DISTRIBUTED HIGH-LEVEL MISSION OBJECTIVES (HLMO) DATABASE 89 ON ALL UXS PLATFORMS 3 OR UXS PLATFORMS WITHIN ONE OR MORE DESIGNATED FORCE/TACTICAL GROUPS, WHERE THE MISSION OBJECTIVES 131 INCLUDE AN EFFECT ON A TARGET OR TARGETS OR ENTITIES AND A TARGET OR ENTITY IDENTIFICATION WITH A TARGET OR ENTITY LOCATION OR ONE OR MORE PATTERNS THAT CAN BE ASSOCIATED WITH THE TARGET, TARGETS OR ENTITIES, E.G., A TARGET IMAGE OR PATTERN USABLE BY A SENSOR FOR PATTERN MATCHING WITH THE TARGET IMAGE OR PATTERN, WHERE THE EXEMPLARY EFFECT CAN BE A CONDITION CHANGE OR INTERACTION ASSOCIATED WITH THE TARGET SUCH AS, E.G., DESTRUCTION, DAMAGE, DISRUPTION OF ENTITY OR TARGET FUNCTION, CONTROL OVER THE TARGET OR ENTITY, MOVEMENT, OBSERVATION, MANIPULATION OF THE TARGET OR ENTITY, REPAIR, MODIFICATION, REPLACEMENT, POSITIONING, ORIENTATION, ENGAGEMENT WITH ONE OR MORE ELEMENTS OF THE TARGET E.G., A CAMERA, COMMUNICATION SYSTEM, A TOOL, AN EQUIPMENT ITEM, ETC.

303 — EXTRACTING HIGH-LEVEL SWARM MISSION OBJECTIVES FROM THE HLMO DATABASE 89, WHICH IS A DISTRIBUTED DATABASE ACCESSIBLE TO THE SWARM'S MISSION CONTROL (MC) SIMD AGENTS 91, USING MISSION CONTROL (MC) SIMD AGENTS 91 IN THE ENTIRE SWARM OF FORCE/TACTICAL GROUPS (ONE MC SIMD AGENT PER GROUP) INTERACT WITH EACH OTHER. THIS INTERACTION TAKES THE FORM OF A GAME IN WHICH THE MC SIMD AGENTS 91 ARE THE PLAYERS. AN EXEMPLARY CGS COMPRISES A COHORT, TEAM OR COLLECTION OF MC SIMD AGENTS 91 WHERE EACH MC SIMD AGENT 91 IS HOSTED IN PARALLEL ACROSS ONE FORCE/TACTICAL GROUP OF UXSS AND PARTICIPATES IN REPEATED PLAY OF A GAME TO DETERMINE WHICH MC SIMD AGENT 91 DECOMPOSES WHICH HLMO STORED IN THE SWARM-DISTRIBUTED HLMO DATABASE 89. SEE FIG. 19 FOR AN EXEMPLARY GAME RELATIVE TO MC SIMD AGENTS 91.

305 — DECOMPOSING HIGH LEVEL SWARM MISSION OBJECTIVES AT A GAME EQUILIBRIUM (E.G., NASH EQUILIBRIUM) POINT, USING AN $i^{TH}$ MC SIMD AGENT 91, INTO PLANNED SWARM COURSES OF ACTION OR SWARM MISSION PLANS THAT DIRECTLY INVOLVE THE $i^{TH}$ FORCE/TACTICAL GROUP IN THE SWARM, WHEREIN IN ACCOMPLISHING THIS DECOMPOSITION, THE $i^{TH}$ MC SIMD AGENT 91 ACCESSES SWARM-DISTRIBUTED THREAT VECTORS (TV) DATABASE 83 OF THREATS THAT ARE DIRECTLY RELEVANT (IN TERMS OF IMPACT MAGNITUDE/URGENCY, THREAT CATEGORY/TYPE, AND THE CAUSALLY INTERDEPENDENT BATTLESPACE SITUATIONS FORMING THE SPATIAL/TIME SEQUENCE THAT CONSTITUTES THE THREAT) TO THE $i^{TH}$ FORCE/TACTICAL GROUP, WHEREIN A RESULTING DECOMPOSITION IS STORED IN THE SWARM-DISTRIBUTED MISSION PLANS (MP) DATABASE 79.

*FIG. 12A*

SWARM SYSTEM INCLUDING AN OPERATOR CONTROL SECTION ENABLING OPERATOR INPUT OF MISSION OBJECTIVES AND RESPONSES TO ADVICE REQUESTS FROM A HETEROGENEOUS MULTI-AGENT POPULATION INCLUDING INFORMATION FUSION, CONTROL DIFFUSION, AND OPERATOR INFUSION AGENTS THAT CONTROLS PLATFORMS, EFFECTORS, AND SENSORS

CROSS-REFERENCE TO RELATED APPLICATION

This application claims priority to U.S. Provisional Application Ser. No. 62/682,511 filed on Jun. 8, 2018, the disclosure of which is expressly incorporated herein by reference

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,536, 200,445 and 200,386) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Generally, embodiments of the invention encompass a collection of semi-autonomous and autonomous systems that operate under or in relation to human control via operator specified objectives and training inputs that guide the systems. In particular, embodiments of the invention include a single-operator cyber-physical command-guided swarm (CGS) system of system (SoS). An exemplary CGS can be partitioned into several smaller force or tactical groups/sub-swarms, forming a swarm of swarms.

More particularly, embodiments of the invention can include a swarm system including a swarm of one or more groups of platforms with local and cross-platform agents. The exemplary system also includes an operator control section enabling operator input of high-level mission objectives and responses to advice requests from the agents. The agents can include information fusion, control diffusion, and operator infusion agents that controls platforms, effectors and sensors based on game theoretic agent interactions to allocate/optimize performance of information fusion, control diffusion, and operator infusion tasks to achieve the mission objectives. Some agents are local to a platform and some are parallelized across a group of platforms. Various embodiments of the present invention addresses various needs including a need for systems that improve cognitive function/effectiveness of operators controlling a swarm of semi-autonomous systems as well as improving such swarm systems ability to engage in semi-autonomous operations in an operator in the loop configuration. Existing systems do not enable an operator to provide missions or objectives and execute various tasks to achieve those objectives or objectives while informing the operator of relevant information.

A series of overarching design challenges exist to achieve various desired improvements and novel functionality in exemplary cyber-physical CGS SoS design and development. For example, FIG. 1 describes a variety of such overarching design challenges including coordination of multiple disciplines (e.g. radar, software, computer, electro-optics, radio frequency communication, human interface and control engineering), clock synchronization, determining component interactions, maximizing swarm integrity, characterizing time related design aspects, real-time scheduling, design for wireless communication, and ensuring cyber security. Note the FIG. 1 discussion excludes the many challenges of design/development of the cyber or physical components themselves, and addresses selected critical overarching design challenges.

At a high level, embodiments of the invention can include a complex adaptive CGS SoS system using artificial intelligence, integrated information fusion/control diffusion, and a networked swarm of semi-autonomously agent controlled system of systems platforms (SAASoSP) that receives operator guidance. Exemplary SAASoSP's can include sensors, equipment, and capacity to identify/react to new pattern(s) inputs that enables/improves cognitive capacity of an operator to enable the SAASoSP and swarm operator(s) to engage in operator decision making (e.g. observe, orient, decide, act) based on a range of operator inputs including at least a range of high level mission objectives to actual control of SAASoSPs. Various components and software elements along with methods of operation and manufacturing are provided.

In particular, an exemplary architecture can include a large multi-agent population of AI learning machines, with no agent functioning as a central authority, from which an exemplary CGS SoS's collective or swarm intelligence emerges. Design elements to cyber-physical SoS design addresses discrete vs. continuous time scales, clock synchronization, real-time scheduling, component interaction, wireless communications, swarm integrity, and cyber security. Various embodiments of the invention can include information fusion AI learning machine technology combining symbolic, probabilistic, and other machine learning approaches for processing sensor data using statistical relational learning (SRL), e.g., using a Markov Logic Network (MLN) learning machine approach. In at least some embodiments, all agents except an Operator Infusion (OI) agent use SRL vs a neural network or deep learning approach which enables a system to help an operator understand how it is reaching its decisions vs a deep learning/neural network which does not provide any understanding of how the deep learning/neural network is making its decisions or how it is learning. SRL combines the power of statistics with the power of logic to enable development of a learning machine that an operator can understand, influence, and guide in its learning and decision-making. At least some embodiments further include control diffusion AI learning machine technology involving planning, plan decomposition, action generation, and tasking allocation to sensors, weapons, and unmanned domain systems (UxS) (with x representing space, air, ground, surface, or undersea domains). Embodiments further include operator infusion AI learning machine technology providing a single human operator or swarm tactician-supervisor the ability to reconfigure his/her User-Defined Operating Picture (UDOP) in real time and throughout mission execution. At least some embodiments further include operator infusion AI learning machine technology for human-swarm partnering by which the swarm intelligence queries the swarm tactician-supervisor who advises the CGS SoS throughout mission execution (an advanced form of machine learning). Various embodiments further can enable interactions among the large multi-agent population via, e.g., game theoretic approaches by which collective solutions (e.g., Nash equilibria) drive the CGS SoS toward fulfilling the swarm tactician-supervisor's mission objectives.

BRIEF DESCRIPTION OF THE DRAWINGS

The detailed description of the drawings particularly refers to the accompanying figures in which:

FIG. 1 shows a diagram of design challenges associated with designing and building various embodiments of the invention;

FIG. 3B shows an overview of agent types to include agent functional overview and agent interaction overview associated with one exemplary embodiment of the invention;

FIG. 3C shows a list of parallel processing agents and a list of non-parallel processing agents used in one exemplary embodiment of the invention;

FIG. 5C1 shows an exemplary overview of CD Agents, CD Agent action inputs, and CD agent action outputs;

FIG. 5C2 shows an exemplary overview of IF SRL model names, IF SRM model inputs, and IF SRL model outputs;

FIG. 5C3 shows an exemplary overview of IF SRL models and CD SRL models in accordance with one embodiment of the invention;

FIGS. 8A, 8B, 8C, and 8D provides an overview of particular exemplary fusion, diffusion, and infusion agents with a description of functions and games associated with each one;

FIGS. 8E and 8F shows a generalized overview of information fusion and operator infusion agents;

FIG. 9A to 9I show exemplary data or variables which are stored in different data stores that are generated or used with different agents (e.g., information fusion and control fusion agents) along with descriptions and variable or data attributes;

FIG. 12A to 12E shows a method of operation of one embodiment of the invention.

DETAILED DESCRIPTION OF THE DRAWINGS

Figure 2:
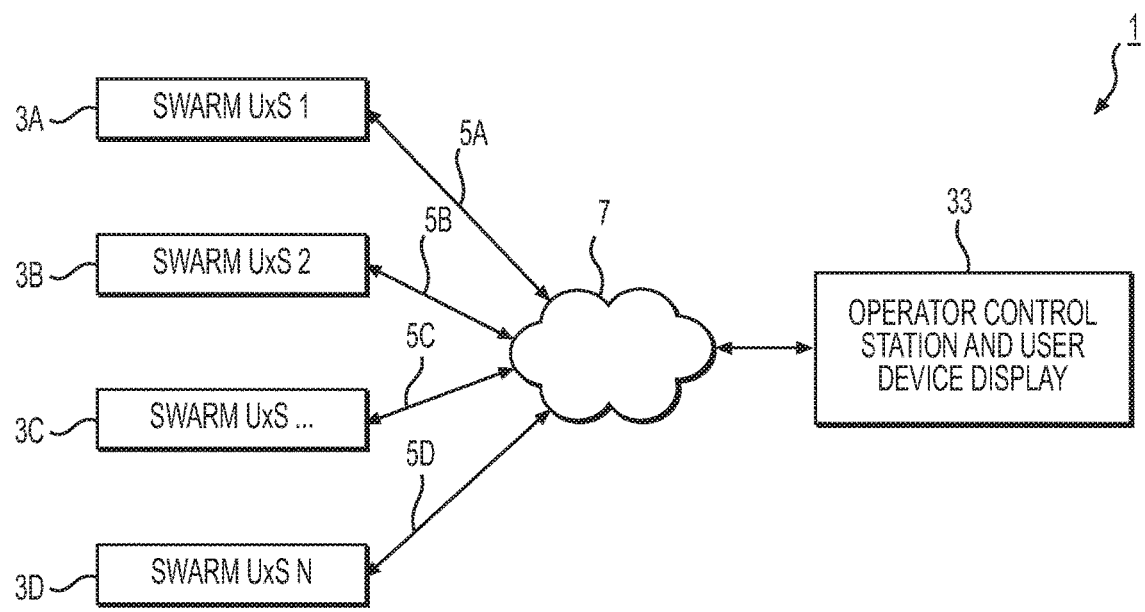
FIG. 2 shows a simplified diagram of a swarm system interacting via a communication system with an operator control station associated with one exemplary embodiment of the invention.

Embodiments of the invention described herein are not intended to be exhaustive or to limit the invention to precise forms disclosed. Rather, the embodiments selected for description have been chosen to enable one skilled in the art to practice the invention.

Generally, a single technological framework in accordance with at least one embodiment of the invention can include a command-guided robotic-augmentation swarms and swarm of swarms AI systems. Embodiments of the invention include a cyber-physical CGS. The CGS may be considered a swarm of swarms as it is segmented into several smaller force or tactical groups, each of which functions as a swarm in its own right.

An exemplary command-guided swarm can include a multi-sensor, multi-equipment or multi-tool, multi-platform, single-human-operator system-of-systems (SoS). Exemplary SoS' may include a multi-domain force comprising multiple unmanned domain systems (UxS) (x=Space, Air, Ground, Surface, or Undersea domain), under the mission-oriented tactical coordination of a single human operator or swarm tactician-supervisor. The cyber-physical CGS SoS can be a complex networking of software and digital hardware operating in cyberspace, with platforms, sensors, and equipment or tools operating within the physical environment. An exemplary cyber-physical CGS SoS architecture for a SAASoSP can comprise a large multi-agent population of learning machines. These exemplary agents utilize various local and distributed data stores, and they interact via game theoretic approaches. At a highest level of abstraction, exemplary AI agents of CGS can fall into one of three classes: information fusion, control diffusion, and operator infusion. (See e.g., FIG. 3A)

Machine learning for exemplary CGS agents of exemplary information fusion class can be based on a novel hybrid of symbolic and probabilistic machine learning (ML) to effect data mining and pattern recognition. This hybrid ML approach combines Bayesian graphical models with first-order logic, which in the AI research community is referred to as SRL. Within the SRL approach, logical symbolic representations capture the underlying rich structure of the problem domain, while the probabilistic methods manage the uncertainty and error in the data.

An exemplary embodiment can include both an observational information processing side of an AI as well as an exemplary planning side of AI embodiments that implements a concept of control diffusion. Exemplary embodiments of at least one CGS SoS example must dissect or deconstruct or decompose its high-level mission objectives into specialized tasking or actions for each of its many engagement capabilities. This disaggregation and deconstruction and decomposition of high-level mission objectives, coordinated with the allocation or diffusion of tasking/actions out to specific engagement capabilities, the constituent systems of the CGS SoS, can be embodied in relation to a concept of control diffusion. Machine learning for the CGS agents of the control diffusion class can be based on hierarchical task network (HTN) planning.

Because of complexities of cyber-physical CGS SoS embodiments, exemplary interfacing for a swarm tactician-supervisor can differ from traditional COP and hand controls. An exemplary UDOP interface affords a human operator an ability to reconfigure an interface in real time and throughout mission execution, thereby tailoring his/her information exposure not only to high-level threat summaries and projections, but also to instantaneous states of affairs or situations, and to individual object states/tracks, depending upon the nature of the mission and the immediate stage of mission execution. In the dual sense, the UDOP enables the human operator to focus his/her decision-making at the highest level of establishing/updating mission objectives, or to expand and extend his/her decision-making involvement to include details of instantaneous coordination/integration among engagement groups within the swarm, or even to decision making down at the level of individual sensor/weapon/platform management. This rich human operator accesses to and interaction with the entire CGS SoS suggests the human operator is infused into various SoS embodiments.

In conjunction with an exemplary UDOP paradigm, exemplary operator infusion agents implement AI and machine learning innovations to accomplish significantly improved partnering of the human operator with the CGS intelligence. Human-machine interaction may include a human advising the CGS SoS throughout mission execution. This capability may be extended not only to any SRL model for accomplishing information fusion, but also to any HTN planning model for accomplishing control diffusion. Taking this ML approach a bit further, machine learning may also be accomplished via active advice-seeking by the machine, by which the CGS SoS solicits advice from its human operator throughout mission execution. One advantage of this approach is that machine learning by the swarm, in part, becomes a responsibility of the swarm tactician-supervisor, both in garrison and throughout the execution of missions. In other words, the operator's role is an advisor and teacher to his/her cyber-physical CGS SoS, and this role is the basis of the human-swarm partnership.

An exemplary large population of exemplary machine learning agent instantiations must interact among themselves, and game theory provides a framework and approaches for implementing this interaction. While the CGS SoS microscopic design challenge is the individual learning machine agents themselves, one macroscopic challenge is design of the many interactions among the population of learning machine agents, out of which emerges the overall collective or swarm intelligence. Game theory has traditionally been applied to understanding human-to-human interactions. In this context, game theory is in a sense inverted to provide a design framework for a multi-agent SoS of intelligent learning machines.

More particularly, an exemplary embodiment of a cyber-physical CGS can be a multi-sensor, multi-equipment (e.g. weapon), multi-platform, single-human-operator system-of-systems by which collective or swarm intelligence emerges from the complex interactions of a large multi-agent population. These interactions may be designed using game theory. AI agents execute gaming strategies. The games are repeated to accomplish learning in games, a form of reinforcement learning. In the architecture discussed here, an exemplary CGS has thirteen agent types, twelve of which participate in a game with other agents of the same type. By repeated play, these twelve contemporaneous games within the CGS population converge upon solution concepts, or equilibria (such as the famous Nash equilibrium), and these equilibria constitute the emergent swarm intelligence.

Embodiments of the invention can be based on a specific cyber architecture common to each UxS in the cyber-physical CGS, as shown herein. From a physical perspective, embodiments of a CGS can be divided into force or tactical groups of UxSs. These force/tactical groups are subject to integrated engagement plans that address integrated fires, integrated maneuver, and integrated posturing/positioning among the UxSs within the force/tactical group. These groups may be considered as "swarms within swarms".

FIG. 2 shows a simplified diagram of a generic swarm system 1 comprising multiple swarm UxS 3A, 3B, 3C, 3D not divided into groups, e.g., force or tactical groups, interacting via a communication system (e.g., radio frequency (RF) radio, network, etc) over remote communication paths (5A, 5B, 5C, 5D) that may be, e.g., radio frequency (RF) communication paths, with an operator control station 33.

Figure 3A:
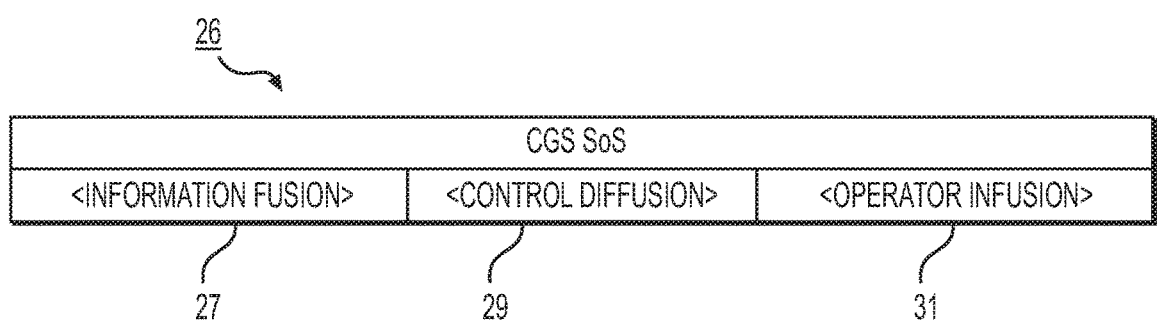
FIG. 3A shows an overview of categories or object classes associated with CGS SoS agent architecture comprising three agents associated with one exemplary embodiment of the invention.

FIG. 3A shows an overview of a high level abstraction of an exemplary CGS SoS agent architecture subroutines or classes comprising three agent classes or types. A first agent class or type includes an information fusion agent 27, a control diffusion agent 29, and an operator infusion agent 31 (for operator "in" fusion into the system to mentor or train an exemplary system). Exemplary mining and processing of information that originates in an external environment is performed by information fusion agents 27. Disaggregation or decomposition or deconstruction of high level mission objectives that originate internally with the human operator, coupled with the generation of plans and allocation of tasking out to specific engagement capabilities is performed by the control diffusion agents 29. Operator infusion agents 31 enable and operate with a human-in-the-loop for interpreting/assessing processed information/data, establishing mission objectives or making engagement decisions, and interacting with CGS SoS for purposes of enabling machine learning and fusion/diffusion augmentation/refinement. In other words, in various embodiments each AI agent in an exemplary CGS SoS can be an instantiation derived from one of these three high-level abstractions or classes 27, 29, 31. An exemplary information fusion abstraction class 27 encompasses levels 0, 1, 2, and 3 of a Joint Director of Laboratory (JDL) Data Fusion Model. Embodiments of at least one exemplary control diffusion abstraction encompasses and extends JDL level 4 data fusion and resource management to include not only sensor control but also equipment, e.g., weapon, and platform control. Exemplary operator infusion agent 31 interface abstraction encompasses JDL level 5 data fusion. Various sub-classes or instantiations of these three high level agent groups 27, 29, 31 are further described below.

FIG. 3B shows an overview of agent types to include agent functional overview and agent interaction overview associated with one exemplary embodiment of the invention. Information Fusion Agents 27 (e.g. See FIGS. 4, 5, 6, 7, etc) perform fusion or pattern recognition functions. In particular, information fusion agents 27 perform fusion or pattern recognition within multiple information vectors; e.g., recognize features (a pattern recognized within a set of pixel vectors is a feature), objects (a pattern recognized within a set of feature vectors is an object), situations (a pattern recognized within a set of object state vectors is a situation), and impacts or threats (a pattern recognized within a set of situation vectors is an impact or threat). Information fusion agents perform agent interaction functions. For example, multiple information fusion agents must divide up pattern recognition workload e.g., all feature assessment agents 41 on a single UxS 3 that are each associated with a different sensor 15 (15A, 15B, 15C, etc) must divide up feature assessment work by playing a game to decide which feature assessment agent will update a given feature vector (e.g., an array of parameters (e.g., grouping of sensor pixel patterns with specific attributes) stored in a database local to a UxS platform; all Object Assessment Agents 61 divide up object assessment work.

Referring to FIG. 3B, another class of agents include control diffusion agents 29. Exemplary functions of control diffusion agents include diffusion or pattern generation of multiple action vectors (or simply actions); e.g., generate device control signals (a device signaling action set or plan is generated or decomposed from a UxS action), UxS actions (a UxS action set or plan is generated or decomposed from a force/tactical group integrated engagement action), integrated engagement actions (an integrated engagement action set or plan is generated or decomposed from a mission action), and mission actions (a mission action set or plan is generated or decomposed from a high-level mission objective). Control Diffusion Agents 29 perform various exemplary interactions with each other. For example, Control Diffusion Agents 29 divide up pattern generation or planning workload; e.g., all Sensor Control Signaling Agents 42 on a single UxS 3 that are each associated with a different sensor 15 (15A, 15B, 15C, etc.) must divide up UxS sensing action decomposition work by playing a game to decide which Sensor Control Signaling Agent will decompose a given UxS sensing action (into a set of sensor control signals) stored in a database local to a UxS platform; all Sensor Control Agents 51 divide up integrated engagement sensing actions decomposition work.

Referring again to FIG. 3B, an exemplary embodiment can include multiple force/tactical groups 34 (e.g., see FIGS. 7A/7B) within a swarm 28 where each force/tactical group has its own Operator Infusion Agent 31. Operator Infusion Agents 31 generally enable a function of information infusion or partnering of the human operator and the information fusion 27 and control diffusion agent 29 population; e.g., infusion of the human operator's preferences (e.g., via active machine learning and advice-seeking techniques) for situation assessment with the Situation Assessment Agents' 71 knowledge, for impact or threat assessment with the Threat Assessment Agents' 81 knowledge, for integrated engagement planning with the Integrated Engagement Control Agents' 73 knowledge, and for mission planning with the Mission Control Agents' 91 knowledge. Operator Infusion Agent 31 has a variety of interactions. For example, multiple Operator Infusion Agents 31 share among themselves access to the human operator guiding their force/tactical group 34 such that the human operator is not cognitively overloaded; e.g., all Operator Infusion Agents 31, each aboard a different force/tactical group 34, must divide up or allocate among themselves channels of their user interface to an assigned human operator by playing a game to decide which Operator Infusion Agent 31 will access a given user interface channel for purposes of direct communication with the human operator at a given time or under a set of circumstances. This helps reduce or manage cognitive load or attention demands on a given human operator so that the Operator Infusion Agents 31 only seek to gain the attention or place a cognitive demand on the operator when there is a significant reason for such a demand thereby assist the operator in focusing their attention on value added interactions.

FIG. 3C shows a list of parallel processing agents and a list of non-parallel processing agents used in one exemplary embodiment of the invention. This table distinguishes agents which are parallel processing based versus agents which are not parallel processing based and is a simplified representation of system architecture shown in FIG. 7A. In this embodiment, in this example agents which are parallel processing agents (e.g., SIMD) processing agents comprising multiple processing elements) that include Operator Infusion SIMD Agent 85 (Operator Infusion Agent 27 Class), Mission control (MC) SIMD agents 91 (A Sub-Class of the Control Diffusion Class 29), Integrated engagement control (IEC) SIMD agents 73 (A Sub-Class of the Control Diffusion Class 29), Situation Assessment Agent SIMD Agent 71 (A Sub-Class of the Information Fusion Class 27), and Threat or Impact Assessment Agent SIMD Agent 81 (A Sub-Class of the Information Fusion Class 27). Non-Parallel Processing Agents in at least one embodiment include Sensor Control Agent 51 (A Sub-Class of the Control Diffusion Class 29), Weapon Control Agent 53 (A Sub-Class of the Control Diffusion Class 29), Platform Control Agent 55 (A Sub-Class of the Control Diffusion Class 29), Sensor Control Signaling Agent (Control Diffusion Agent Subclass 29), Weapon (or effector) Control Signaling Agent 43 (A Sub-Class of the Control Diffusion Class 29), Platform Control Signaling Agent 44 (A Sub-Class of the Control Diffusion Class 29), and Object Assessment Agent 41 (A Sub-Class of the Information Fusion Class 27) Feature Assessment Agent 61 (A Sub-Class of the Information Fusion Class 27).

Figure 3D:
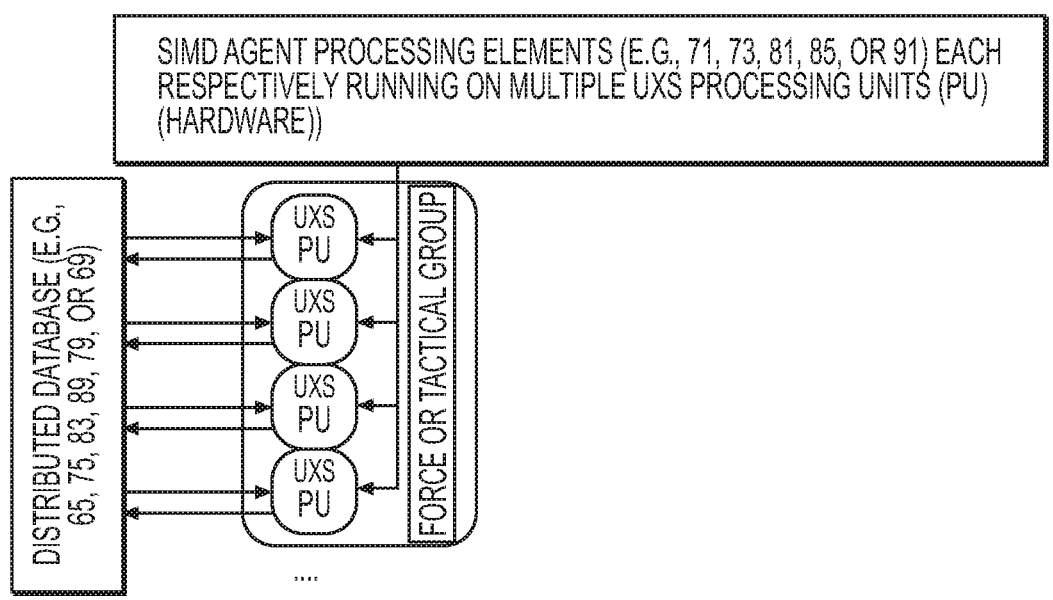
FIG. 3D shows an exemplary architecture of Single Instruction Multiple Data (SIMD) parallel processing units respectively operating on different platforms within a force or tactical group and a data flow with various distributed databases.

FIG. 3D shows an exemplary architecture of Single Instruction Multiple Data (SIMD) parallel processing units (PU) respectively operating on different UxS 3 within a force or tactical group and a data flow with various distributed databases (e.g., 65, 75, 83, 79, or 69). Exemplary SIMD Agent Processing Elements (e.g., 71, 73, 81, 85, or 91) each respectively run on Multiple UxS 3 (hardware))(in this example, there are four UxS 3 each running a given SIMD processing units within a given force or tactical group). E.g., see FIG. 7A for a more detailed exemplary discussion of agents that are similar to the SIMD agent processing elements (e.g., situation assessment SIMD agent 71, threat assessment SIMD agents 81, etc)

Figure 4:
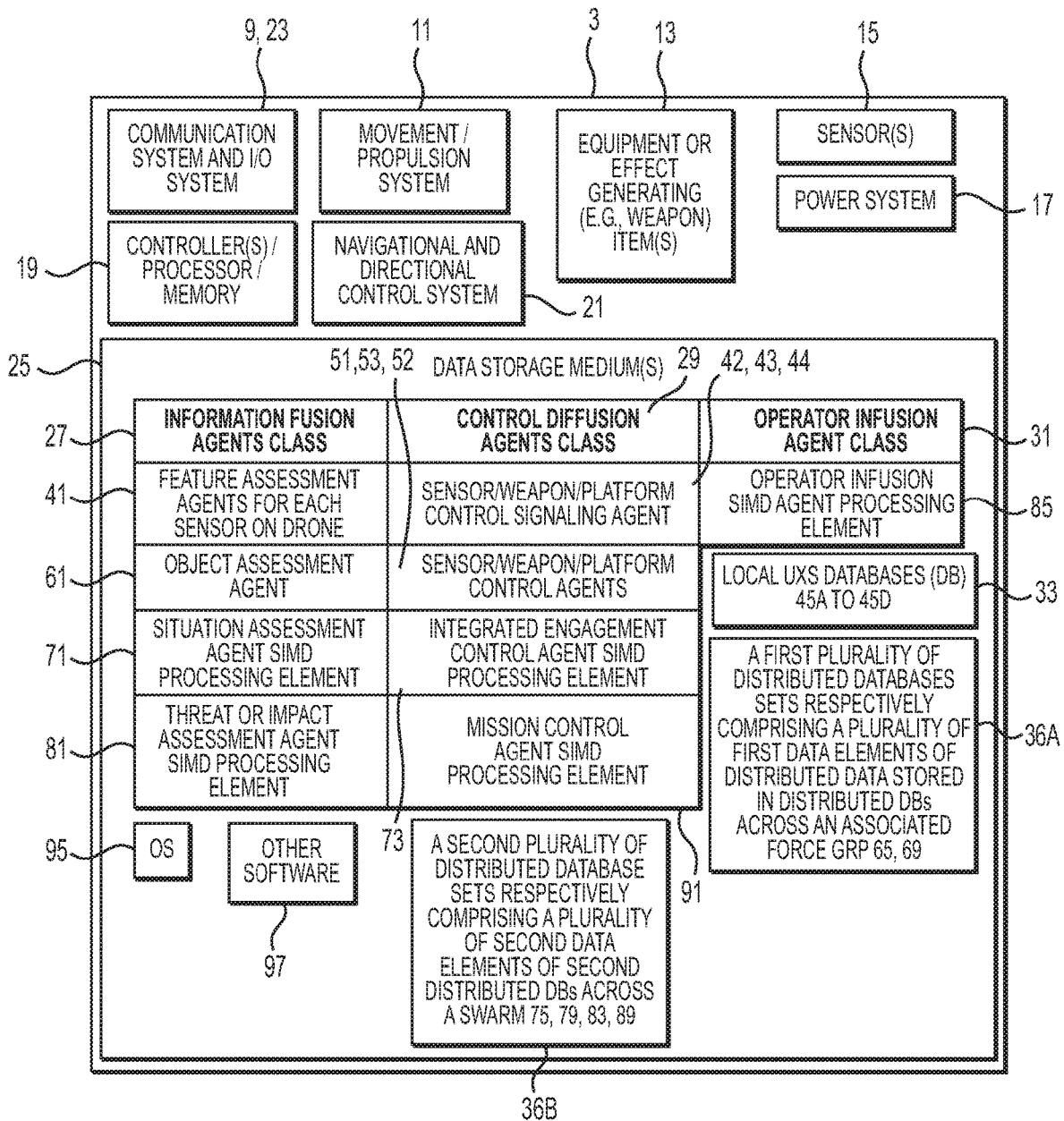
FIG. 4 shows a simplified hardware and high level software architecture for a single UxS platform.

FIG. 4 shows a simplified hardware and high level software architecture for a single UxS platform 3. A communication system 9 is provided for communicating with other swarm UxS platforms 3 and an operator console 33 (not shown in FIG. 4, but see FIG. 2) that has operator software that interacts with Operator Infusion class SIMD agents 31 across a swarm. Exemplary SIMD agents generally can fall into a class of parallel computers in Flynn's taxonomy. This taxonomy includes a description of computers with multiple processing elements that perform the same operation on multiple data points simultaneously or concurrently. A movement/propulsion system 11 (e.g., propeller, rotary system, or other propulsion system that moves the UxS platform 3). An exemplary UxS platform is a mobile platform which may include lifting means such as wings or a quad copter. The UxS platform 3 may also be a mobile floating platform, an underwater platform, a space platform, etc. The exemplary UxS platform 3 may also include various equipment or effectors 13 (e.g., weapon, effect generating equipment such as actuators, grippers, lasers, projectile firing systems, capture systems, drills, mining equipment, measuring systems, sensors, material handling systems, or other system that may create some type of physical effect on an external object or environment). One or more sensors 15 are provided which are controlled by Control Diffusion Agents 29 and provide sensor output to at least Information Fusion Agents 27. A power system 17 is provided to provide power to systems on board the UxS 3. At least one controller 19 is provided to provide control functions, process machine instructions stored on at least the Data Storage Medium 25 and interact and control at least some or all of other components or systems on board the UxS 3. A Navigation and Directional Control System 21 is provided to provide navigation and control functions to, e.g., enable navigation and enabling maneuvering and movement of the UxS platform 3. An input/output (I/O) system 23 is also provided to provide various I/O functions to include on-platform I/O as well as I/O activities with respect to external physical interfaces such a programming or data transfer interface operation with, e.g., a maintenance, operational update system, etc. At least one Data Storage Medium 25 is provided that stores machine instructions which operate one or more processors, systems, or controller 19 on board the UxS platform 3. The Data Storage Medium 25 stores the Information Fusion Agents 27 (e.g., 41, 61, 71, 81), Control Diffusion Agents 29 (e.g., 42, 43, 44, 51, 53, 55, 73, 91)(See FIG. 5), the Operator Infusion Agents 31 (e.g., 85), an operating system (OS) 95 for providing OS functions for one or more systems on the UxS platform 3, Other Software 97 that may be required to operate or perform various functions, a local UxS Database (DB) 33 (e.g., 45A to 45D), a first plurality of distributed database sets 36A (e.g., 65, 69, e.g., see FIG. 5-FIG. 7B) associated with a Force Group, and a second plurality of distributed database sets 36B (e.g., 75, 79, 83, 89)(e.g., see FIG. 5-FIG. 7B) associated with a swarm. The exemplary first plurality of distributed databases sets 36A respectively comprises a plurality of first data elements of distributed data stored in distributed DBs across an associated Force Grp 65, 69 (e.g., See FIG. 7A). The second plurality of distributed database sets 36B respectively comprises a plurality of second data elements of second distributed DBs across a swarm 75, 79, 83, 89 (See FIG. 5-FIG. 7B).

In one or more embodiments a DB (e.g., first plurality of distributed DBs 65, 69 and second plurality of distributed DBs 75, 79, 83, 89)(e.g., see FIGS. 5-7B) can be a database in which storage devices are not all attached to a common processor. Such distributed databases may be stored in multiple computers, located in the same physical location; or may be dispersed over a network of interconnected computers. Unlike parallel systems, in which the processors are tightly coupled and constitute a single database system, a distributed database system comprises loosely coupled sites that share no physical components. System administrators can distribute collections of data (e.g. in a database) across multiple physical locations. A distributed database can reside on organized network servers or decentralized independent computers on the Internet, on corporate intranets or extranets, or on other organization networks. Because distributed databases store data across multiple computers, distributed databases may improve performance at end-user worksites by allowing transactions to be processed on many machines, instead of being limited to one. In various embodiments, two processes can ensure that the distributed databases remain up-to-date and current: replication and duplication. Replication may involve using specialized software that looks for changes in the distributive database. Once the changes have been identified, the replication process makes all the databases look the same. The replication process can be complex and time-consuming depending on the size and number of the distributed databases. This process can also require significant time and computer resources. Duplication, on the other hand, can have less complexity. Duplication basically identifies one or more database elements to be updated by a control process or program as a master data element and then duplicates that updated database element across a network of distributed databases. This is to ensure that each distributed location has the same data. Both replication and duplication can keep the data current in all distributive locations. Besides distributed database replication and fragmentation, there are many other distributed database design technologies. For example, local autonomy, synchronous and asynchronous distributed database technologies.

Figure 5A:
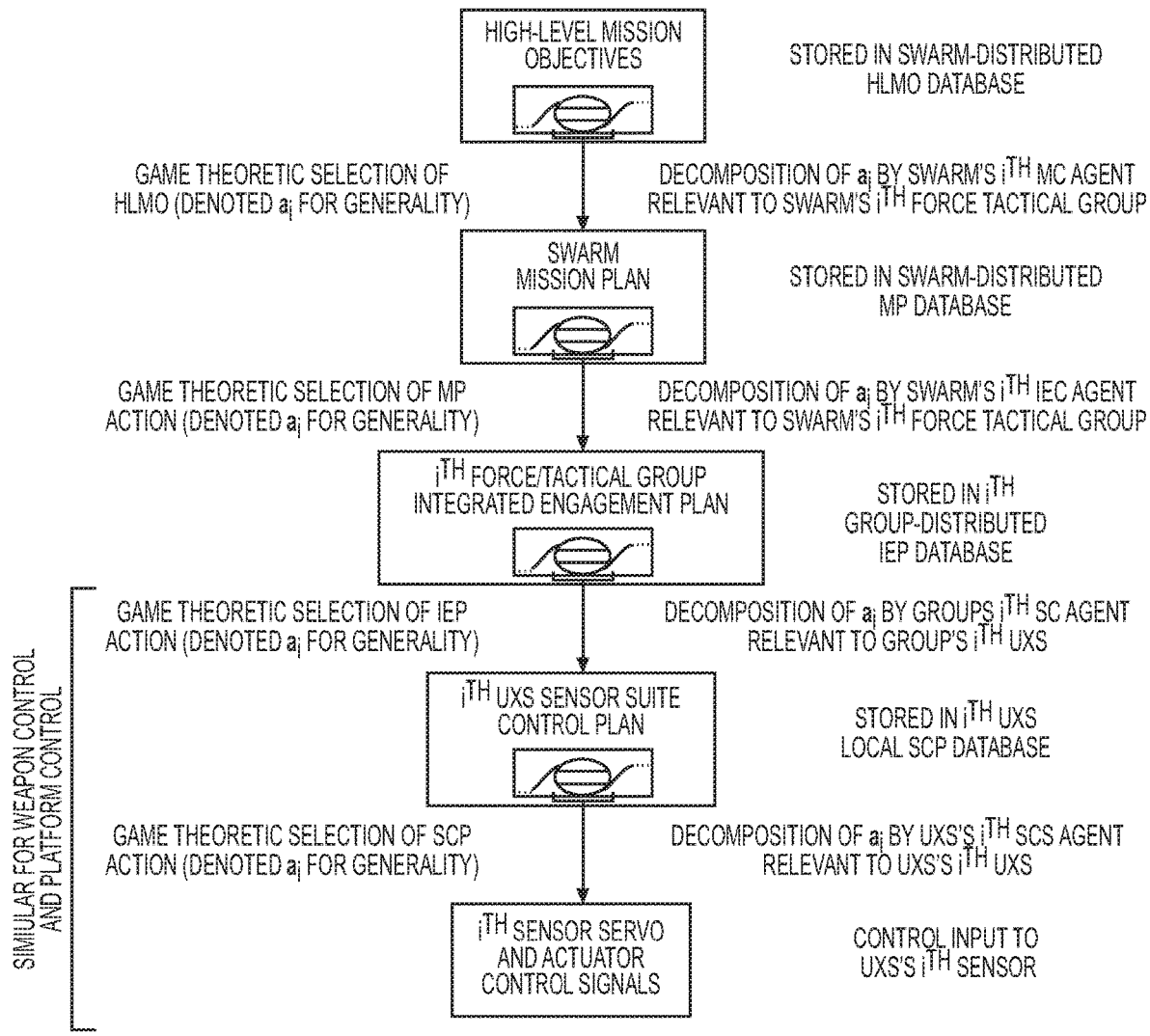
FIG. 5A shows a hierarchy of action decomposition by CGS SOS control diffusion agents in accordance with one embodiment of the invention.
Figure 5B:
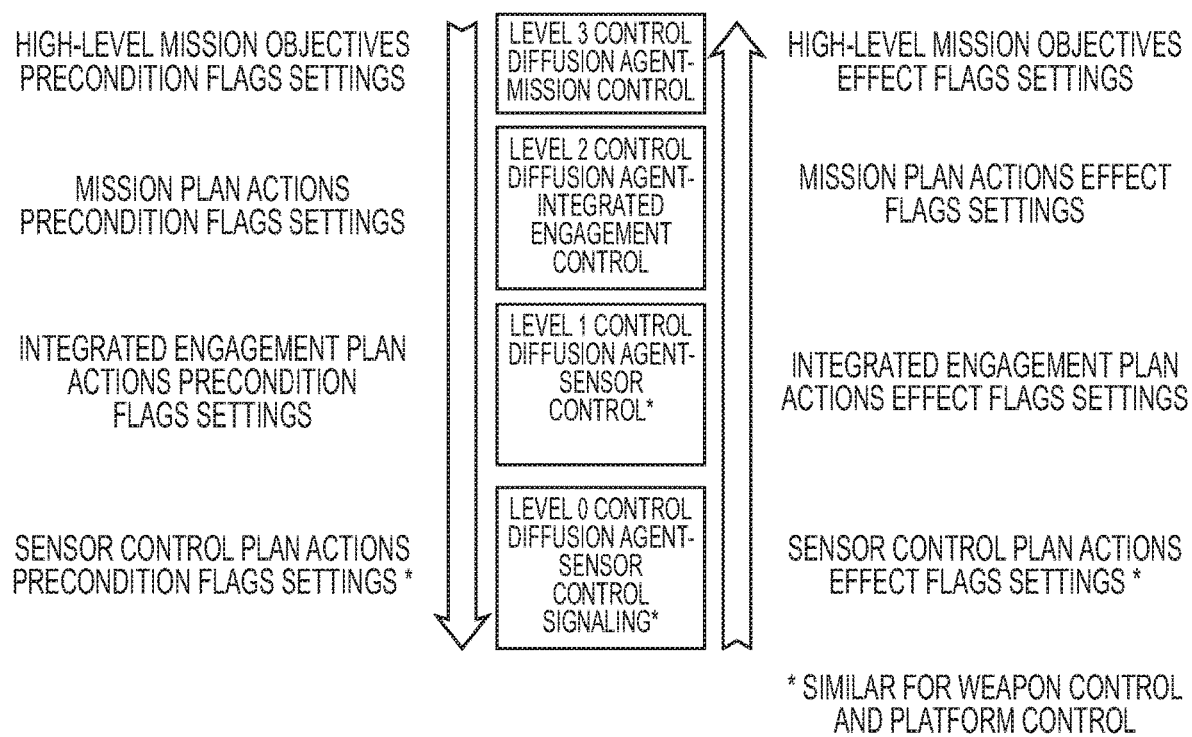
FIG. 5B shows a hierarchical flow of action/plan precondition flag settings and action/plan effect flag settings for control diffusion agents.

As shown in FIG. 5A, an exemplary flow of control effected by exemplary control diffusion agent population terminates at the three types of lowest-level control signaling agents. These three exemplary types are sensor control signaling (SCS) agents 42 (e.g., 42A, 42B, etc), an instance of which is denoted $D\_i\hat{}SCS$, weapon control signaling (WCS) agents 13 (e.g., 13A, 13B, etc)(or effector control agents for other types of equipment), an instance of which is denoted $D\_i\hat{}WCS$, and platform control signaling (PCS) agents 3, an instance of which is denoted $D\_i\hat{}PCS$. From a local UxS-based sensor control plans (SCP) database 45B, the agent D_i^SCS 42 will decompose action a_i into servo/actuator control signals for each physical sensor associated with D_i^SCS 42. When one or more preconditions of a_i are flagged as achieved, then agent D_i^SCS 42 will output servo/actuator control signals to a respective sensor 15 (e.g., 15A, 15B, or 15C, etc). When the physical sensor 15 has executed these control signal commands, then a respective agent D_i^SCS 42 will flag a set of effects of a_i as achieved. This a_i effect flag is set as achieved in the SCP local database 45B. An analogous process occurs regarding weapons and platforms. In like manner, when respective effect flags of a plan stored in the SCP local database 45B are set as achieved, then the respective effect flag of a higher-level action in the integrated engagement plans (IEP) database 69 is set as achieved. And so forth up the hierarchy. Note that the FIG. 5A/5B, etc, action/plan precondition flag settings cascade downward through the control diffusion agent hierarchy, terminating at a lowest-level sensor/weapon/platform control signaling agents. In the opposite direction, action/plan effect flag settings cascade upward through the exemplary hierarchy, originating at a lowest-level sensor/weapon/platform control signaling agents. As action/plan effect flags flip to achievement settings, the execution of the CGS mission evolves forward in time. FIG. 5B illustrates this exemplary flow of precondition and effect flag settings through the control diffusion agent hierarchy.

Figure 5C:
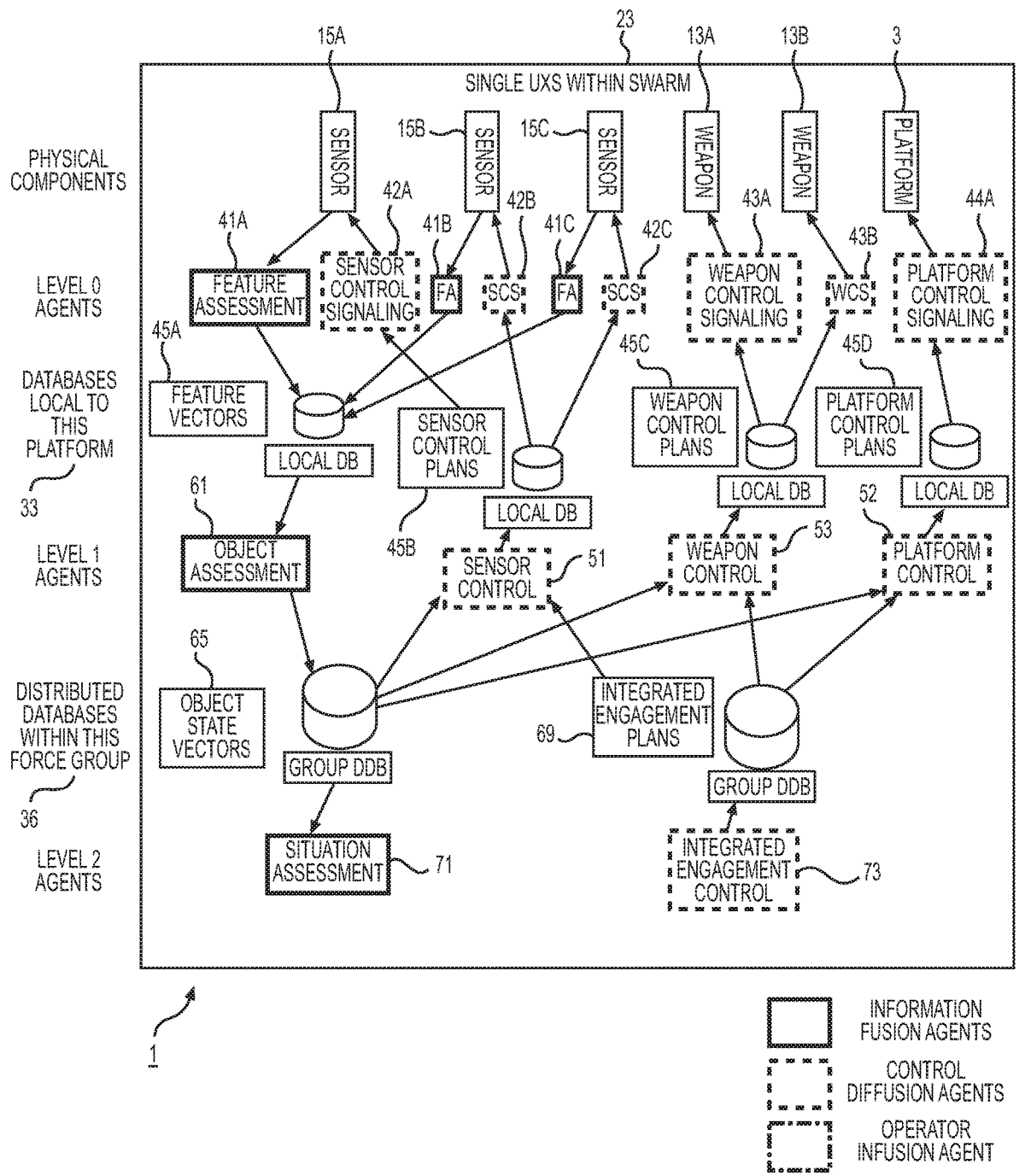
FIGS. 5CA and 5CB show multiple views of control diffusion, information fusion, and interactions initiated when mission control agents have received high level mission objectives and commenced sequences of gaming driven information processing task allocations followed by additional agent gaming and task allocation/interactions.
Figure 5C:
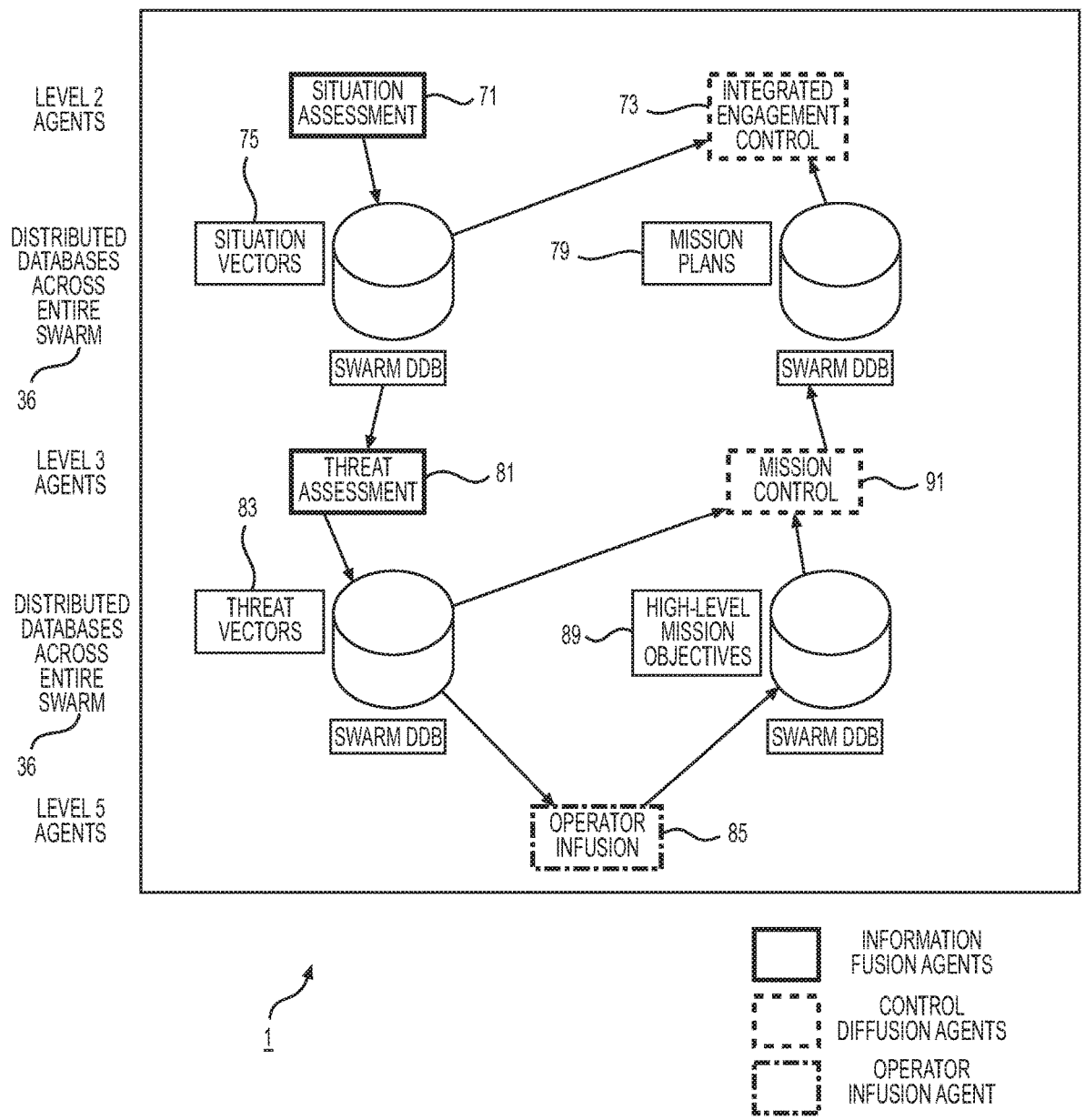

FIGS. 5CA and 5CB show an exemplary system architecture 1 with simplified UxS physical components as well as agents and databases at different function/organizational hierarchy or virtualization levels (aboard a single UxS vs distributed across a group (e.g., Force Tactical Group), and distributed across an entire swarm. In particular, FIGS. 5CA and 5CB show exemplary operator infusion, control diffusion, and information fusion/processing tasks and interactions initiated when mission control agents have received high-level mission objectives and commenced sequences of agent gaming between agents of the same type. Note that FIGS. 5CA and 5CB show several of the basic operations of the various agents: information fusion and control diffusion tasks. Other figures (e.g., FIG. 5D and FIG. 10) show active-advice seeking interactions with the OI Agent 85. Other figures discuss or disclose interaction operations or gaming between agents of a similar type. With regard to active-advice seeking interactions, as an agent (e.g., some of the control diffusion and information fusion agents) is executing information-processing tasks it will need, from time to time, advise from a human operator and thereby trigger an active-advice seeking interaction event. For example, a SA Agent 71 can be looking for pixel patterns among object state vectors in a stream of images that are associated with a desired situation pattern stored in the object state vector database 65. When the SA Agent 71 cannot categorize a region of the object state vector space it is seeking to match object state vectors with stored patterns then it will send a request for advice or preference to a user on how to categorize the unmatched situation.

In this embodiment, exemplary agents perform various operations including: information fusion/control diffusion processing tasks unique to each agent class or type and gaming interaction operations with other agents of the same class or type (e.g., a game to optimize utility functions of the agent players such as dividing up a given tasking (e.g., an information processing task which is divided up among a population of similar type agents)). Games are how a given collection of agents decide which agent does what in a division of tasks. Some agents (e.g., Situation Assessment (SA) Agent 71, Threat Assessment (TA) 81, Mission Control 91 (MC), Integrated Engagement Control (IEC) 73), ask for and receive active advice from an operator via operator infusion inputs via OI Agents 85 which facilitates active learning via a type of active learning referred to as "active advice-seeking".

Some differences exist between supervised or passive learning and active machine Learning. Supervised or passive learning can be done by providing a training data set into an uneducated agent which then processes the training data set to "educate" a passive or supervised learning based agent (e.g., Level 0 or Level 1 agents (see FIGS. 5CA and 5CB). In contrast, active learning machines receive answers to questions originating distributed and active learning based agents (e.g., Level 2 and 3 Agents, FIGS. 5CA and 5CB) which are answered by an operator who presented with asked questions by a particular Operator Infusion Agent 85 (e.g., a Situation Assessment Agent 71 within a given group (e.g., a Force Tactical Group, FIG. 7A) may submit a question to an Operator Infusion Agent 85 associated with the same group (e.g., Force Tactical Group); then all OI Agents 85 associated with different groups (e.g., Force Tactical Group) play a game to compete for access to an operator so the question asked by a Level 2 or 3 Agent (e.g., Situation Assessment Agent 71) gets passed along to an operator. In this way, an operator's ability to avoid being overwhelmed with requests for attention by various swarm elements is improved (avoid unnecessary cognitive load on any given operator).

Machine learning generally can be viewed as a mechanism by which an instance of intelligence technology improves with experience. In an exemplary multi-intelligent-agent command-guided swarm system of systems (CGS SoS), many intelligent agents have two machine learning requirements. First, each information fusion (IF) agent and control diffusion agent must learn how to accomplish its assigned tasking, and second, each agent (e.g., IF, control diffusion, and operator infusion) must learn how to best interact with other agents assigned similar tasking using games using a utility function (games between agents of the same type). Exemplary CGS information fusion and control diffusion agents learn to accomplish their tasking via active learning.

Active learning embodiments can employ an approach where an operator guides active learning based agents via operator infusion where an Operator Infusion Agent 85 is prompting or asking questions to an operator. In other words, active learning includes a machine learning approach by which the intelligent agent learns by asking questions. For intelligent agents operating in complex worlds such as the multi-domain battlespace of the CGS, active learning is expected to be considerably more efficient than supervised or passive learning. In various types of supervised learning, specially prepared sets of labeled data or training data are fed to the learning agent until the agent is sufficiently educated to process new unlabeled data. A critical inefficiency of supervised or passive learning is that not all examples in the training data set provide the same amount of information. The training data set may contain numerous examples which contribute little to the improvement of agent performance. In general, the performance of the passive learning agent in processing new data is proportional to the size of the training data set. An agent designed to have an error rate on the order of 0.01% requires a training data set of tens of thousands of labeled training examples. Since training data preparation can be largely done by humans, the supervised machine learning approach is human labor intensive. On the other hand, in active learning, an exemplary intelligent agent chooses the data from which it learns. Active learning is interactive between the agent and the human expert/operator, and the agent makes each data choice based on the response of the human expert/operator to the agent's prior data choices.

A potential downside of active learning vis-à-vis supervised learning is that implementation of active learning requires a much more substantial engineering investment. Development of an active learning approach makes sense only if large training data sets for supervised learning are prohibitively expensive to prepare, or such large training data sets are simply unavailable. This limitation on training data applies to CGS fusion/diffusion agents operating in complex physical environments. Because of the enormous variety of operational or battlespace configurations and mission plans, training data sets to support a supervised learning approach are simply unavailable, and the CGS information fusion and control diffusion agents must utilize an active learning approach. If CGS active learning persists throughout mission execution, then the active learning approach becomes a principal mechanism by which an exemplary CGS human-machine interface is implemented. The exemplary active learning undertaken by the CGS information fusion and control diffusion agents is managed by the CGS OI agents 85. The primary functionality of the swarm's OI agents 85 is management of fusion/diffusion agent active learning.

An exemplary type of active learning used in various embodiments of the invention include augmenting active learning with advice-based learning in what is termed active advice-seeking systems. Improved capability in various embodiments that include active advice seeking includes: (1) An exemplary intelligent agent (e.g., Situation Assessment 71, Threat Assessment 81, Integrated Engagement Control 73, Mission Control 91) may solicit advice that applies not only to a single training datum, but advice that applies to an entire region of input features space (e.g., data in various databases that are input into a given agent such as Object State Vectors database 65 information that is input into the SA Agent 71). Hence, active advice-seeking may reduce the number of queries that need to be issued by an intelligent agent. (2) Instead of responding with a single piece of advice (e.g., description of a specific training datum (e.g., an object state vector 65) for a particular object), the human operator may respond to the OI Agent 85 with advice or information vectors that can include a more expressive description of an entire region of feature space (e.g., data in given databases that is input into a given agent (all objects flying at greater than 500 mph are designated as having a specific status stored in an Situation database 65; all objects within a geographic area are associated with a given status (friendly, authorized, unauthorized, etc) therefore the exemplary advice is more general; another example: high interest in objects with specified attributes and low interest in objects with other attributes). Exemplary advice can be more general, accommodating the human operator's general preferences, and applicable not only to one but multiple training data. This exemplary broader and more flexible active advice-seeking approach is particularly appropriate for complex domains of interest for which learning from only single examples are impractical and ineffective. A strength of human intelligence is its ability to generalize within the context of complex domains, and active advice-seeking enables the human operator to broadly characterize entire regions of input space for the benefit of the intelligent agent.

In the active advice-seeking paradigm, an agent's learning algorithm can target entire regions of input space in which its knowledge is deficient.

A combination of active learning and supervised learning is used in various embodiments. Embodiments of the invention include a combination of active learning and supervised learning. In at least some embodiments, supervised learning is used at some levels and active learning is used at other levels. For example, supervised learning can be used level zero and level one agents (see FIGS. 5CA and 5CB: Feature Assessment Agent 41A, Object Assessment Agent 61 for information fusion (IF) agents; for control diffusion agents, Sensor Control Signaling Agents 42A/42B/42C, etc, Platform Control Signaling Agents 44A, Weapon Control Signaling Agents 43A, Weapon Control Agents 53, Platform Control Agents 52, Sensor Control Agents 51, etc). For level two agents, active learning is used (e.g., Situation Assessment Agents 71, Threat Assessment 81 for IF agents; for control diffusion, Integrated Engagement Control Agents 73 and Mission Control Agents 91).

Active Learning Models for Information Fusion and Control Diffusion. In various embodiments, "feature" can be used with two distinct meanings, which may be inferred from context. Note that the term feature can be used differently in the AI community vs the information fusion (IF) community. These two communities "grew up" separately and thus ended up using some terms somewhat differently and there has not yet been a resolution of their use of the same term(s) in some areas. Embodiments of the invention bring together these two communities in certain areas in order to produce various embodiments of the invention therefore a discussion of at least this term (e.g., "feature") is needed to disambiguate this term.

First, in at least some embodiments the term "feature", when appearing in the phrase "battlespace feature", the term "feature" can refer to a pattern of sensor pixels derived from an exemplary battlespace. "Feature assessment" or "feature extraction" can refer to information fusion (IF) processing at level zero (e.g., a level within a hierarchy of pattern recognition (e.g. level zero looks for patterns among pixels). In contrast, level one agents may look for patterns among features identified by a feature assessment agent 41A. A "level two" agent (e.g., Object Assessment Agent 61) may look for patterns among objects which are made up of patterns of among features. A level three agent (e.g., Situation Assessment Agent 73) may look for patterns in situations that are made up of various objects stored in a situation data store (e.g., Object Distributed Database 65).

Second, the word "feature," often appearing in the phrases "feature space" and "feature vector," refers to a variable or parameter used to characterize data within an array of values. A feature in this context can be represented by a single dimension within a multidimensional feature space. Feature vector refers to a point or tuple in feature space. "battlespace feature." The word "feature" in this exemplary context can primarily be used in the sense of "feature space" or "feature vector."

Information fusion can be accomplished using a structure/weight-learning probabilistic logic model, also sometimes known as a SRL model. An IF SRL model seeks, first, to recognize a complex pattern formed among multiple feature vectors within an input feature space, and second, to output a new higher-level feature vector characterizing these patterns. The output feature vector essentially labels the pattern formed by the multiple input feature vectors. The completed output vector itself becomes a feature vector in the next higher-level feature space.

Generally, agents at different levels are accessing different databases which effectively store different "levels" of information (pixel level information which is fused and deposited into a feature data store which is then processed by another agent; at a next level, features are processed to generate object information and stored in an object store and so on to aggregate information into higher level types (information fusion); on the diffusion side, agents take high level information and decompose high level objectives into low level actions based on different levels of IF). Each level of IF or diffusion (agents) pulls level from different types of data stores.

Referring to FIGS. 5CA and 5CB, in particular, an exemplary OI SIMD Agent 85 is provided on each UxS 3 which collectively operate on each UxS 3 within a force tactical group 34 (See FIG. 7A) which monitors for inputs from the Operator Control Station 33 (See FIG. 2). The OI Agent 85 receives threat vectors DB 83A then receives/stores High Level Mission Objective (HLMO) (see below for details) which are then stored in the HLMO SDD 89. In at least some embodiments, each force/tactical group within the CGS SoS hosts one OI agent 85.

As discussed in more detail in FIGS. 5CA and 5CB, an exemplary OI agent 85 interacts with several IF agents (71, 81) and several control diffusion agents (73, 91) to receive operator advice via an advice-seeking, active learning framework or implementation. For example, an exemplary force/tactical group's OI agent 85 can perform exemplary advice seeking interaction. An exemplary OI Agent 85 can periodically access the swarm-distributed Threat Vector database 83, analyse threat vectors 83A formulated/updated by the force/tactical group's TA information fusion (IF) SRL agent 81 (e.g., using Markov Logic Network system), and prepare a graphical/textual/aural presentation of these impacts/threats to the human operator (e.g., via a display). Another advice seeking interaction can be performed by an exemplary force/tactical group's OI Agent 85 that can, from time to time, receive an active advice-seeking situational query from the force/tactical group's Level 2 and 3 agents (e.g., SA IF SRL agent 71) and generate a graphical/textual/aural presentation of this query intended for the human operator via an output device (e.g., display (not shown)). The exemplary OI Agent 85 will subsequently receive the human operator's response/preference with respect to this situational query. The OI agent 85 will relay the operator's response/preference back to the asking agent (e.g., Situation Assessment IF SRL agent 71). Another advice seeking interaction can be performed by an exemplary force/tactical group's OI agent 85 that, from time to time, receives an active advice-seeking threat/impact query from other Level 2 or Level 3 agents (e.g., the force/tactical group's TA IF SRL agent 81), and will prepare a graphical/textual/aural presentation of this query intended for the human operator. The OI agent 85 will subsequently receive the human operator's response/preference with respect to this threat/impact query. The OI agent 85 will relay the operator's response/preference back to the requesting TA IF SRL agent 81. Another advice seeking interaction can be performed by an exemplary force/tactical group's OI Agent 85 that, from time to time, receives an active advice-seeking mission planning query from another Level 2 or Level 3 agent (e.g., the force/tactical group's MC CD SRL agent 91) and then generate a graphical/textual/aural presentation of this query intended for the human operator. The exemplary OI agent 85 will subsequently receive the human operator's response/preference with respect to this user or operator mission-planning query. The OI agent will relay the operator's response/preference back to the requesting MC CD SRL agent 91. Another advice seeking interaction can be performed by an exemplary force/tactical group's 34 OI agents 85 that, from time to time, receives an active advice-seeking integrated engagement-planning query from the force/tactical group's Integrated Engagement Control CD SRL agent 73, and will prepare a graphical/textual/aural presentation of this query intended for the human operator. The OI agent 85 will subsequently receive the human operator's response/preference with respect to this integrated engagement-planning query. The OI agent will relay the operator's response/preference back to the (IEC) CD SRL agent 73.

Referring to FIGS. 5CA and 5CB, control diffusion processing tasks continue via MC CD Agent 91 that receives HLMOs from the HLMO swarm database 89. One overall intended effect of an exemplary swarm mission is a transition of a battlespace from its pre-mission state to a goal state desired by the human operator at mission end. A HLMO is one of several distinct stages or steps within this transition. Like plan actions, a HLMO is specified by its preconditions and effects. Like actions, HLMOs are subject to ordering constraints and to pairwise causal linkage. The HLMO set may be totally or partially ordered, depending upon the needs and wishes of the human operator. Unlike lower level actions, the HLMO set does not specify how the swarm sensors, weapons, UxS platforms, and force/tactical groups are to bring about the desired battlespace transition, but only what the transition steps should look like. The attributes or parameters of a HLMO are further discussed below.

In a cohort of MC agents 91 aboard an exemplar CGS, each MC agent can be hosted by one force/tactical group of UxSs, participate in repeated play of a game to determine which MC agent decomposes which HLMO stored in the swarm-distributed HLMO database based on a utility function described in more detail later. Each $a_i$ is a single HLMO stored in the HLMO database shared with the swarm's other MC agents. The $i^{th}$ MC agent seeks to maximize its utility by its choice of $a_i$. Note that the $i^{th}$ MC agent's utility depends also upon the choices contained in the set $a_{-i}$ of all the other MC agents in the swarm of force/tactical groups. Furthermore, the $i^{th}$ MC agent's utility depends upon a subset of threat vectors contained in the swarm-distributed threat vectors (TV) database, with subset members denoted $V_i$. This subset of threat vectors is directly relevant to the $i^{th}$ force/tactical group, where relevancy has been determined by the $i^{th}$ threat assessment (TA) agent. Because all MC agents 91 contribute to the swarm-distributed mission plans (MP) database 79, overall swarm mission planning is accomplished as an aggregation of self-interested mission planning efforts by each individual force/tactical group. This dynamic is analogous to market economist Adam Smith's invisible hand which leads to unintended benefits for the entire swarm when individual force/tactical groups pursue their respective self-interest.

The following considerations regarding exemplary HLMO attributes assess this relevancy. The ambiguity of these considerations suggests the mathematical treatment of MC agent utility functions should include fuzzy logic approaches. For example: Are the effect flags of this HLMO set as not-achieved? Is the location of the UxS force/tactical group hosting the $i^{th}$ MC agent relatively near the geospatial location of the region throughout which the specific HLMO effect is to occur? Is this HLMO's region located in a domain in or about which the force/tactical group hosting the $i^{th}$ MC agent may maneuver? Do the current characteristics of the HLMO's domain permit quick accessibility by the $i^{th}$ MC agent's force/tactical group? Are the specified effects of this HLMO directly achievable with the contribution of the sensing and engagement capabilities of the $i^{th}$ force/tactical group? Does this HLMO address or counter or neutralize threats relevant to the $i^{th}$ force/tactical group? Has a prior update this HLMO been decomposed by $i^{th}$ MC agent? Has the human operator recently updated this HLMO? Are the precondition flags of this HLMO set as achieved? Is this HLMO overdue for decomposition? Positive answers to these questions suggest considerable relevancy of this HLMO to the $i^{th}$ MC agent 91. Negative answers suggest the $i^{th}$ MC agent's 91 utility may increase if a different MC agent 91 selects this HLMO for decomposition into a mission plan. It may happen that the respective utilities of two or more MC agents 91 are optimized by the same choice of HLMO, in which case the MC agents 91 undertake distinct decompositions of the HLMO, which may differ because of different threat relevancies for each MC agent 91.

A swarm's resources are its force/tactical groups. Accordingly, a swarm mission plan (MP) describes the deployment and activities of the swarm's force/tactical groups throughout mission execution. Except for special circumstances, a MP action typically will not specify which particular force/tactical group should execute the action. Which specific force/tactical group executes which particular MP action is determined by the game theoretic repeated play among integrated engagement control (IEC) agents 73 described below. A MP action will involve maneuver, positioning, posturing, sensing, and/or engagement activities of a force/tactical group. A swarm MP is an assembly or stitching together of all the individual HLMO decompositions produced by the swarm's MC agents. These HLMO decompositions and the assembled MP are stored in the swarm-distributed MP database. To form the complete MP, the various HLMO decompositions are stitched together according to the ordering constraints and causal links of the original HLMOs. The MP action set may be totally or partially ordered, depending upon the ordering constraints and causal links of the HLMOs and within the HLMO decompositions. Exemplary attributes or parameters of a MP action can include: MP action ID and timestamp of most recent update; geospatial location within the battlespace of the specific MP action effects (region throughout which the specific MP action effects are to occur); MP action effects location domain and current domain characteristics; MP action category or type/classification; current threat vector(s) (TV ID) in the swarm-distributed TV database that motivate or may be addressed by this MP action; MP action preconditions (conjunction of function free positive literals); MP action effects (conjunction of function free positive or negative literals); ordering constraints of this MP action with respect to other MP actions; pairwise causal constraints of this MP action to other MP actions; status of MP action precondition flags indicating if the action's preconditions have been achieved; status of MP action effect flags indicating if the action's effects have been achieved; MC agent update history (when this MP action was updated during an HLMO decomposition and by which MC agent); integrated engagement control (IEC) agent 73 decomposition history (when this MP action was decomposed into an integrated engagement plan (IEP) and by which IEC agent).

Exemplary $i^{th}$ IEC agent's 73 utility is higher when the MP action $a_i$ is relevant to the $i^{th}$ force/tactical group, and when the set $a_{-i}$ includes MP actions less relevant to the $i^{th}$ force/tactical group, considering the relevant current situation vector(s) $V_i$. On the other hand, if the set $a_{-i}$ contains MP actions more relevant to the $i^{th}$ force/tactical group than the MP action $a_i$, considering the relevant current situation vector(s) $V_i$, then the $i^{th}$ IEC agent's 73 utility is lower. We may state this as follows. Assume two MP actions labeled $a_i$ and 4 where the former is more relevant to the $i^{th}$ force/tactical group than the latter, considering the relevant current situation vector(s) $V_i$. Then: $U_i(a_i, a_{-i}; V_i) \geq U_i(a_i', a_{-i}; V_i)$. Now assume two MP action sets labeled $a_{-i}$ and $a_{-i}'$, which differ by one and only one member MP action selected by the $j^{th}$ IEC agent labeled $a_j$ and $a_j'$ respectively, where MP $a_j$ is more relevant to the $i^{th}$ force/tactical group than $a_j'$. Then: $U_i(a_i, a_{-i}; V_i) \leq U_i(a_i, a_{-1}'; V_i)$.

Hence, the exemplary $i^{th}$ IEC agent's 73 utility function $U_i(a; V_i)$ returns a higher value when other IEC agents 73 focus on decomposing MP actions not relevant to the $i^{th}$ force/tactical group, considering the relevant current situation vector(s) $V_i$. The relevancy of a MP action to the $i^{th}$ IEC agent 73 derives from the self-interest of the force/tactical group of the $i^{th}$ IEC agent 73. The extent to which a MP action could be immediately achieved by an operational capability of the force/tactical group of the $i^{th}$ IEC agent 73, coupled with the extent to which the MP action addresses or responds to a timely situation(s) relevant to the $i^{th}$ group, determines the relevancy of the MP action to the $i^{th}$ IEC agent 73. Each IEC agent 73 develops a short-term operational plan for its own force/tactical group, which addresses or responds according to a current situation relevant to the group, which the agent stores in the group-distributed integrated engagement plans (IEP) database 69. The following considerations regarding MP action attributes assess this relevancy, which are similar to relevancy considerations regarding HLMO attributes but more spatially localized and on a shorter and more immediate time scale. The ambiguity of these considerations suggests the mathematical treatment of IEC agent 73 utility functions should include fuzzy logic approaches: Are the effect flags of this MP action set as not-achieved? Is the current location of the UxS force/tactical group hosting the $i^{th}$ IEC agent 73 within the geospatial region throughout which the specific MP action effect is to occur? Is this MP action's region located in a domain in which the force/tactical group hosting the $i^{th}$ IEC agent 73 is maneuvering? Do the current characteristics of the MP action's domain permit immediate accessibility by the $i^{th}$ IEC agent's 73 force/tactical group? Are the specified effects of this MP action immediately achievable with the contribution of the sensing and engagement capabilities of the $i^{th}$ force/tactical group? Does this MP action immediately address or respond to the current situation vectors relevant to the $i^{th}$ force/tactical group? Has a prior update this MP action been decomposed by $i^{th}$ IEC agent 73? Has a MC agent 91 recently updated this MP action? If so, was it the $i^{th}$ MC agent 91? Are the precondition flags of this MP action set as achieved? Is this MP action overdue for decomposition? Positive answers to these questions suggest considerable relevancy of this MP action to the $i^{th}$ IEC agent 73. Negative answers suggest the $i^{th}$ IEC agent's 73 utility may increase if a different IEC agent 73 selects this MP action for decomposition into an integrated engagement plan. It may happen that respective utilities of two or more IEC agents 73 are optimized by the same choice of MP action, implying two or more force/tactical groups are volunteering to execute this MP action, in which case the game theoretic play must prevent such duplication of effort and ensure only one IEC agent 73 decomposes the current update of the MP action.

An exemplary force/tactical group's resources can include its sensor suites. Weapon or effector suites, and platforms on which are mounted these suites. An integrated engagement plan (IEP) describes the deployment and activities of the sensing suites, fires or effector suites, and platforms within a single force/tactical group throughout the execution of a single MP action. An exemplary IEP action can include three action types: sensing action which addresses a sensor suite aboard a single UxS; fires action which addresses a weapon or effector suite aboard a single UxS; and platform action which addresses a single UxS platform. The exemplary MP decomposition library, reference resource used by IEC agents 73 in constructing IEPs, supports MP action decomposition into IEPs including these three exemplary action types. An exemplary IEP action in this embodiment will not specify which particular sensor suite, weapon or effector suite, or platform within the force/tactical group should execute the IEP action. Within the exemplary IEP, several simultaneous actions will coordinate sensing, fires/effects, and platform control among multiple sensor suites, weapon or effector suites, and platforms within the group. Hence, an IEP of necessity will be a partial-order plan with parallel actions (multiple actions sharing the same ordering constraints and causal links). This exemplary MP action decomposition comprising the exemplary IEP is stored in the group-distributed IEP database 69. Exemplary attributes or parameters of an IEP action are further described below.

Operation of SC Agent 51, Weapon Control (WC) Agent 53, and Platform Control (PC) Agents 52 all engage in their own games between the same types of agents within a given force/tactical group. Note a nearly identical discussion pertains to the cohort of WC agents 53 and the cohort of PC agents 52 likewise aboard the force/tactical group, with each WC agent 53 and PC agent hosted by one UxS. Thus, this discussion provide an overview of the SC Agents 51 but in at least one embodiment one can take this discussion of SC Agents 51 and replace the "SC Agents" term with "WC Agent 53" or "PC Agent 52"

In particular, an exemplary cohort of SC agents 51 is provided aboard the exemplary force/tactical group, wherein each SC agent 51 is hosted by one UxS, participate in repeated play of a game to determine which SC agent 51 decomposes which IEP sensing action stored in the group-distributed integrated engagement plans (IEP) database 69. Details on gaming for these agents are provided below. In at least some embodiments, a single IEP sensing action is stored in the IEP database 69 that is shared with the force/tactical group's other SC agents 51. For a WC Agent 53 a fires control action would be stored in the IEP database 69. SC Agent 51 also receives object state vector (OSV) data from the OSV database 65 and further is used in decomposition tasks performed by the SC Agent 51. A P/S/W control agent (52, 51, 53) (an instantiation of the <individual capability control> abstraction or subclass of the <control diffusion> class, affiliated with one or more P/S/Ws 52, 51, 53) accesses the integrated engagement plans store for a new/updated integrated-engagement-level action from which it develops a new P/S/W control plan, or updates an existing P/S/W control plan. P/S/W control plans are sets of lower-level actions intended to maneuver, position, orient, and activate a P/S/W, with the plan's actions equivalent to the integrated-engagement-level action(s). A P/S/W control agent 52, 51, 53 can be a HTN planning agent at a lower level of the relevant hierarchy. The exemplary P/S/W control plan's initial state can be set as the integrated-engagement-level action's precondition, and the plan's goal can be expressed by the integrated-engagement-level action(s). The exemplary P/S/W control agent 52, 51, 53 searches the individual capability plan library, which contains methods for the decomposition of integrated-engagement-level actions into partial-order P/S/W control plans. The exemplary P/S/W control agent 52, 51, 53 also searches the OSV store(s), enabling the respective agent to sense states of objects within its battlespace region and the effects of its actions, and to engage in re-planning as needed. The P/S/W control agent 52, 51, 53 draws upon the data store of own SoS engagement capabilities in order to constrain individual capability planning given functional limitations on SoS engagement resources.

Sensor Control Signaling (SCS) Agents 42. At Level 0, a one-to-one correspondence exists between platform sensors and their associated SCS Agents 42. A set of N={1, 2, . . . , n} SCS Agents 42 are provided (e.g., 42A, 42B, etc). These exemplary SCS Agents 42 decompose relatively high-level planned sensor actions into specific sensor control signals that operate specific sensors. Exemplary SCS Agents 42 interact with each other to extract planned sensor actions from a local sensor control plans (SCP) database 45B. This exemplary interaction takes the form of a game (further discussed below) in which the SCS Agents 42 are the players. Exemplary game resources can include a set of planned sensor actions contained in the SCP database, denoted R SCP Weapon Control Signaling (WCS) Agent 43 (e.g., 43A, 43B, etc). At level 0, a one-to-one correspondence exists between a weapons (or effectors) and their associated WCS agents 43. A platform can have a set of N={1, 2, . . . , n} WCS Agents 43. These WCS Agents 43 decompose relatively high-level planned weapon actions into specific weapon control signals. These WCS Agents 43 interact with each other to extract planned weapon actions from a local weapon control plans (WCP) database 45C. Each WCS Agent 43 transforms these relatively high-level actions into specific control signals for its associated weapon or effector. Interactions between WCS Agents 43 takes the form of a game in which the WCS Agents 43 are the players. The discussion here of the WCS agents continues analogously to exemplary discussions of SCS agents 42. WCS Agent 43 global objectives can include an objective that most important planned weapon actions in a given WCP database 45C are optimally allocated to a suitable weapon(s) on a given platform. Therefore, various WCS Agents 43 utility functions $\{U_i\}_{i \in N}$ and update policies $\{\pi_i\}_{i \in N}$ are designed to work together to optimize results.

Platform Control Signaling (PSC) Agent 44A. At Level 0, one PCS agent is provided. The PCS agent 44A decomposes relatively high-level planned platform actions into specific platform control signals. This PCS Agent 44A extracts planned platform actions from its local platform control plans (PCP) database. The sole PCS Agent 44A does not play games with other same type agents unlike at least some other agents.

Feature Assessment (FA) Agents 41. At Level 0, a one-to-one correspondence exists between a platform's sensors and their associated FA agents (e.g., 41A, 41B, etc). A platform can have a set N={1, 2, . . . , n} of FA agents 41. These exemplary FA Agents 41 compose feature vectors from patterns in raw sensor output data. These FA Agents 41 interact with each other to update a local feature vectors (FV) database 45A. This exemplary interaction takes the form of a game in which the FA Agents 41A, 41B, etc are the players. The exemplary game resources include a set of feature vectors contained in the local FV database 45A, denoted R^FV. A subset of these resources, denoted A_i, can be allowable resource selections of the i^th FA agent 41.

Object Assessment (OA) Agents 61. OA Agents 61 are another information fusion agent. A single Level 1 OA agent is provided on a given platform. An exemplary force/tactical group can be defined as a set N={1, 2, ..., n} of UxSs that each host a single OA Agent 61. An exemplary OA Agent 61 composes object state vectors from patterns of feature vectors stored in a local FV database 45A. The n OA Agents 61 in an exemplary force/tactical group of n UxSs interact with each other to update a group-distributed object state vectors (OSV) database 65, which is a distributed database accessible to the OA Agents 61 within the force/tactical group. Exemplary interactions can take the form of a game in which the OA Agents 61 are the players. The exemplary game resources include a set of OSVs contained in the group-distributed OSV database 65.

Situation Assessment (SA) Agents 71. An exemplary force/tactical UxS group hosts a single Level 2 SA Agent 71. This SA Agent 71 utilizes computing resources of all the UxSs in the force/tactical group, and is an AI agent based on parallel message-passing processes. Each exemplary SA Agent's 71 computational load is shared by all UxSs in a force/tactical group. Because of its parallel design, this SA Agent 71 is robust to marginal loss of members of a force/tactical group. A swarm includes of a set N={1, 2, ..., n} of force/tactical groups of which a given UxS is one, each hosting a single SA Agent 71. A group's SA Agent 71 composes situation vectors from patterns of OSVs within a group-distributed OSV database 65. The n SA Agents 71 in an entire swarm of force tactical groups interact with each other to update the swarm-distributed situation vectors (SV) database 75, which is a distributed database accessible to the swarm's SA Agents 71. This exemplary interaction includes a game in which the SA Agents 71 are the players. The exemplary game resources include a set of situation vectors contained in the swarm-distributed SV database 75.

Threat Assessment (TA) Agents 81. An exemplary force/tactical UxS group hosts a single Level 3 TA Agent 81. This exemplary TA Agent 81 utilizes the computing resources of all the UxSs in a force/tactical group, and is an AI agent based on parallel message-passing processes. While a UxS hosts one of these exemplary parallel TA Agents 81 processes, the exemplary TA Agent's 81 computational load is shared by all the UxSs in a force/tactical group. Because of its parallel design, exemplary TA Agents 81 are robust to marginal loss of members of a given force/tactical group. The exemplary swarm in its entirety can include a set N={1, 2, ..., n} of force/tactical groups, each hosting a single TA Agent 81. A group's TA Agent composes threat vectors from patterns of situation vectors contained in the swarm-distributed SV database 71. The n TA Agents 81 in a swarm of force tactical groups interact with each other to update the swarm-distributed threat vectors (TV) database 83, which is a distributed database accessible to the swarm's TA Agents 81. This exemplary interaction can include a form of a game in which the exemplary TA Agents 83 are the players. The game resources can include the set of threat vectors contained in the swarm-distributed TV database 83.

Referring to FIG. 5C1, a diagram showing control diffusion (CD) agents are shown along with CD Agent action inputs and action outputs. An exemplary MC Agent receives HLMOs and outputs mission actions forming a plan. An exemplary IEC agent receives actions taken from a mission plan and outputs integrated engagement actions forming a plan. An exemplary SC Agent receives sensing actions taken from an integrated engagement plan and outputs sensor control actions forming a plan. An exemplary WC Agent receives fires action(s) taken from an integrated engagement plan and outputs weapon control actions forming a plan. An exemplar PC Agent receives platform actions taken from an integrated engagement plan and outputs platform control actions forming a plan. An exemplary SCS Agent receives action(s) taken from a sensor control plan and outputs sensor control signals (atomic actions). Exemplary WCS Agents receive action(s) taken from a weapon control plan and output weapon control signals (atomic actions). Exemplary PCS Agents receive actions taken from a platform control plan and output platform control signals (atomic actions).

Referring to FIG. 5C2, exemplary information fusion (IF) models, inputs, and outputs are described. Exemplary battlespace FA agents receive sensor pixel vectors forming a pattern and output battlespace feature vectors. Exemplary OSA Agents receive battlespace feature vectors forming a pattern and output object state vectors. Exemplary SA Agents receive OSVs forming a pattern and output SVs. Exemplary TA Agent receive SVs forming a pattern and output threat vectors.

Referring to FIG. 5C3, exemplary IF and CD SRL model attributes are provided. IF input/output include: feature vectors; pattern recognition method—inputs a set of lower-level feature vectors, and outputs a higher-level feature vector termed a pattern; structure—first-order logical formulae constituting pattern recognition methods; weights—relative importance of logical formulae and pattern recognition methods; and machine learning methodology—learning model structure and weights using RFGB active advice-seeking if-then rules—query triggered by high-entropy weight distribution; query seeks human operator's pattern recognition method preferences.

Exemplary CD SRL model attributes include: input/output—actions; action decomposition method—inputs a higher-level action, and outputs a set of lower-level actions termed a plan; structure—first-order logical formulae constituting action decomposition methods; weights—relative importance of logical formulae and action decomposition methods; and machine learning methodology—learning model structure and weights using RFGB active advice-seeking if-then rules—query triggered by high-entropy weight distribution; query seeks human operator's action decomposition method preferences.

Figure 5D:
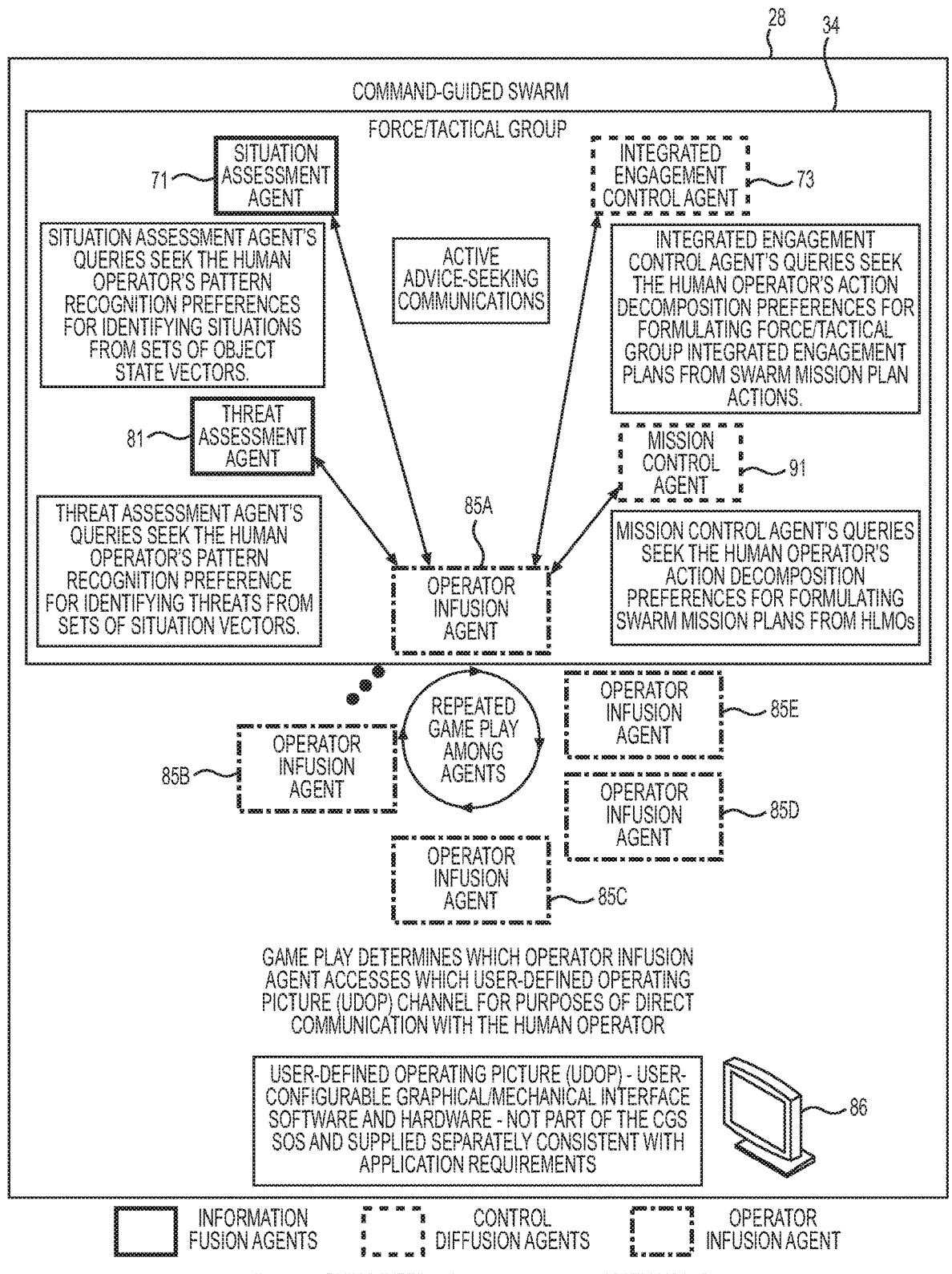
FIG. 5D an exemplary block or object view showing active learning interactions or communications view of various agents.

Referring to FIG. 5D, a diagram showing active learning interactions or communications and relationships between Level 2 and 3 Agents (e.g., IF Agents (e.g., 71, 81) and Control Diffusion agents (e.g., 73, 91)) and Operator Infusion Agent(s) 85 is provided. For various human-in-the-loop needs, exemplary force/tactical group's OI agent will interact with the OI agents 85A-N of the other force/tactical groups within the CGS SoS to access the human operator. The interaction among the CGS population of OI agents comprises game theoretic repeated play for access to the human operator. In particular, a number of Operator Infusion Agents 85A, 85B, 85C, 85D within a force tactical group 34 are shown playing a game which determines which Operator Infusion OI Agent 85A-N population plays a game that analyzes/determines which OI Agent 85 gets to use a user defined operating picture or UDOP channel for purposes of direct communication with one or more human operators. This OI Agent 85 game helps reduce or optimize a cognitive load on a given operator to reduce or manage information overload or demands on a given user. An exemplary UDOP 86 can be a user configurable graphical/mechanical interface software and hardware that is not part of an exemplary CGS. Multiple users provided with their own UDOP can be provided for. One or more SA Agents 71 can interact with a selected OI Agent (one of 85A-N). For example, SA Agents 71 can include machine instructions that request operator or user information preferences or pattern recognition preferences for identifying situations from sets of object state vectors through an OI Agent 85. Exemplary TA Agent 81 queries through an exemplary OI Agent 85 seek human operator guidance on pattern recognition preferences to be used in identifying threats from sets of situation vectors. IEC Agents 73 can request operator action decomposition preferences for formulating force/tactical group integrated engagement plan from swarm mission plan actions. MC agents 91 queries can seek human operator action decomposition preferences for formulating swarm mission plans from high level mission objectives.

Figure 6A:
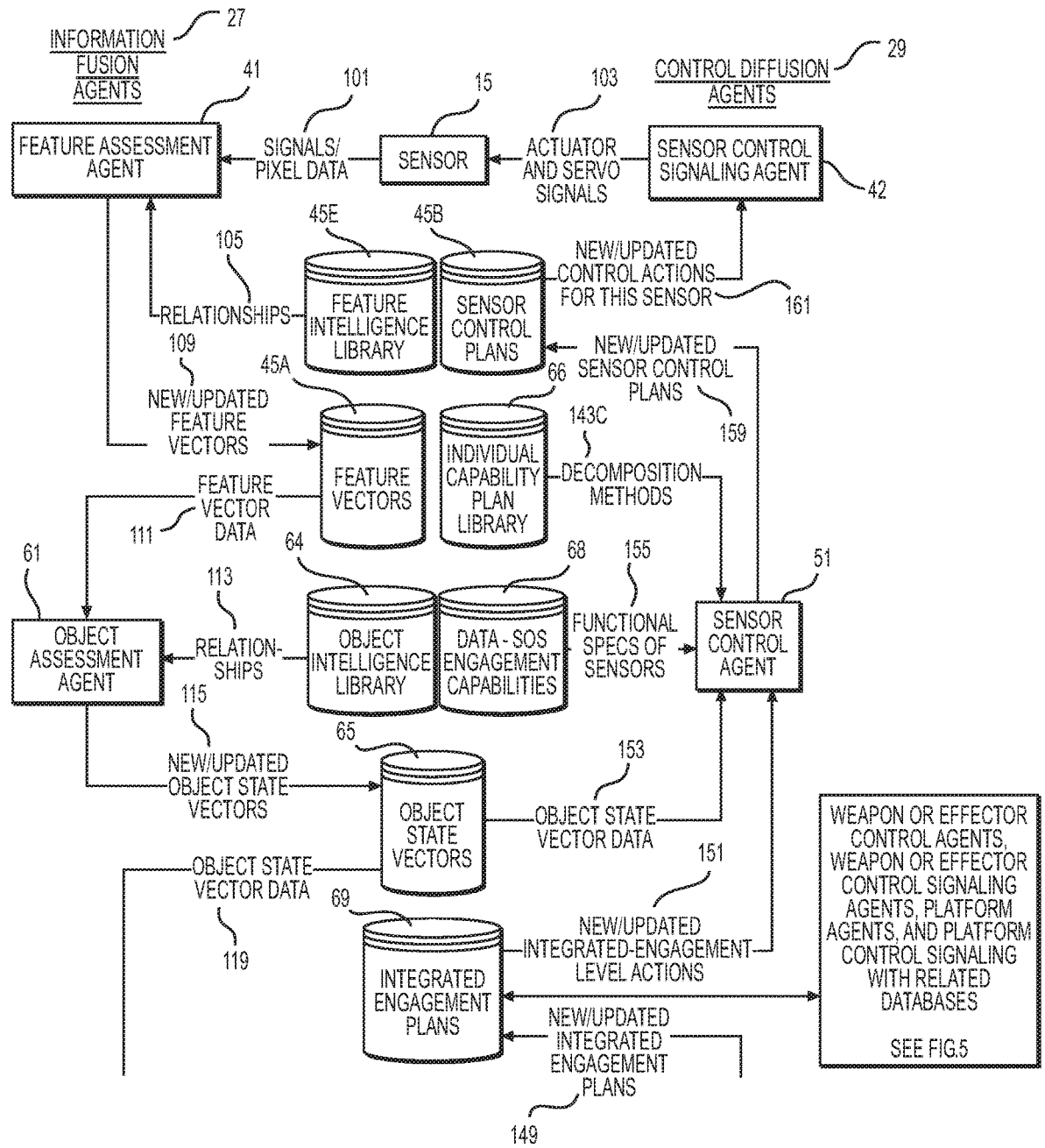
FIGS. 6A and 6B show multiple views of a system architecture with various agents and databases showing data flow between agents and databases with a focus on information fusion agents and control diffusion agents.
Figure 6B:
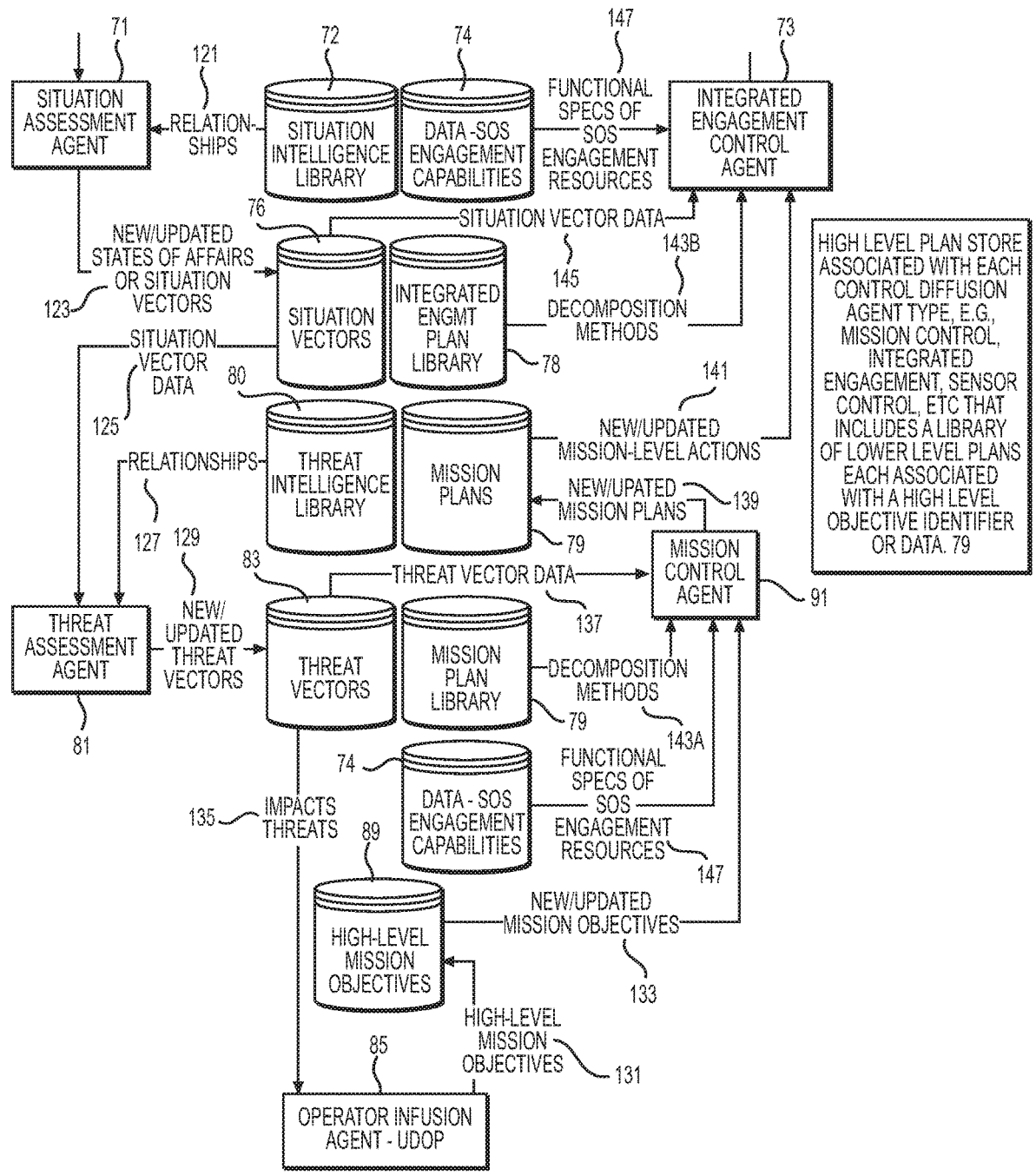

FIGS. 6A and 6B show another view of a system architecture with various agents and databases showing some types of data flow between agents and databases with a focus on information fusion agents and control diffusion agents. Note that FIGS. 6A and 6B do not show active learning or requests from agents or data passed between agents in support of active learning or requests from agents. Also note that FIGS. 6A and 6B do not show details of games which various agents play amongst themselves to make certain types of decisions. An OI Agent/UDOP 85 is used by an operator to input high level mission objectives 131 which are stored into a HLMO database 89. The OI Agent UDOP system 85 receives impact/threat data 135 from the TV database 83 which populates a situational awareness user interface that enables an operator to understand a situation or effects within a battlespace. The MC Agent 91 receives HLMOs 133 from the HLMO database 89, functional specs of system of system (SoS) engagement resources 147 from a data—SOS Engagement Capabilities database 74, mission plans from a Mission Plan library 79, and threat vector data 137 from a mission plan library. The MC Agent 91 outputs new or updated mission plans 139 into a Mission Plan database 79. An IEC Agent 73 receives new/updated mission-level action data 141 from the Mission Plans database 79, action or task decomposition methods 143B from an Integrated Engagement Plan library 78, situation vectors 145 from a SV database 76, and functional specs of SoS engagement resources data 147 from a Data—SoS Engagement Capabilities database 74 and outputs new/updated integrated engagement plans 149 to an Integrated Engagement Plans library 69. Weapon (or Effector) Control (WC) Agents, Weapon (or Effector) Control Signaling (WCS) Agents, Platform Control (PC) Agents, and Platform Control Signaling (PCS) Agents with related databases receive and store data into the Integrated Engagement Plans database 60. See also FIG. 5. The Integrated Engagement Plans database 69 acts as a high level plan store is for each CD agent type, e.g., MC Agent, IEC Agent, SC Agent, etc that includes a library of lower or more detailed level plans (condition/action) each associated with a high level objective identifier or data 79. A SC Agent 51 receives new/updated integrated engagement level actions 151 from the Integrated Engagement Plan 69 database, OSV data 135 from the OSV database 65, functional specifications of sensors from a Data—SoS Engagement Capabilities database 68, and decomposition methods 143C from an Individual Capability Plan library 66. The SC Agent 51 outputs new/updated sensor control plans that is stored in a Sensor Control Plans database 45B. Each SCS Agent 42 receives new/updated control actions 103 for its related sensor and outputs actuator and servo control signals 103 to each related sensor 15. Sensors 15 output signals/pixel data 101 to FA Agents 41. FA Agent 41 also receives relationship data 105 from a Feature Intelligence library 45E and outputs new/updated feature vectors 109 which is stored on FV database 45A. OA Agent 61 receives feature vector data 111 from the FV database 45A and features to objects relationships data 113 from Object Intelligence library 64 and outputs new/updated object state vectors 115 which are stored the OSV database 65. SA Agent 71 receives object state vector data 119 from the OSV 65 and objects to situation relationships data 121 from Situation Intelligence library 72 and outputs new/updated states of affairs or situation vectors which are stored in the SV database 76. TA Agent 81 receives situation vector data 125 from the SV database 76 and situation to threat relationship data 127 from Threat Intelligence library 80 and outputs new/updated threat vectors 129 which is stored in Threat Vector (TV) database 83.

Figure 7A:
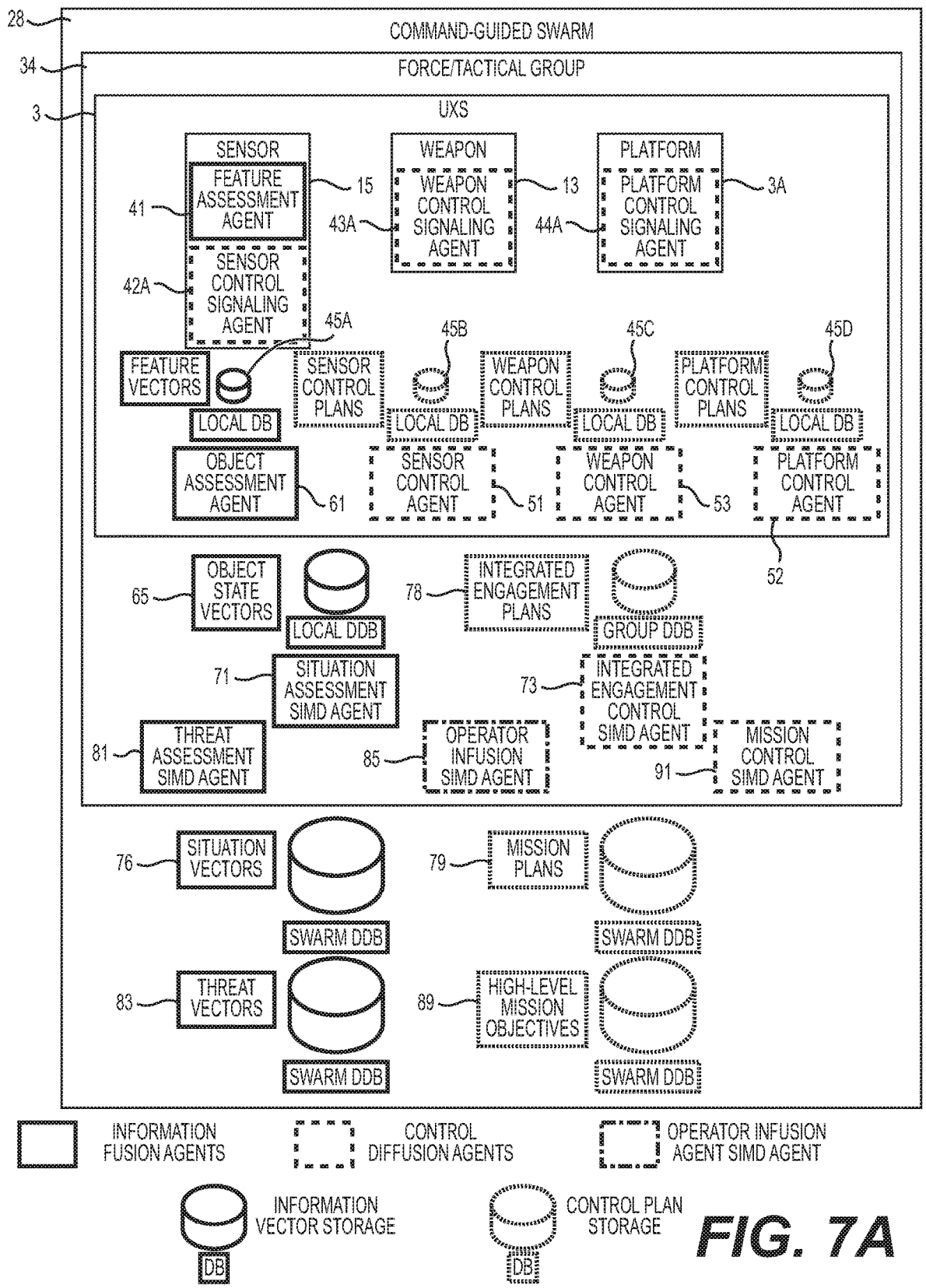
FIG. 7A shows a simplified hierarchical architecture of an exemplary CGS SoS embodiment showing relationships between different agents and databases organized within swarm, groups, and UxS levels.

FIG. 7A shows a simplified logical organization of an exemplary CGS SoS embodiment showing relationships between an exemplary CGS hierarchy with different elements. In this example, a CGS 28 is shown with all swarm elements at a highest level. Within the CGS 29 hierarchy, one or more Force/Tactical Groups 34 are provided. Each Force/Tactical Group 34 each comprises one or more UxS 3. Each UxS in turn comprise a single UxS platform 3 as discussed above. Local databases are within the UxS while distributed databases are shown within the Force/Tactical Group 34 and another set of distributed databases are shown associated with the CGS 28. Likewise, the FIG. 7A drawing shows organizational relationships between agents as well. The FIG. 7A drawing showing hardware, agents, and databases (local, distributed across Force Tactical Groups, and distributed across the swarm) corresponds to elements of FIGS. 4, 5A-5D, and 6 but shows the agents and database organizational groupings in a different viewing format.

Figure 7B:
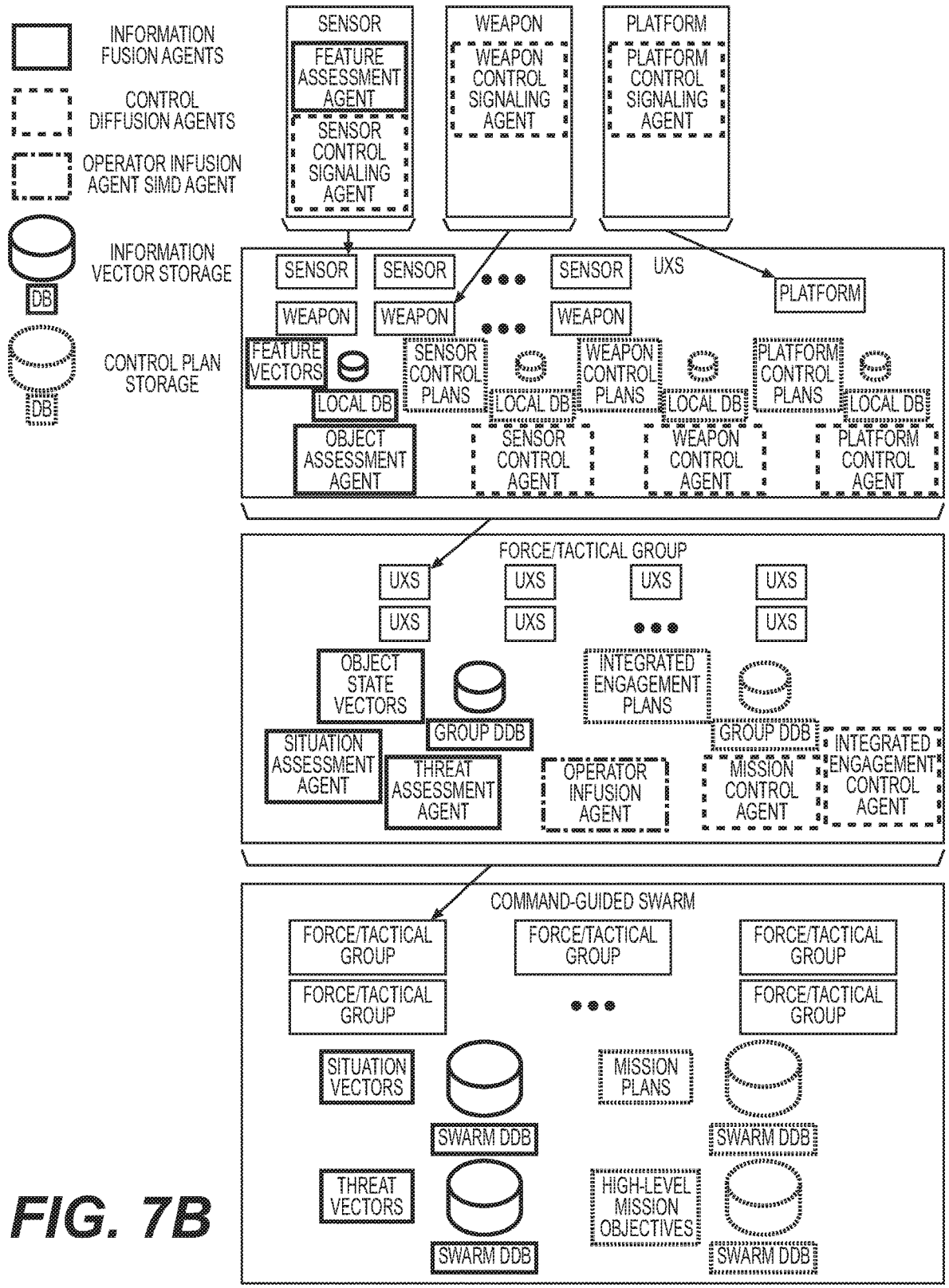
FIG. 7B shows another visualization or way of looking at relationships and groupings of agents and databases across different levels (e.g., swarm, groups, and UxS levels)

FIG. 7B shows another view of relationships of IF, CD, and OF agents with respect to other elements of an embodiment of the invention as well as how they relate to different hierarchical levels of the inventions such as force/tactical group and one or more swarms. IF Agents FA and SCS relate to a specific sensor, a WCS Agent relate to a specific weapon, and PCAs relate to a specific platform along with respective databases and other agents such as OA Agents, SC Agents, WC Agents, PC Agents, etc.

Figure 8G:
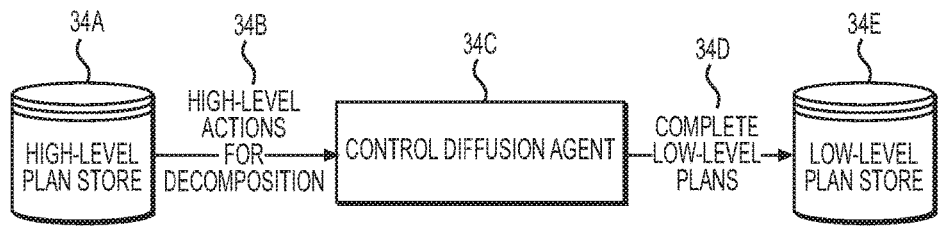
FIG. 8G shows a general overview of control diffusion agents and overview of management/monitoring flow of control between two plan repositories.

FIG. 8A-8H lists various agents and provides additional details about their operation, data inputs, and data output. Referring to FIG. 8A, generally, a collection of exemplary FA agents 41 execute repeated plays of a game that includes placing bids for determining which FA Agent 41 will update feature vectors based on a mathematical FA utility function and feature vector database information until the FA Agent 41 game reaches Nash Equilibrium (which each agent's utility function is optimized where further changes result in one or more FA Agent utility values going down. FA Agents 41 then executes tasks based on game selected feature vectors the FA agent 41 will update. The FA Agent 41 receives inputs (e.g., pixel output) and generates outputs (e.g., FA Agent 41 game selected feature vectors). In particular, a physical sensor outputs pixel vectors into a FA Agent 41. Each pixel vector can include an array of parameters describing an elementary atomic datum of sensing. A pattern of multiple pixel vectors can include a feature, which in turn is described by a feature vector. In a particular example, a FA 41 receives pixel vectors as input, undertake pattern recognition or fusion, and output FA information fusion feature vectors. The cohort of feature assessment agents aboard a single UxS, each exclusively associated with one onboard sensor, participate in repeated play of a game to determine which feature assessment agent updates which feature vector stored in the local UxS feature vector database. An exemplary FA agent 41 executes a game played by a cohort or group of Level 0 feature assessment agents (e.g., FIGS. 2, 41A, 41B, and 41C) for sensor outputs (e.g., 15A, 15B, 15C, etc) on each UxS 3, pattern matching with sensor outputs, and then populating a local feature vectors database (e.g., 45B) with feature vectors 45A within a single UxS (e.g., FIG. 2, 23A; FIG. 3, 23) associated with objects shown in sensor system outputs (pattern matching can be done using systems such as Scale-invariant feature transform (SIFT) which looks for features such as corners, pixel patterns associated with particular shapes, etc). Feature vectors 45 are then sent to an OA Agent on board the UxS 3.

In a particular embodiment, FA agents aboard a single UxS, each associated with one sensor, participate in a game to determine which FA agent updates which FV stored in the local UxS FV database. Associated with the $i^{th}$ FA agent is a utility function $U_i(a)$, which for later convenience may be equivalently denoted $U_i(a_i, a_{-i})$ where the set $a_{-i} = \{a_1, a_2, \ldots a_{i-1}, a_{i+1}, \ldots, a_n\}$. Each $a_i$ is a FV in a database shared with other FA agents. The $i^{th}$ FA agent seeks to maximize its utility by its choice of $a_i$. Note that the $i^{th}$ FA agent's utility depends also upon the choices contained in the set $a_{-i}$ of all the other FA agents. The $i^{th}$ FA agent's utility is higher when the FV $a_i$ is relevant to the $i^{th}$ sensor, and when the set $a_{-i}$ consists of FVs less relevant to the $i^{th}$ sensor. On the other hand, if the set $a_{-i}$ contains FVs more relevant to the $i^{th}$ sensor than the FV $a_i$, then the $i^{th}$ FA agent's utility is lower. We may state this as follows. Assume two FVs labeled $a_i$ and $a_i'$, where the former is more relevant to the $i^{th}$ sensor than the latter. Then: $U_i(a_i, a_{-i}) \geq U_i(a_i', a_{-i})$. Now assume two FV sets labeled $a_{-i}$ and $a_{-i}'$, which differ by one and only one member FV selected by the $j^{th}$ FA agent labeled $a_j$ and $a_j'$ respectively, where FV $a_j$ is more relevant to the $i^{th}$ sensor than $d_j'$. Then $U_i(a_i, a_{-i}) \leq U_i(a_i, a_{-i}')$. Hence, the $i^{th}$ FA agent's utility function $U_i(a)$ returns a higher value when other FA agents focus on updating FVs not relevant to the $i^{th}$ sensor. The relevancy of a FV to the $i^{th}$ FA agent primarily derives from the unique pixel data output of the $i^{th}$ sensor. The extent to which the pixel data of the $i^{th}$ sensor are likely to improve a FV, determines the relevancy of the FV to the $i^{th}$ FA agent. The following considerations regarding feature vector parameters assess this relevancy. The ambiguity of these considerations suggests the mathematical treatment of FA agent utility functions should include fuzzy logic approaches: Is this feature's geospatial location within the $i^{th}$ sensor's current FOV? Is this feature located in a domain accessible to the $i^{th}$ sensor? Do the current characteristics of the domain permit quick and accurate sensing of this feature by the $i^{th}$ sensor? Is the $i^{th}$ sensor capable of reducing the location uncertainty of this feature? Does the spectrum utilized by $i^{th}$ sensor complement the spectra of prior sensing of this particular feature? Is the $i^{th}$ sensor's resolution appropriate given the cross sectional sizing of this feature? Has this feature been previously updated by the $i^{th}$ FA agent, and is the FV now overdue for updating? I.e., is the $i^{th}$ FA agent actively tracking this feature?

Positive answers to these questions suggest considerable relevancy of this FV to the $i^{th}$ FA agent. Negative answers suggest the $i^{th}$ FA agent's utility may increase if a different FA agent selects this FV for updating. If all FVs stored in the local UxS FV database are of limited relevancy to the $i^{th}$ FA agent, then the null or empty FV is presumed most relevant, which may be instantiated by the $i^{th}$ FA agent to represent a new feature. It may happen that the respective utilities of two or more FA agents are optimized by the same choice of FV, in which case the agents may successively update this FV. Alternatively, we might formulate a global objective $W(a)$ to be maximized for the entire sensor suite of the UxS, and define the FA agent utility functions $U_i(a)$ in terms of $W(a)$ as follows: $U_i(a) = W(a) - W(a_i^b, a_{-i})$ where $a\_i\hat{\ }b$ is some fixed baseline FV that could be updated by the $i^{th}$ FA agent. This global objective is optimized when the sensors are allocated battlespace features such that aggregate relevancy is optimized for the entire sensor suite of the UxS.

Generally, a collection of exemplary SCS Agents (SCSA), e.g., 42A, 42B, 42C, etc execute repeated plays of a game that includes placing bids for determining which SCSA 42A,B,C, etc will select/decompose one of a number of sensor control actions (where a completed sensor control plan is a collection of selected sensor control actions) stored in the local UxS sensor control plans database 45B based on a SCSA mathematical utility function and Sensor Control Plan database 45B information until the collective SCSA game reaches Nash Equilibrium. SCSA Agents 42 then executes tasks based on game selected sensor control actions the SCSA 42 will update.

A physical sensor 15 can be controlled by sensor servo/actuator control signaling actions (e.g., control inputs to the physical sensor 15 and its control mechanisms that can include servos or actuators). Each sensor servo/actuator control signaling action can include an array of applicability conditions, preconditions, and effects describing elementary datum of sensor control. A pattern of multiple sensor servo/actuator control signaling actions is a sensor control action. Exemplary SCSAs 42 can take sensor control actions as input, undertake action decomposition or diffusion, and output patterns (e.g., plans) of sensor servo/actuator control signaling actions. A cohort of SCSAs aboard a single UxS, each exclusively associated with one onboard sensor, participate in repeated play of a game to determine which SCSA 42 decomposes which sensor control action stored in the local UxS sensor control plans database. In particular, an exemplary SCA 42 can include game system played by a cohort or group of Level 0 sensor control signaling agents (e.g., FIG. 5) for extracting actions from a local sensor control plans database 45B.

Weapon (or Effector) Control Signaling Agent (WCSA) 43 (Control Diffusion Agent). Generally, WCSAs 43 (43A, 43B, 43C, etc) can control various items such as equipment (e.g., 13A, 13B, etc)(e.g., tools of various types) or weapons, etc. Generally, a collection of exemplary WCSAs, e.g., 43A, 43B, 43C, etc execute repeated plays of a game that includes placing bids for determining which WCSAs 43A,B,C, etc will select/decompose one of a number of effector (e.g., weapon) control actions (where a completed effector or weapon control plan is a collection of selected effector or weapon control actions) stored in the local UxS effector or weapon control plans database 45C based on a WCSA mathematical utility function and effector or weapon control plan database 45C information until the collective ECSA game reaches Nash Equilibrium. WCSAs 43A, B, C, etc then executes tasks (e.g., input, output) based on game selected effector or weapon control actions the WCSA 43A, B, C, etc will update.

In particular, an effector, e.g., physical weapon (or non-weapon effector) 13A, 13B, etc, can be controlled by servo/actuator control signaling actions selected and executed by WCSAs 43. Each servo/actuator control signaling action can include an array of applicability conditions, preconditions, and effects describing an elementary datum of effector control. A pattern of multiple effector (e.g., weapon) servo/actuator control signaling actions can include a (e.g., weapon) control action. Effector or weapon control signaling agents take effector (e.g., weapon) control actions as input, undertake action decomposition or diffusion, and output patterns (aka plans) of effector (e.g., weapon) servo/actuator control signaling actions. The cohort of weapon control signaling agents aboard a single UxS, each exclusively associated with one onboard effector (e.g., weapon), participate in repeated play of a game to determine which effector (e.g. weapon) control signaling agent decomposes which effector (e.g., weapon) control action stored in the local UxS effector (e.g., weapon) control plans database. In particular, WSCA 43 (43A, 43B, etc) games can be played by a cohort of Level 0 effector (e.g., equipment or weapon) control signaling agents 43 for extracting actions from a remote controlled or local equipment item 13 (e.g., an effects generating equipment item or "effector", e.g., weapon) control plans database 45C. Control plans can include machine instructions to operate the local equipment item 13 with respect to inputs from the Weapon Control Diffusion Agent 53

Platform Control Signaling Agent 44A (Control Diffusion Agent). A physical platform with guidance, movement/flight control, and propulsion (See FIG. 4) that is a part of a UxS 3 which carries effectors/weapons and sensors is controlled by servo/actuator control signaling actions. Each servo/actuator control signaling action includes an array of applicability conditions, preconditions, and effects describing elementary datum of control information. A pattern of multiple platform servo/actuator control signaling actions is a platform control action. Platform control signaling agents take platform control actions as input, undertake action decomposition or diffusion (e.g., similar to a hardware driver program), and output patterns (aka commands or command signals) for platform servo/actuator control signaling actions. Because each UxS comprises one and only one platform, each UxS hosts only one platform control signaling agent. This single platform control signaling agent decomposes each platform control action stored in the local UxS platform control plans database. An exemplary Platform Control Signaling Agent 44A can be implemented in a way comparable to a device driver. This exemplary comparison is also applicable to various embodiments of sensor control agents and effector control signaling agents. In this example, a device driver is a computer program that operates or controls a particular type of device that is attached to a computer. A driver provides a software interface to hardware devices, enabling operating systems and other computer programs to access hardware functions without needing to know precise details about the hardware being used. An exemplary device drivers can provide an command or critical abstraction layer by acting as a translator between a hardware device and the applications or operating systems that use it. Programmers can write the higher-level application code or instructions independently of whatever specific hardware the end-user is using. For example, a high-level application for interacting with a serial port may simply have two functions for "send data" and "receive data". At a lower level, a device driver implementing these functions would communicate to the particular serial port controller installed on a user's computer. The commands needed to control a 16550 UART are much different from the commands needed to control an FTDI serial port converter, but each hardware-specific device driver abstracts these details into the same (or similar) software interface.

Referring to FIG. 8B, a discussion of Object Assessment (OA) Agent 61 (Information Fusion Agent) is provided. Exemplary OA agents 61 can include a learning machine capability that is trained or programmed to recognize objects. In at least one embodiment, a pattern of multiple feature vectors (see feature vector assessment discussion) is an object, which in turn is described by an object state vector. Each exemplary OA Agent 61 take multiple feature vectors as input (e.g., from Feature Vector data store 45A), undertake pattern recognition or fusion (e.g., using a statistical relational learning system, e.g. a Markov Logic Network system receives input feature vectors; note, embodiments of an object assessment agent 61 can optionally draw from a knowledge base or an object intelligence library 64), and output object state vectors which are stored in Object State Vector data store 65. A cohort of object assessment agents 61 across a single force tactical group of UxSs participate in repeated play of a game (see, e.g., FIG. 12) to determine which object assessment agent updates which object state vector stored in the group-distributed object state vector database. Generally, an exemplary object assessment agent 61 includes a game section (e.g., see FIG. 12) that can be played by a single Level 1 Object Assessment Agent with object assessment agents aboard other UxSs within a local force or tactical group to populate a distributed object state vectors database 65 where the Object Assessment Agent 61 uses object recognition systems to match stored patterns with feature vectors 45A.

A relevancy of an OSV to the $i^{th}$ OA agent primarily derives from the unique feature vector data available to the $i^{th}$ OA agent. An extent to which the feature vector data available to the $i^{th}$ OA agent are likely to improve an OSV, determines the relevancy of the OSV to the $i^{th}$ OA agent. The following considerations regarding object state vector parameters assess this relevancy. The ambiguity of these considerations suggests the mathematical treatment of OA agent utility functions can include exemplary fuzzy logic approaches: Is the location of the UxS hosting the $i^{th}$ OA agent relatively near the geospatial location of this object? Is this object located in a domain in or about which the UxS hosting the $i^{th}$ OA agent may maneuver? Do the current characteristics of the object's domain permit quick access by the $i^{th}$ OA agent's UxS? Do FVs in the local database of the UxS hosting the $i^{th}$ OA agent have geospatial locations/velocities comparable to the geospatial location/velocity of this object? Does the $i^{th}$ OA agent have access to feature data capable of reducing the tracking uncertainty/error of this object? Is the $i^{th}$ OA agent likely to improve upon the accuracy or certainty of the object's classification and identification? Has this OSV been previously updated by $i^{th}$ OA agent and is now overdue for updating? I.e., is the $i^{th}$ OA agent actively tracking this object? Positive answers to these questions suggest considerable relevancy of this OSV to the $i^{th}$ OA agent. Negative answers suggest the $i^{th}$ OA agent's utility may increase if a different OA agent selects this OSV for updating. If all OSVs stored in the group-distributed OSV database are of limited relevancy to the $i^{th}$ OA agent, then the null or empty OSV can be presumed most relevant, which is to be instantiated by the $i^{th}$ OA agent to represent a new battlespace object. It may happen that the respective utilities of two or more OA agents are optimized by the same choice of OSV, in which case the agents may successively update this OSV. Alternatively, we might formulate a global objective W(a) to be maximized for all the OA agents of the force/tactical group, and define the OA agent utility functions $U_i(a)$ in terms of W(a) as follows: $U_i(a)=W(a)-W(a_i^b, a_{-i})$ where $a_i^b$ is some fixed baseline OSV that could be updated by the $i^{th}$ OA agent. This global objective is optimized when force/tactical group UxSs are allocated battlespace object tracking such that aggregate relevancy is optimized for the entire force/tactical group of UxSs.

Sensor Control Agent (SCA) 51 (Control Diffusion Agent). A SCA 51 includes a sensor control fusion function plus a distributed game function where multiple SCAs 51 engage in a game activity to determine which SCA 51 is best able to decompose a given integrated engagement sensing action among a cohort of sensor control agents to generate a new or updated. In at least some embodiments, some or a complete sensor suite onboard a single UxS is controlled by sensor control actions. A sensor control action may identify a spatial location requiring sensing (angular coordinates and range), a sensing spectral requirement, or activation timing for a sensor aboard a single UxS. A sensor control action generally will not specify which specific sensor aboard the UxS should execute the sensor control action. A pattern of multiple sensor control actions is an integrated engagement sensing action. SCAs 51 take integrated engagement sensing actions 151 from an integrated engagement plan database 69 as input (as well as object state vector data 153 from object state vector database 65 and individual capability plan library 66 decomposition methods 143C), undertake action decomposition or diffusion, and output patterns (aka plans) of sensor control actions 159. The cohort of sensor control agents across or within a single force/tactical group, each sensor control agent hosted by one UxS, participate in repeated play of a game to determine which sensor control agent decomposes which integrated engagement sensing action which are then stored in the group-distributed integrated engagement plans database 45B. An exemplary SCA 51 game is played by a single Level 1 sensor control agent 51 with sensor control agents 51 aboard other UxSs 3 within the local force or tactical group to extract actions relevant to each UxS 3 within the force or tactical group from the distributed integrated engagement plans database 69 and extract object state vectors 65 relevant to objects referenced in the Integrated Engagement Plans 69 from the distributed object state vectors database 65. The cohort SC agents aboard the force/tactical group, each SC agent hosted by one UxS, participate in repeated play of a game to determine which SC agent decomposes which IEP sensing action stored in the group-distributed integrated engagement plans (IEP) database. An exemplary cohort of SCAs 51 can be disposed aboard the force/tactical group, where each SCA 51 is hosted by one UxS, and participates in repeated play of a game to determine which SCA 51 decomposes which IEP sensing action stored in the group-distributed IEP database. Associated with the $i^{th}$ SCA 51 is a gaming utility function $U_i(a; V_i)$, which for later convenience may be equivalently denoted $U_i(a_i, a_{-i}; V_i)$ where the set $a_{-i} = \{a_1, a_2, \ldots, a_{i-1}, a_{i+1}, \ldots, a_n\}$. Each $a_i$ is a single IEP sensing action stored in the IEP database shared with the force/tactical group's other SCA 51. The $i^{th}$ SCA 51 seeks to maximize its utility by its choice of $a_i$. Note that the $i^{th}$ SCA's 51 utility depends also upon the choices included in a set $a_{-i}$ of all the other SCAs 51 in a force/tactical group of UxSs. Furthermore, the $i^{th}$ SCA 51s utility depends upon a subset of object state vectors contained in the group-distributed object state vectors (OSV) database, with subset members denoted $V_i$. This subset of object state vectors is directly relevant to the $i^{th}$ UxS, where current relevancy has been recently determined by the $i^{th}$ OA agent.

A Weapons (or Effector) Control Agent (WCA) 53 (Control Diffusion Agent). A complete weapon (or effector) suite onboard a single UxS is controlled by weapon control actions. A weapon control action may identify a spatial location requiring engagement (angular coordinates and range), a weapon projectile/payload requirement, or activation timing for a weapon aboard a single UxS. A weapon control action generally will not specify which specific weapon aboard the UxS should execute the weapon control action. A pattern of multiple weapon control actions is an integrated engagement fires action. Weapon control agents take integrated engagement fires actions as input, undertake action decomposition or diffusion, and output patterns (aka plans) of weapon control actions. The cohort of weapon control agents aboard a single force/tactical group, each weapon control agent hosted by one UxS, participate in repeated play of a game to determine which weapon control agent decomposes which integrated engagement fires action stored in the group-distributed integrated engagement plans database. Weapons control agent 53 includes a game played by a single Level 1 weapon control agent with weapon control agents 53 aboard other UxS platforms 3 within a force or tactical group within the force or tactical group to extract actions relevant to each UxS 3 within the force or tactical group from the distributed integrated engagement plans database 69 and extract object state vectors 65 relevant to objects referenced in the Integrated Engagement Plans 69 from the distributed object state vectors database 65. In at least one embodiment, the above and below discussion of sensor control agent focuses on the game theoretic repeated play of the cohort of sensor control (SC) agents aboard the force/tactical group, each SC agent hosted by one UxS. An exemplary cohort of weapon control (WC) agents are similar to sensor control agents SIMD Integrated Engagement Control (IEC) Agent 73 (Control Diffusion Agent). A single force/tactical group of UxSs is controlled by integrated engagement sensing actions, integrated engagement fires actions, and integrated engagement platform actions. An integrated engagement action may describe the deployment or activity of the sensing suites, or the fires suites, or the platforms within a single force/tactical group. An integrated engagement action can be one of three action types: sensing action that addresses the sensor suite aboard a single UxS within the group; fires action that addresses the weapon suite aboard a single UxS within the group; and platform action which addresses a single UxS platform within the group. Several simultaneous integrated engagement actions will coordinate (integrate) sensing, fires, and platform control among multiple sensor suites, weapon suites, and platforms within the force/tactical group. An integrated engagement action generally will not specify which particular sensor suite, weapon suite, or platform within the force/tactical group should execute the integrated engagement action. Integrated engagement control agents take mission actions as input, undertake action decomposition or diffusion, and output patterns (aka plans) of integrated engagement sensing, fires, and platform control actions. The cohort of integrated engagement control agents aboard the entire command-guided swarm, each integrated engagement control agent hosted by one force tactical group of UxSs, participate in repeated play of a game to determine which integrated engagement control agent decomposes which mission action stored in the swarm-distributed mission plans database. A force/tactical UxS group hosts a single Level 2 integrated engagement control (IEC) agent. An IEC agent 73 utilizes computing resources of all the UxSs in a force/tactical group, and comprises an AI agent based on parallel message-passing processes. A UxS hosts one parallel or SIMD IEC agent 73 processes however a given IEC agent's 73 computational load is shared by all the UxSs in a designated force/tactical group. A force/tactical UxS group's IEC agent 73 decomposes relatively high-level planned swarm mission actions into specific planned group integrated engagement actions for its force/tactical group. Each group's IEC agent 73 then stores/updates these planned group integrated engagement actions in a group-distributed IEP database. The n IEC agents 73 in the entire swarm of force/tactical groups interact with each other to extract planned swarm mission actions from the swarm-distributed mission plans (MP) database 79, which is a distributed database accessible to the swarm's IEC agents 73. This interaction takes the form of a game in which the IEC agents are the players.

Mission Control (MC) Agent 91 (Control Diffusion Agent). A complete command-guided swarm is controlled by mission actions. A mission action may describe the deployment, maneuver, positioning, posturing, sensing, and/or engagement activities of a force/tactical group. A mission action generally will not specify which particular force/tactical group should execute the action. Mission control agents take high-level mission objectives (each objective is an action, not of the swarm, but on the environment) as input, undertake action decomposition or diffusion, and output patterns (aka plans) of mission actions. The cohort of mission control agents aboard the entire command-guided swarm, each agent hosted by one force/tactical group of UxSs, participate in repeated play of a game to determine which mission control agent decomposes which high-level mission objective stored in the swarm-distributed high-level mission objectives database. A force/tactical UxS group hosts a single Level 3 mission control (MC) agent 91. This exemplary MC agent 91 utilizes the computing resources of all the UxSs in a given force/tactical group, and can include an AI agent based on parallel message-passing processes. While a UxS can host one of these parallel MC agent processes, the exemplary MC agent's 81 computational load is shared by all the UxSs in an exemplary force/tactical group. An exemplary swarm in its entirety can include a set $N=\{1, 2, \ldots, n\}$ of force/tactical groups of which a UxS is one, each hosting a single MC agent 91. A group's MC agent 91 decomposes high-level swarm mission objectives into planned swarm courses of action or swarm mission plans that involve an associated force/tactical group. An exemplary group's MC agent 91 then stores/updates these mission action plans in the swarm-distributed MP database. Exemplary n MC agents 91 in an exemplary entire swarm of force/tactical groups interact with each other to extract high-level swarm mission objectives from the swarm-distributed high-level mission objectives (HLMO) database, which is a distributed database accessible to the swarm's MC agents. This interaction takes the form of an exemplary game in which the MC agents are 91 the players. Combined, all n of the MC agents 91 in the swarm of force/tactical groups may extract the high-level swarm mission objectives contained in $A=\{A\_i | i=1, 2, \ldots, n\}$, and these high-level swarm mission objectives constitute a subset of $R^{\wedge}HLMO$. Associated with the $i^{th}$ agent is a utility function $U_i(a, V_i)$, which for later convenience may be equivalently denoted $U_i(a_i, a_{-i}, V_i)$ where the set $a_{-i}=\{a_1, a_2, \ldots, a_{i-1}, a_{i+1}, \ldots, a_n\}$. The $i^{th}$ MC agent 91 seeks to maximize its utility by its choice of $a_i$.

SIMD Situation Assessment Agent 71 (Information Fusion Agent). Situation assessment agents take object state vectors as input, undertake pattern recognition or fusion, and output situation vectors. A cohort of situation assessment agents aboard the entire command-guided swarm, each hosted by one force/tactical group of UxSs, participate in repeated play of a game to determine which situation assessment agent updates which situation vector stored in the swarm-distributed situation vector database. A force/tactical UxS group hosts a single Level 2 situation assessment (SA) agent. This SA agent 71 utilizes the computing resources of all the UxSs in a force/tactical group, and is an AI agent based on parallel message-passing processes. Parallel SA agent 71 processes are hosted such that the SA agent's 71 computational load is shared by all the UxSs in a force/tactical group. Because of its parallel design, this SA agent 71 is robust to marginal loss of members of a force/tactical group. The swarm in its entirety can include a set $N=\{1, 2, \ldots, n\}$ of force/tactical groups, each hosting a single SA agent 71. A group's SA agent 71 composes situation vectors from patterns of object state vectors contained in a group-distributed OSV database. The n SA agents 71 in the entire swarm of force tactical groups interact with each other to update the swarm-distributed situation vectors (SV) database, which is a distributed database accessible to the swarm's SA agents 71. This interaction takes the form of a game in which the SA agents 71 are the players. The game resources includes of the set of situation vectors contained in the swarm-distributed SV database. A subset of these resources, can be an allowable resource selections for a given SA agent 71 within a force/tactical group in the swarm. SA agent therefore need to and are able to update SVs. Combined, all n of the exemplary SA agents 71 in the swarm of force/tactical groups may update the situation vectors.

Threat Assessment Agent 81 (Information Fusion Agent). In at least some embodiments a pattern of multiple situation vectors can be an impact or threat, which in turn is described by a threat vector. Threat assessment agents take situation vectors as input, undertake pattern recognition or fusion, and output threat vectors. An exemplary cohort of threat assessment agents aboard the entire command-guided swarm, each hosted by one force/tactical group of UxSs, participate in repeated play of a game to determine which threat assessment agent updates which threat vector stored in the swarm-distributed threat vector database. A force/tactical UxS group hosts a single Level 3 threat assessment (TA) agent 81. This exemplary TA agent 81 utilizes the computing resources of all the UxSs in a force/tactical group, and can include an AI agent based on parallel message-passing processes. While a UxS can host one of these parallel TA agent 81 processes, the TA agent's 81 computational load is shared by all the UxSs in a force/tactical group. Because of its parallel design, this exemplary TA agent 81 is robust to marginal loss of members of a force/tactical group. The exemplary swarm in its entirety can include a set $N=\{1, 2, \ldots, n\}$ of force/tactical groups of which mine is one, each hosting a single TA agent 81. A group's TA agent 81 composes threat vectors from patterns of situation vectors contained in the swarm-distributed SV database. The exemplary n TA agents 81 in an exemplary entire swarm of force tactical groups interact with each other to update a swarm-distributed TV database, which is a distributed database accessible to the swarm's TA agents 81.

Referring to FIG. 8F, a discussion of Operator Infusion (OI) Agents 85 is provided. In various embodiments of the invention, a human operator exerts real-time control over the entire command-guided swarm throughout mission execution by providing the following five information/control elements: initial and updated/revised high-level swarm mission objectives; situation assessment preferences given object state information; threat assessment preferences given situation information; mission planning preferences for the command-guided swarm given high-level mission objectives; and integrated engagement planning preferences for force/tactical groups given mission actions. An exemplary role of a human operator includes leader, advisor, and teacher to the swarm's multiagent intelligence throughout mission execution. Exemplary Operator infusion agents have implementing designs or software with the following functionalities: analyze threat vectors formulated/updated by a force/tactical group's threat assessment agent, and prepare graphical/textual/aural presentations of these impacts/threats to the human operator; receive active advice-seeking queries from a force/tactical group's information fusion or control diffusion agent, and prepare graphical/textual/aural presentations of these queries for the human operator; subsequently receive and relay back to the agent the human operator's responses/preferences with respect to these queries. In at least some embodiments, four types of queries and the agents involved are: situational queries from a force/tactical group's situation assessment agent; impact/threat queries from a force/tactical group's threat assessment agent; swarm mission planning queries from a force/tactical group's mission control agent; force/tactical group integrated engagement queries from a force/tactical group's integrated engagement control agent. A cohort of OI Agents85 can be associated with a command-guided swarm, each hosted or operated by one force/tactical group of UxSs, participate in repeated play of a game to determine which operator infusion agent accesses which user-defined operating picture (UDOP) channel for purposes of direct communication with the human operator. UDOP access channels are naturally organized by the human operator according to his/her priorities, with the highest priority channels conveying the most urgent communications between the human operator and the multiagent swarm intelligence. In order to mitigate human operator overload and to conform with mission needs, the operator has considerable control over communication channel prioritization in configuring the UDOP. OI agents in the entire swarm of force tactical groups interact with each other to access the human operator. This interaction takes the form of a game in which the OI agents are the players. The game resources can include of a set of operator input/output access channels, via the user-defined operating picture (UDOP). A subset of these resources can include allowable resource selections available for use by a given OI agent within a given force/tactical group in the swarm. An OI Agent 85 includes a design implementation enabling access to a human operator via UDOP channels. Combined, all OI Agents 85 in an exemplary swarm of force/tactical groups may access the human operator via a number of channels where these channels make up a subset of total UDOP channels.

FIG. 8G shows a general overview of control diffusion agents and overview of management/monitoring flow of control between two plan repositories. High level plans are stored in a database 34A which supply high level actions for decomposition 34B via, e.g., hierarchical task network (HTN) planning, by a control diffusion (CD) Agent 34C. The exemplary CD Agent 34C then performs high level task decomposition into a sequence of lower or more specific level actions that is output as complete low-level plans 34D. The low level plans 34D are stored in a low level plan store 34E.

Figure 8H:
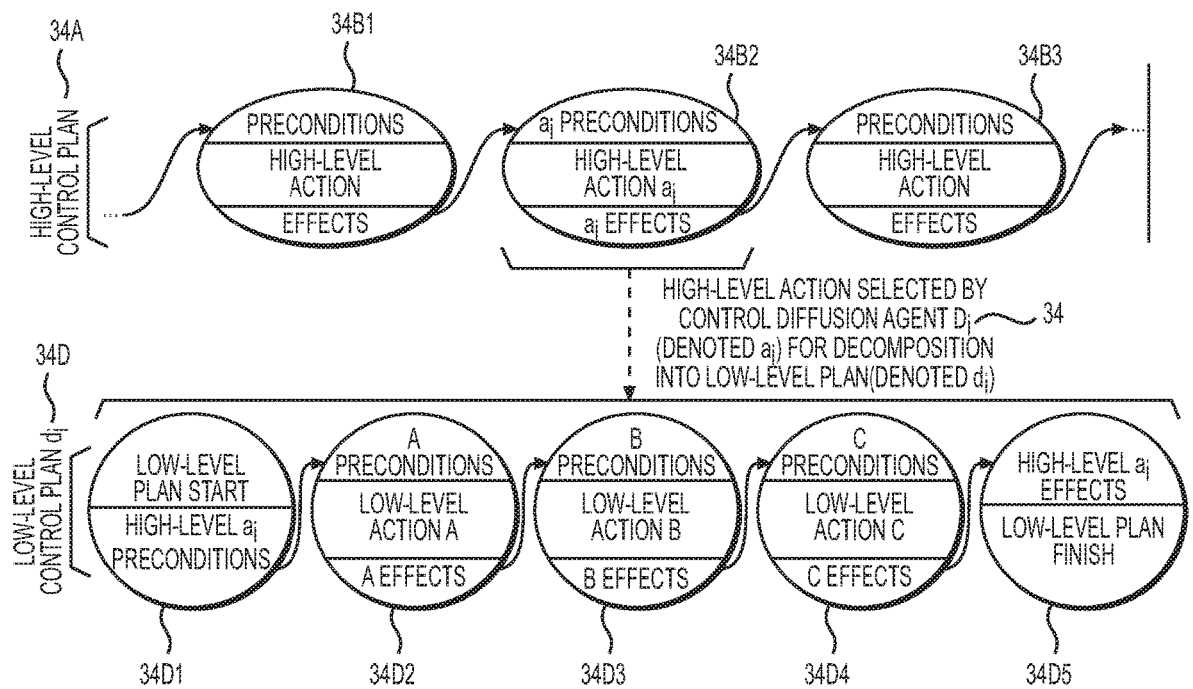
FIG. 8H shows a general diagram of diffusion or decomposition by agent $D_i$ of high-level action $a_i$ into low-level plan $d_i$.

FIG. 8H shows a general diagram of diffusion or decomposition by agent $D_i$ of high-level action $a_i$ into low-level Plan $d_i$. In particular, an exemplary high level control plan 34A includes at least one or more actions 34B1, 34B2, 34B3 which each includes preconditions which trigger a high level action that must be satisfied prior to execution of a given high level action, a high-level action, and an effect which is expected to be produced from the action). Exemplary high level actions are selected by an exemplary CD 34C for decomposition into a low level plan 34D. An exemplary low level plan 34D comprises a low level plan start condition or factors comprising at least the high level pre-conditions from the high level control plan 34A and multiple low level actions 34D2, 34D3, 34D4, etc for each high level action (e.g., 34B1, 34B2, or 34B3)(e.g. high level action 34B1: drive home; low level action, at 12:00 on 14 Jun. 2019, start in Martinsville, Ind. at a specific address and drive to a specific address in Bloomington with specific turn by turn directions 34D2, 34D3, 34D4), and a high level effects plus low level plan termination state or conditions 34D5 (stop at home in Bloomington at specified address).

FIG. 9A shows a list of exemplary information fusion vector names, description, and attribute outputs. Feature vector (FV) parameters stored in FV Database 45. An information fusion vector description: An exemplary feature vector comprises an output from a Feature Assessment Agent 41 that is stored in the Feature Vector Local Database. A feature vector emerges from a grouping of sensor pixels at a fixed moment in time. The grouping is based on a linkage or formed pattern among the pixels. A feature vector can also be defined as a spatial zooming out from this pixel-level grouping. Information fusion vector attributes include: FV ID associated with a specific observed feature that persists over time, and timestamp of most recent update; the collection of updated and timestamped FVs (sharing the same ID) is a specific feature track; feature geospatial location; feature location domain and current domain characteristics; feature geospatial velocity vector parameters; feature sensing spectra (RF, radar, IR, visible, and/or acoustic, etc.); feature reflectivity and density; feature shape classification; feature color classification; feature cross sectional sizing; feature orientation; feature assessment FA Agent update history (when this FV was updated and by which FA agent).

OSV parameters. An object state vector emerges from a grouping of feature vectors with timestamps throughout a fixed interval in time. The grouping is based on a linkage or formed pattern among the features. An object state vector is a spatial and temporal zooming out from this feature-level grouping. Information Fusion Vector Attribute Outputs include: OSV ID associated with a specific battlespace object that persists over time, and timestamp of most recent update; the collection of updated and timestamped OSVs (sharing the same ID) is a specific object track; object geospatial location; object location domain and current domain characteristics; object geospatial velocity vector parameters; object type/classification and identification; FV IDs of feature vectors contributing to most recent update of this OSV; and OA agent update history (when this OSV was updated and by which OA agent)

Referring to FIG. 9B, a discussion of SV information fusion description and attributes is provided. SV Parameters. A SV emerges from a grouping of object state vectors at a fixed moment in time. The grouping is based on a linkage or formed pattern among the objects. A situation vector is a spatial zooming out from this object-level grouping. SV vector attributes include: SV ID associated with a specific situation that persists over time, and timestamp of most recent update; the collection of updated and timestamped SVs (sharing the same ID) is a specific situation track; geospatial location of situation (region occupied by the grouped objects); situation location domain and current domain characteristics; situation category or type/classification; partial OSV of each object composing this situation; role of each object composing this situation; relationships/integration within selected subsets of objects composing this situation; and SA agent update history (when this SV was updated and by which SA agent).

TV parameters. A threat vector emerges from a grouping of situation vectors with timestamps throughout a fixed interval in time. The grouping is based on a linkage or formed pattern/sequence among the situations. A threat vector is a spatial and temporal zooming out from this situation-level grouping. TV attribute include: TV ID associated with a specific threat that persists over time, and timestamp of most recent update; the collection of updated and timestamped TVs (sharing the same ID) is a specific threat track; geospatial location of threat (region occupied by the situation grouping); threat location domain and current domain characteristics; threat category or type/classification; timestamped sequences of partial SVs of each situation composing this threat; prediction/projection/extrapolation to some future moment in time of the situations composing this threat, including future timestamped partial SVs; threat assessment (TA) agent update history (when this TV was updated and by which TA agent).

Referring to FIG. 9C, a discussion of High Level Mission Objective (HLMO) 89A are provided. A HLMO is one of several distinct stages or steps within a transition. An overall intended effect of a swarm mission is the transition of the battlespace from its pre-mission state to a goal state desired by the human operator at mission end. Like plan actions, a HLMO is specified by its preconditions and effects. HLMO attributes include: HLMO ID and timestamp of most recent update by the human operator; geospatial location within the battlespace of the specific HLMO effects (region throughout which the specific HLMO effects are to occur); HLMO effects location domain and current domain characteristics; HLMO category or type/classification; current threat vector(s) (TV ID) in the swarm-distributed TV database that motivate or may be addressed by this HLMO; HLMO preconditions (conjunction of function free positive literals); HLMO effects (conjunction of function free positive or negative literals; ordering constraints of this HLMO with respect to other HLMOs; pairwise causal constraints, if any, of this HLMO to other HLMOs; status of HLMO precondition flags indicating if the HLMO's preconditions have been achieved; status of HLMO effect flags indicating if the HLMO's effects have been achieved; human operator update history (when this HLMO was updated); and mission control (MC) agent decomposition history (when this HLMO was decomposed into a mission plan (MP) and by which MC agent).

Referring to FIG. 9D, a description of a Mission Plan (MP) Action control diffusion action along with its attributes is provided. An exemplary swarm MP can describe deployment and activities of the swarm's force/tactical groups throughout mission execution. Except for special circumstances, an exemplary MP action typically will not specify which particular force/tactical group should execute an action. A MP action will involve maneuver, positioning, posturing, sensing, and/or engagement activities of a force/tactical group. A swarm MP is an assembly or stitching together of all the individual HLMO decompositions produced by the swarm's MC Agents. These HLMO decompositions and the assembled MP are stored in the swarm-distributed MP database. To form the complete MP, the various HLMO decompositions are stitched together according to the ordering constraints and causal links of the original HLMOs. The MP action set may be totally or partially ordered, depending upon the ordering constraints and causal links of the HLMOs and within the HLMO decompositions. MP Action attributes can include: MP action ID and timestamp of most recent update; geospatial location within the battlespace of the specific MP action effects (region throughout which the specific MP action effects are to occur); MP action effects location domain and current domain characteristics; MP action category or type/classification; Current threat vector(s) (TV ID) in the swarm-distributed TV database that motivate or may be addressed by this MP action; MP action preconditions (conjunction of function free positive literals); MP action effects (conjunction of function free positive or negative literals); Ordering constraints of this MP action with respect to other MP actions; Pairwise causal constraints of this MP action to other MP actions; Status of MP action precondition flags indicating if the action's preconditions have been achieved; Status of MP action effect flags indicating if the action's effects have been achieved; MC agent update history (when this MP action was updated during an HLMO decomposition and by which MC agent); and IEC Agent decomposition history (when this MP action was decomposed into an integrated engagement plan and by which IEC agent).

Referring to FIGS. 9E and 9F, a description of an IEP CD action along with its attributes is provided. An integrated engagement plan (IEP) describes the deployment and activities of the sensing suites, fires suites, and platforms within a single force/tactical group throughout the execution of a single MP action. An IEP action will be one of three possible action types: sensing action which addresses a sensor suite aboard a single UxS; fires action which addresses a weapon suite aboard a single UxS; a platform action which addresses a single UxS platform. The exemplary MP decomposition library, the reference resource used by IEC agents in constructing IEPs, supports MP action decomposition into IEPs including of these three action types. Except for special circumstances, an IEP action typically will not specify which particular sensor suite, weapon suite, or platform within the force/tactical group should execute the IEP action. Within the IEP, several simultaneous actions will coordinate sensing, fires, and platform control among multiple sensor suites, weapon suites, and platforms within the group. Hence, an IEP of necessity will be a partial-order plan with parallel actions (multiple actions sharing the same ordering constraints and causal links). This MP action decomposition comprising the IEP is stored in the group-distributed IEP database. IEP CD action attributes can include: IEP action ID and timestamp of most recent update; if IEP action is a sensing action: a. IEP sensing action category or type/classification; b. geospatial location of the battlespace region to be sensed; c. domain of battlespace region to be sensed; d. coordinated sensing requirements; e. region(s) of spectrum appropriate for this sensing action; f. passive or active sensing needs; g. atmospheric impediments, spectral noise, or physical obstructions that may impair sensing. IEP action attributes further can include if IEP action is a fires action: a. IEP fires action category or type/classification; b. geospatial location of the battlespace region to be engaged; c. domain of battlespace region to be engaged; d. coordinated fires requirements; e. fires type(s) appropriate for this engagement action; f impediments or obstructions that may impair engagement. IEP action attributes further can include: if IEP action is a platform action: a. IEP platform action category or type/classification; b. geospatial location of the battlespace region to be occupied by platform; c. domain of battlespace region to be occupied by platform; d. orientation and posture of platform; e. communication requirements of platform; f stealth/emission control (EMCON) requirements of platform; g. platform type(s) appropriate for this action; and h. impediments or obstructions to platform action. IEP action attributes further can include current situation vector(s) (SV ID) in the swarm-distributed SV database that motivate or may be addressed by this IEP action. IEP action attributes further can include IEP action preconditions (conjunction of function free positive literals); IEP action effects (conjunction of function free positive or negative literals); ordering constraints of this IEP action with respect to other IEP actions; pairwise causal constraints of this IEP action to other IEP actions; status of IEP action precondition flags indicating if the action's preconditions have been achieved; status of IEP action effect flags indicating if the action's effects have been achieved; IEC agent update history (when this IEP action was updated during a MP action decomposition and by which IEC agent); and agent decomposition history which can include: a. sensor control (SC) agent decomposition history (if this IEP action is a sensor action, when this IEP action was decomposed into a sensor control plan (SCP) and by which SC agent); b. weapon control (WC) agent decomposition history (if this IEP action is a weapon action, when this IEP action was decomposed into a weapon control plan (WCP) and by which WC agent); c. platform control (PC) agent decomposition history (if this IEP action is a platform action, when this IEP action was decomposed into a platform control plan (PCP) and by which PC agent).

Referring to FIG. 9G, a description of SCP actions to include action attributes is provided. A sensor control plan (SCP) provides the spatial locations requiring sensing (angular coordinates and range), sensing spectral requirements, and timing of activation states for the sensors aboard a single UxS throughout execution of a single IEP sensing action. Except for special circumstances, a SCP action typically will not specify which specific sensor aboard the UxS should execute the SCP action. Within the SCP, several simultaneous actions will coordinate sensing among multiple sensors aboard the single UxS. Hence, a SCP of necessity will be a partial-order plan with parallel actions (multiple actions sharing the same ordering constraints and causal links). This IEP sensing action decomposition comprising the SCP is stored in the local SCP database aboard the single UxS. SCP action attributes can include: SCP action ID and timestamp of most recent update; SCP action category or type/classification; spatial location to be targeted by a sensor (angular coordinates and range); domain of spatial location to be targeted by a sensor; requirements for coordination with other sensors aboard the single UxS; spectral requirements of SCP action; SCP action's passive or active sensing needs; atmospheric impediments, spectral noise, or physical obstructions that may impair sensor operation; current object state vector(s) (OSV ID) in the group-distributed OSV database that represents the target(s) of this SCP action; SCP action preconditions (conjunction of function free positive literals); SCP action effects (conjunction of function free positive or negative literals); ordering constraints of this SCP action with respect to other actions in the SCP; pairwise causal constraints of this SCP action to other actions in the SCP; status of SCP action precondition flags indicating if the action's preconditions have been achieved; status of SCP action effect flags indicating if the action's effects have been achieved; SC agent update history (when this SCP action was updated during an IEP sensing action decomposition and by the UxS's SC agent); and sensor control signaling (SCS) agent decomposition history (when this SCP action was decomposed into sensor servo/actuation signals and by which SCS agent).

Referring to FIG. 9H, a description of a Weapon (or effector) Control Plan (WCP) actions and action attributes are provided. A WCP provides the spatial locations requiring engagement (angular coordinates and range), engagement requirements such as kinetic or electromagnetic delivery and payload specifications, and timing of fires for the weapons aboard a single UxS throughout execution of a single IEP fires action. Except for special circumstances, a WCP action typically will not specify which specific weapon aboard the UxS should execute the WCP action. Within the WCP, several simultaneous actions will coordinate fires among multiple weapons aboard the single UxS. Hence, a WCP of necessity will be a partial-order plan with parallel actions (multiple actions sharing the same ordering constraints and causal links). This IEP fires action decomposition comprising the WCP is stored in the local WCP database aboard the single UxS. WCP action attributes can include: WCP action ID and timestamp of most recent update; WCP action category or type/classification; spatial location to be targeted by a weapon (angular coordinates and range); domain of spatial location to be targeted by a weapon; requirements for coordination with other weapons aboard the single UxS; delivery requirements of WCP action; payload requirements of WCP action; atmospheric impediments or physical obstructions that may impair weapon operation; current object state vector(s) (OSV ID) in the group-distributed OSV database that represents the target(s) of this WCP action; WCP action preconditions (conjunction of function free positive literals); WCP action effects (conjunction of function free positive or negative literals); ordering constraints of this WCP action with respect to other actions in the WCP; pairwise causal constraints of this WCP action to other actions in the WCP; status of WCP action precondition flags indicating if the action's preconditions have been achieved; status of WCP action effect flags indicating if the action's effects have been achieved; WC Agent update history (when this WCP action was updated during an IEP fires action decomposition and by the UxS's WC agent); weapon control signaling (WCS) agent decomposition history (when this WCP action was decomposed into weapon servo/actuation signals and by which WCS agent).

Referring to FIG. 9I, a description of a Platform Control Plan (PCP) as well as PCP action attributes is provided. An exemplary PCP provides the battlespace locations requiring occupation (lat/long or MGRS coordinates and orientation) and the timing of positioning and posture of a single UxS platform throughout execution of a single IEP platform action. A PCP action is intended for a single UxS platform. Hence, a PCP of necessity will be a total-order plan with sequential actions for the single UxS platform. This IEP platform action decomposition comprising the PCP is stored in the local PCP database aboard the single UxS. Exemplary PCP action attributes include: PCP action ID and timestamp of most recent update; PCP action category or type/classification; battlespace location to be occupied by the platform (lat/long or MGRS coordinates and orientation); domain of spatial location to be occupied by the platform; atmospheric impediments or physical obstructions that may impair platform operation; current object state vector(s) (OSV ID) in the group-distributed OSV database that represents the target(s) of this PCP action; PCP action preconditions (conjunction of function free positive literals); PCP action effects (conjunction of function free positive or negative literals); ordering constraints of this PCP action with respect to other actions in the PCP; pairwise causal constraints of this PCP action to other actions in the PCP; status of PCP action precondition flags indicating if the action's preconditions have been achieved; status of PCP action effect flags indicating if the action's effects have been achieved; PC agent update history (when this PCP action was updated during an IEP platform action decomposition and by the UxS's PC agent); and platform control signaling (PCS) agent decomposition history (when this PCP action was decomposed into platform servo/actuation signals by the UxS's PCS agent).

Figure 10A:
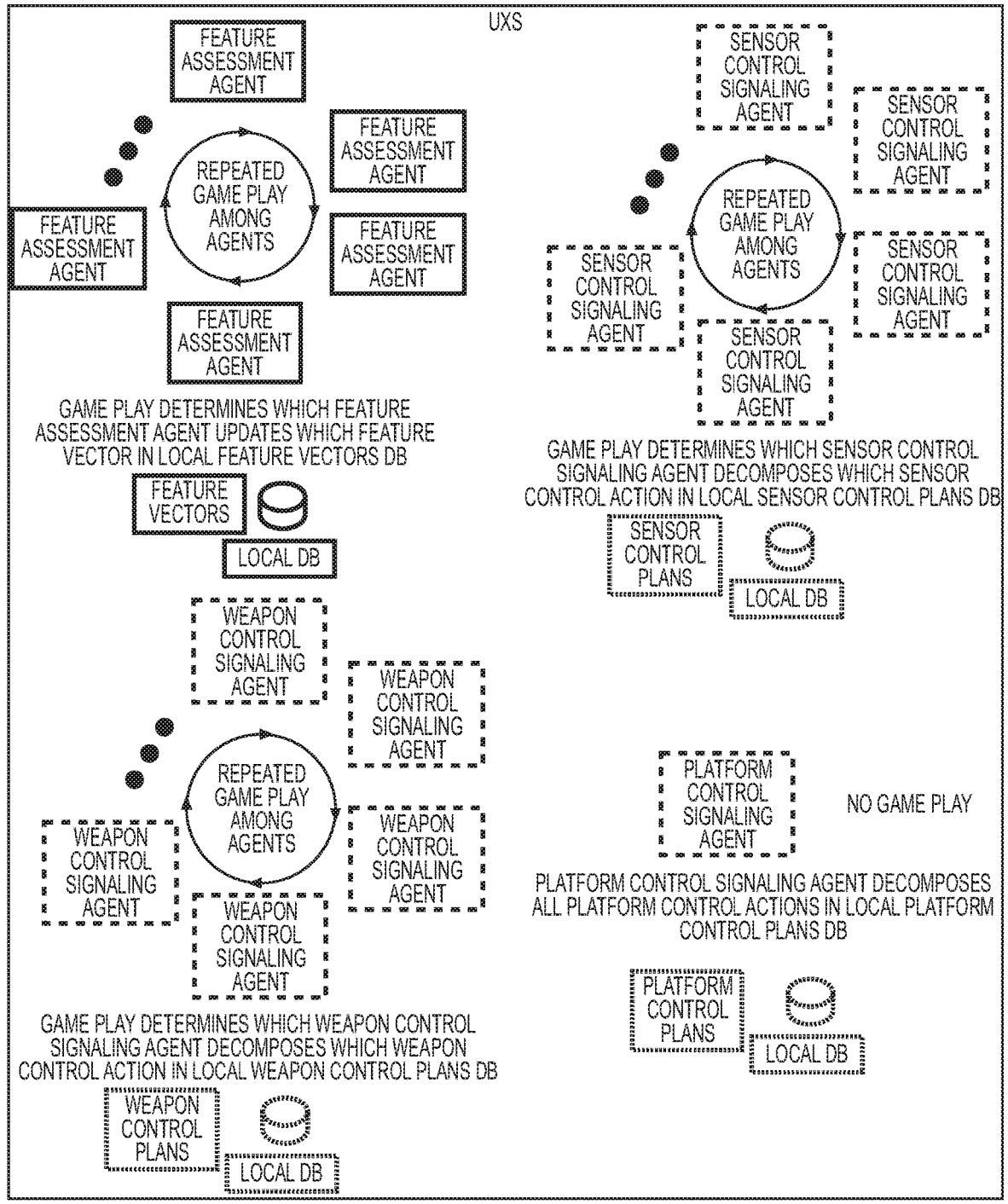
FIG. 10A shows an exemplary overview of agent games played aboard a single UxS.

FIG. 10A generally describes agent games played aboard an exemplary single UxS. Aboard each UxS, in at least some embodiments repeated play of three games takes place concurrently: First is the repeating game among the FA Agents (of the information fusion agent class and each executing locally on the UxS), each associated with one physical sensor aboard the UxS. This game is further described below and in Step 321 below. Second, a repeating game is played among the SCS Agents (of the control diffusion agent class and each executing locally on the UxS), each associated with one physical sensor aboard the UxS. This game is discussed below and in Step 317a below. Third is the repeating game among the WCS (or Effector) Agents (of the control diffusion agent class and each executing locally on the UxS), each associated with one physical weapon (effector) aboard the UxS. This game is discussed below and in Step 317b below. Note that the single PCS Agent (of the control diffusion agent class and executing locally on the UxS) is associated with the UxS physical platform and does not engage in game play.

Figure 10B:
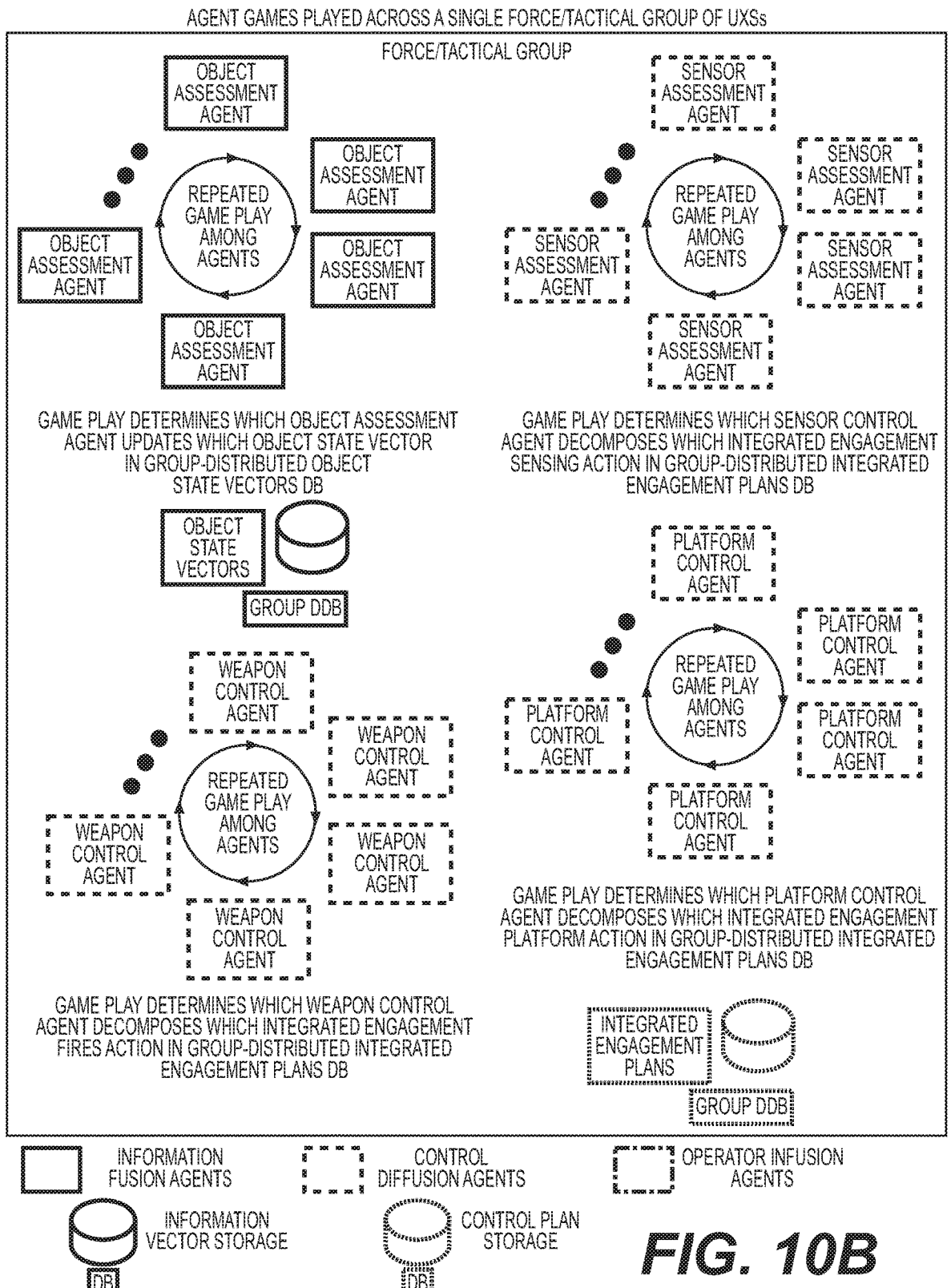
FIG. 10B shows an exemplary overview of agent games played across a single force/tactical group of UxS.

Referring to FIG. 10B, a general description of agent games played across a single force/tactical group of UxSs is provided. In this embodiment, across each force/tactical group of UxSs, repeated play of four games takes place concurrently: First is the repeating game among the OA Agents (of the information fusion class and each executing locally on a UxS), each associated one-to-one with a UxS in the force/tactical group. This game is discussed in below and in Step 325 below. Second is the repeating game among the Sensor Control Agents (of the control diffusion class and each executing locally on a UxS), each associated one-to-one with a UxS in the force/tactical group. This game is discussed below and in Step 311a of below. Third is the repeating game among the Weapon (Effector) Control Agents (of the control diffusion class and each executing locally on a UxS), each associated one-to-one with a UxS in the force/tactical group. This game is discussed below and in Step 311b below. Fourth is the repeating game among the Platform Control Agents (of the control diffusion class and each executing locally on a UxS), each associated one-to-one with a UxS in the force/tactical group. This game is discussed below and in Step 311c below.

Figure 10C:
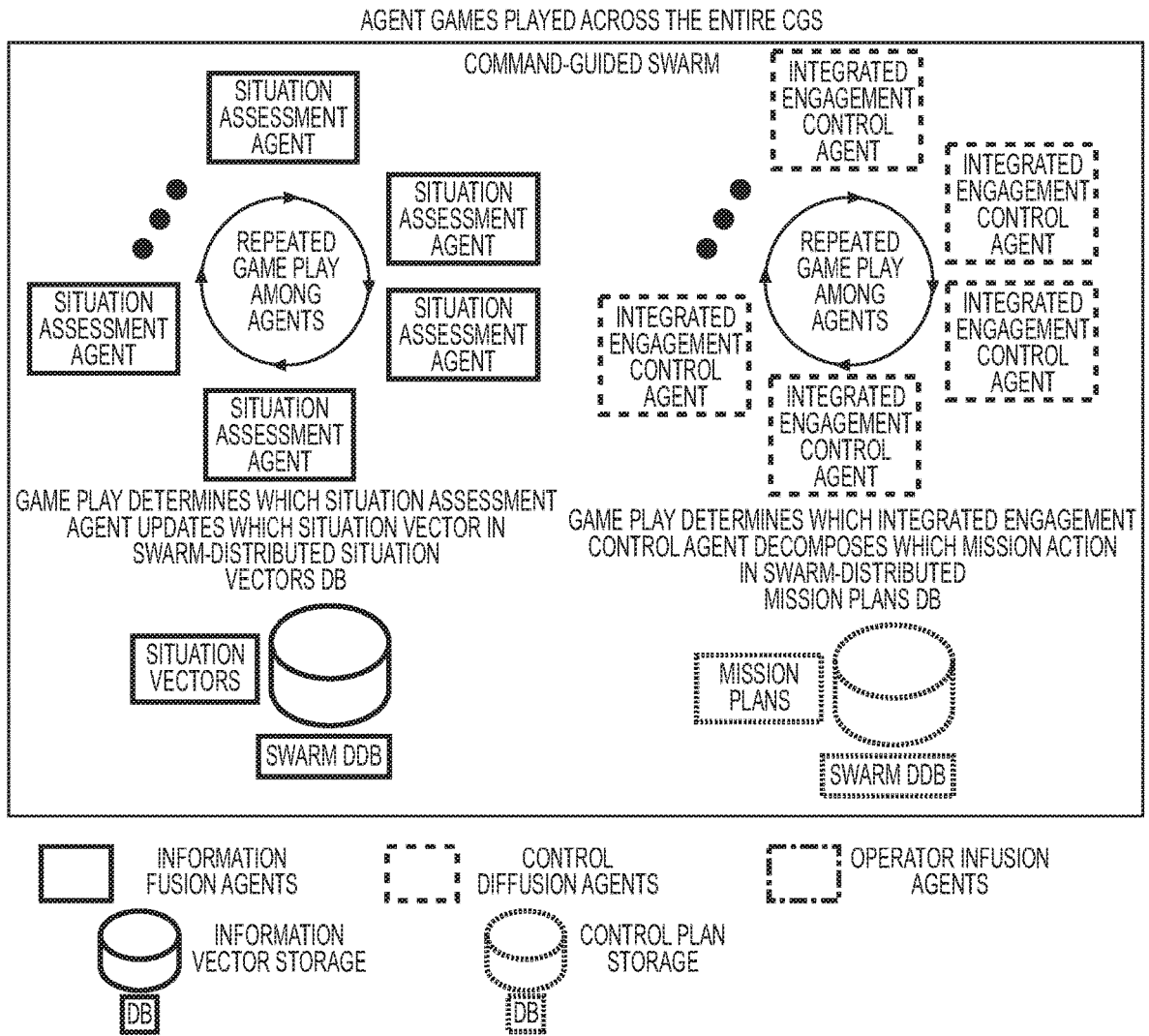
FIGS. 10CA and 10CB show an exemplary overview of agent games played cross an entire CGS.
Figure 10C:
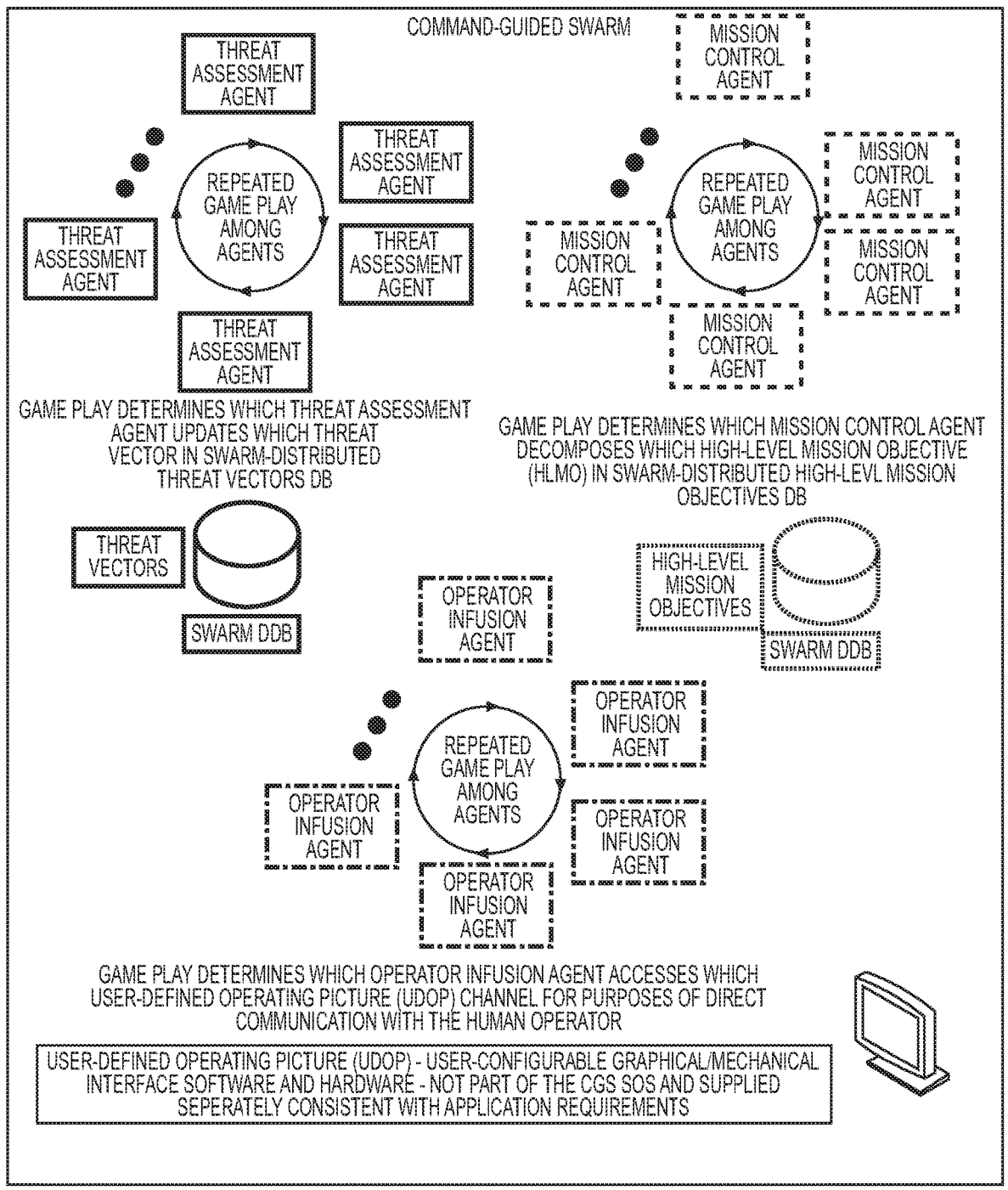

At FIGS. 10CA and 10CB, a general discussion of agent games played across an entire CGS is provided. In this embodiment, across an entire exemplary CGS, repeated play of five exemplary games takes place concurrently: First, is the repeating game among the SA Agents (of the information fusion class and each executing as a parallel process across a force/tactical group of UxSs), each associated one-to-one with a force/tactical group in the CGS. This game is discussed below and in Step 329 below. Second is a repeating game among the Threat (Impact) Assessment Agents (of the information fusion class and each executing as a parallel process across a force/tactical group of UxSs), each associated one-to-one with a force/tactical group in the CGS. This game is discussed below and in Step 333 below. Third is a repeating game among the IEC Agents (of the control diffusion class and each executing as a parallel process across a force/tactical group of UxSs), each associated one-to-one with a force/tactical group in the CGS. This game is discussed below and in Steps 307 and 309 below. Fourth is a repeating game among the Mission Control Agents (of the control diffusion class and each executing as a parallel process across a force/tactical group of UxSs), each associated one-to-one with a force/tactical group in the CGS. This game is discussed below and in Steps 303 and 305 below. Fifth is a repeating game among the OI Agents (of the operator infusion class and each executing as a parallel process across a force/tactical group of UxSs), each associated one-to-one with a force/tactical group in the CGS. This game is discussed below and in Step 441 below.

Figure 11A:
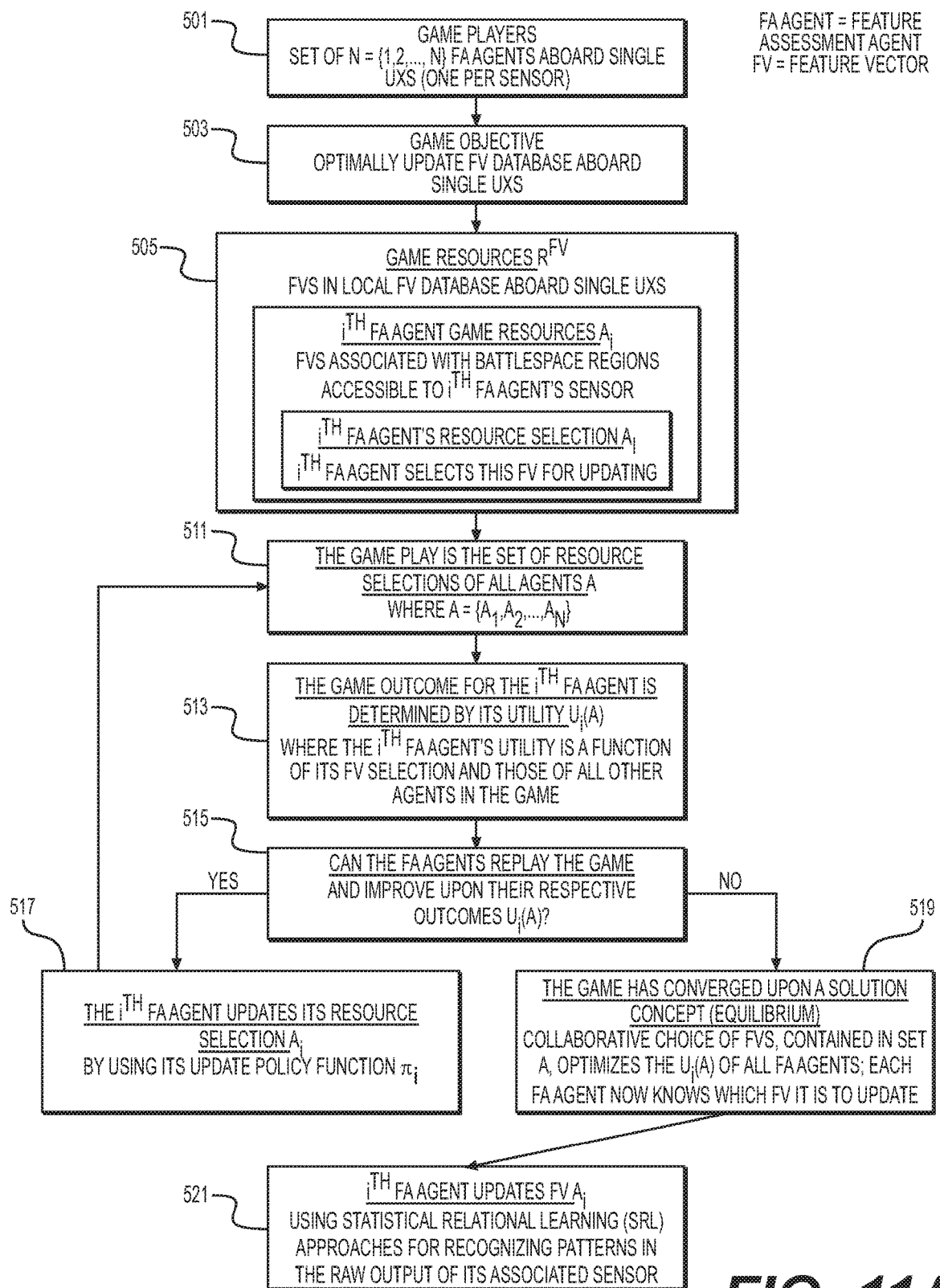
FIG. 11A shows an exemplary game execution sequence of an exemplary Feature Assessment (FA) agent.

FIG. 11A shows a disclosure of an exemplary feature vector update game played by the FA agent population aboard a single UxS. In this embodiment, at Level 0, a one-to-one correspondence exists between sensors and their associated feature assessment (FA) agents. I have a set $N=\{1, 2, \ldots, n\}$ of FA agents. These exemplary FA agents compose feature vectors from patterns in raw sensor output data. These FA agents interact with each other to update my local feature vectors (FV) database. This interaction takes the form of a game in which the FA agents are the players. The exemplary game resources can include a set of feature vectors contained in the local FV database, denoted $R^{FV}$. A subset of these resources, denoted $A_i$, is the allowable resource selections of the $i^{th}$ FA agent. This means the $i^{th}$ FA agent is able to update feature vectors in the set $A_i \in 2^{R^{FV}}$. Combined, all exemplary FA agents may update the feature vectors contained in $A=\{A_i | i=1, 2, \ldots, n\}$, and these feature vectors constitute a subset of $R^{FV}$. The set A does not necessarily contain all the feature vectors in $R^{FV}$, and a specific feature vector in $R^{FV}$ may be contained in more than one of the subsets $A_i$. The feature vectors in $A_i$ derive from regions of the battlespace accessible to an $i^{th}$ sensor associated with an $i^{th}$ FA agent. This means $A_i$ is associated with a region (subset) of the battlespace. Each set $A_i$ contains a null or empty feature vector, which may be updated by the $i^{th}$ FA agent, thereby creating a new feature vector in $R^{FV}$. This new feature vector will also be added to any of the resource subsets of the other FA agents, collectively denoted $A_{-i}=\{A_1, A_2, \ldots, A_{i-1}, A_{i+1}, \ldots, A_n\}$, if the battlespace region of the new feature vector is accessible to the associated sensors of the other FA agents. From the feature vector set $A_i$, the $i^{th}$ FA agent chooses a single feature vector to update per patterns in raw sensor data, denoted $a_i$ where $a_i \in A_i$. The set of feature vector choices of all the exemplary FA agents is termed the action profile and denoted $a=\{a_1, a_2, \ldots, a_n\}$. Associated with the $i^{th}$ agent is a utility function $U_i(a)$, which for later convenience may be equivalently denoted $U_i(a_i, a_{-i})$ where the set $a_{-i}=\{a_1, a_2, \ldots, a_{i-1}, a_{i+1}, \ldots, a_n\}$. The $i^{th}$ FA agent seeks to maximize its utility by its choice of $a_i$. Note that the $i^{th}$ FA agent's utility depends also upon the choices contained in the set $a_{-i}$ of all the other FA agents. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the FA agents when the game is initially played, it must be learned by the agents over time by repeated game playing. Therefore, the FA agents operate over time, during which they learn the optimum action profile a. This means they learn which feature vectors should be updated and by which FA agents. This means that the $i^{th}$ FA agent's feature vector choice $a_i(t)$ at time t is generated by an update policy function $\pi_i$. For example, a simple update policy function $\pi_i$ is one that returns the $a_i$ that maximizes $U_i(a_i, a_{-i}(t-1))$. Thus we can have two important design choices, $U_i$ and $\pi_i$ for each FA agent. The overall expectation is that repeated application of $\pi_i$, which makes use of $U_i$, will produce a sequence of action profiles a(t) that converges upon $a^{NE}$. In addition to the utility functions $U_i$ of the individual FA agents, I as the host UxS have a given global objective W(a) that is to be maximized. At least one global objective can be that the most important feature vectors in an exemplary FV database are updated with the newest information from a given or respective set of sensors. Therefore, an embodiment is designed to enable FA agent utility functions $\{U_i\}_{i \in N}$ and update policies $\{\pi_i\}_{i \in N}$ to work together to optimize a given global objective W. In particular, at Step 501 a set of FA game players are provided aboard a single UxS. At Step 503, FA Agents commence game play with a game objective of determining optimal update of a FV database aboard a single UxS. At Step 505, game resources are provided which include FVs in a local FV database aboard a given single UxS At Step 511, game play processing continues with a set of resource selections of all agents. At Step 513, game outcome is determined by a utility determination such as discussed above or elsewhere in this application. At Step 515, a determination of whether or not the FA Agents should or can replay the game and improve on their respective outcomes where if the determination is yes, FA Agent(s) updates its resource selection using an update policy function and returns to processing at Step 511; if no, then processing continues at Step 519 where a determination is made that game processing has converged on a solution concept (equilibrium) which is a collaborative choice of FVs explained in a set, that has optimized utility of all FA agents where each FA agent has been set or designated to know which FV it will update. Processing passes from Step 519 to Step 521 where a given FA Agent updates its designated VF using SRL processing such as described herein to perform recognition of patterns from data produced from a sensor a respective FA is coupled with.

Figure 11B:
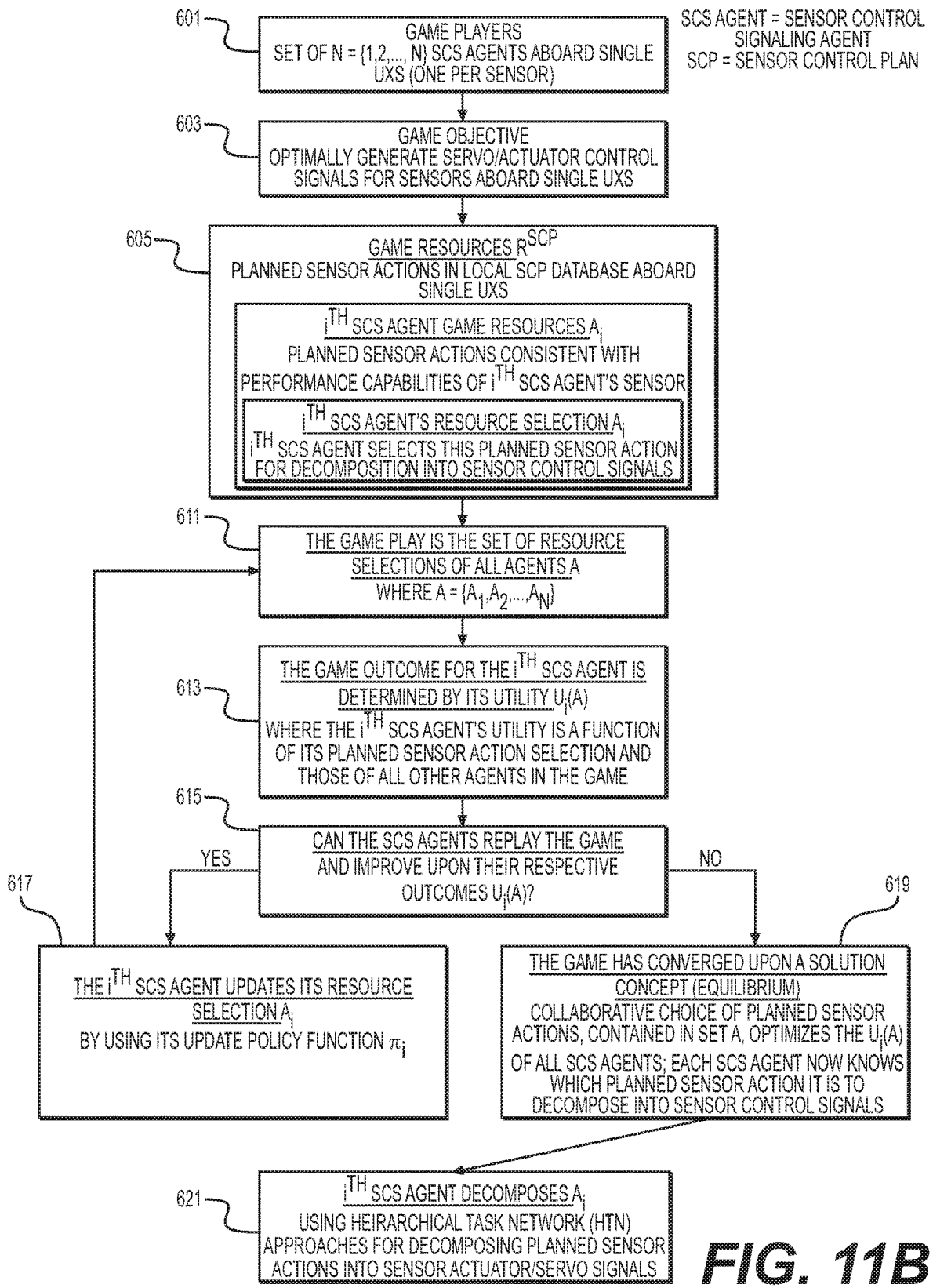
FIG. 11B shows an exemplary game execution sequence of an exemplary sensor control agent.

FIG. 11B discloses exemplary sensor control signaling (SCS) game processing played by a SCS Agent population is described below at steps 801 to 821. At Level 0, a one-to-one correspondence exists between sensors and their associated SCS agents. A set of $N=\{1, 2, \ldots, n\}$ SCS agents. These SCS agents decompose relatively high-level planned sensor actions into specific sensor control signals. These SCS agents interact with each other to extract planned sensor actions from a local sensor control plans (SCP) database. This exemplary interaction takes the form of a game in which the SCS agents are the players. The exemplary game resources can include a set of planned sensor actions contained in the SCP database, denoted $R^{SCP}$. A subset of these resources, denoted $A_i$, can be allowable resource selections of the $i^{th}$ SCS agent. This means the $i^{th}$ SCS agent is able to extract planned sensor actions in the set $A_i \in 2^{R^{SCP}}$ Combined, all exemplary SCS agents may extract the planned sensor actions contained in $A=\{A_i | i=1, 2, \ldots, n\}$, and these planned sensor actions constitute a subset of $R^{SCP}$. The set A does not necessarily contain all the planned sensor actions in $R^{SCP}$, and a specific planned sensor action in $R^{SCP}$ may be contained in more than one of the subsets $A_i$. The planned sensor actions in $A_i$ derive from the performance capabilities of my $i^{th}$ sensor associated with an $i^{th}$ SCS agent. From the planned sensor actions set $A_i$, the $i^{th}$ SCS agent chooses a single planned sensor action to decompose into sensor control signals, denoted $a_i$ where $a_i \in A_i$. The set of exemplary planned sensor action choices of all exemplary SCS agents is termed the action profile and denoted $a=\{a_1, a_2, \ldots, a_n\}$. Associated with the $i^{th}$ agent is a utility function $U_i(a)$, which for later convenience may be equivalently denoted $U_i(a_i, a_{-i})$ where the set $a_{-i}=\{a_1, a_2, \ldots, a_{i-1}, a_{i+1}, \ldots, a_n\}$. The $i^{th}$ SCS agent seeks to maximize its utility by its choice of $a_i$. Note that the exemplary $i^{th}$ SCS agent's utility can depend also upon the choices contained in the set $a_{-i}$ of all the other SCS agents. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the SCS agents when the game is initially played, it must be learned by the agents over time by repeated game playing. Therefore, the SCS agents operate over time, during which they learn the optimum action profile a. This means they learn which planned sensor actions to decompose into sensor control signals and by which SCS agents. This means that the $i^{th}$ SCS agent's planned sensor action choice $a_i(t)$ at time t is generated by an update policy function $\pi_i$. For example, a simple update policy function $\pi_i$ is one that returns the $a_i$ that maximizes $U_i(a_i, a_{-i}(t-1))$. Thus we have two important design choices, $U_i$ and $\pi_i$ for each SCS agent. The overall expectation is that repeated application of $\pi_i$, which makes use of $U_i$, will produce a sequence of action profiles a(t) that converges upon $a^{NE}$. Finally, in addition to the utility functions $U_i$ of the individual SCS agents, the host UxS has its own global objective W(a) which it seeks to maximize. A global objective can be that the most important planned sensor actions in my SCP database are optimally allocated to my sensors. Therefore, a set of all my SCS agent utility functions $\{U_i\}_{i \in N}$ and update policies $\{\pi_i\}_{i \in N}$ can be designed to work together to optimize a given global objective W. At Step 801, game players are designated or initialized. A game objective as discussed above is set at Step 803. At Steps 805 to 811, resources are selected to include SC Agent selection of planned integrated engagement actions for decomposition into sensor control plans for an associated sensor suite. At Steps 811 through 819, SC Agents play a game to determine utility as discussed above until an SC Agent's utility is determined as a function of its integrated engagement action selection in relation to other agents in the game so that a given SC Agent knows which integrated engagement action it is best suited to decompose into sensor control plans. At Step 821, SC Agent(s) use a HTN approach to decompose planned integrated engagement actions into sensor control plans for which a given SC Agent is best suited.

Figure 11C:
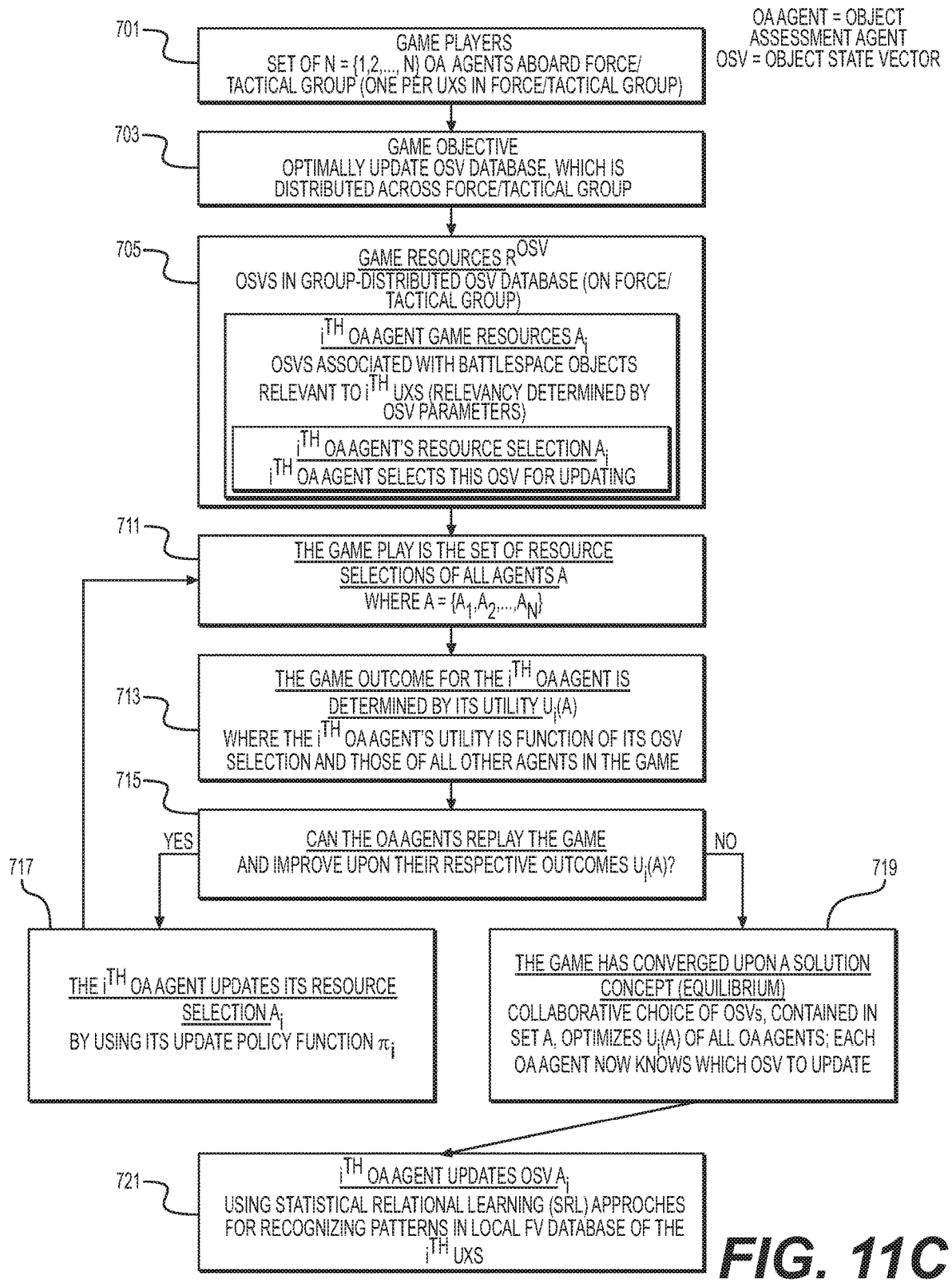
FIG. 11C shows an exemplary game execution sequence of an exemplary object assessment agent.

FIG. 11C shows an exemplary object state vector update game, played by the OA agent population within a single force/tactical group of UxS. In an Object State Vector (OSV) Update Game, a Level 1 object assessment (OA) agent is provided. An exemplary force/tactical group can include a set $N=\{1, 2, \ldots, n\}$ of UxSs, each hosting a single OA Agent. The exemplary OA agent composes object state vectors from patterns of feature vectors stored in a local FV database. The n OA agents in the exemplary force/tactical group of n UxSs interact with each other to update the group-distributed object state vectors (OSV) database, which is a distributed database accessible to the OA Agents within my force/tactical group. This interaction takes the form of a game in which the OA agents are the players. The exemplary game resources include a set of object state vectors contained in the group-distributed OSV database, denoted $R^{OSV}$ A subset of these resources, denoted $A_i$, is the allowable resource selections for the $i^{th}$ OA agent on the $i^{th}$ UxS in the exemplary force/tactical group. This means the $i^{th}$ OA agent is able to update object state vectors in the set $A_i \in 2^{R^{OSV}}$ Combined, all n of the OA agents in my force/tactical group of UxSs may update the object state vectors contained in $A=\{A_i | i=1, 2, \ldots, n\}$, and these object state vectors constitute a subset of $R^{OSV}$. The set A does not necessarily contain all the object state vectors in $R^{OSV}$, and a specific object state vector in $R^{OSV}$ may be contained in more than one of the subsets $A_i$. The object state vectors in $A_i$ derive from the battlespace objects relevant to the $i^{th}$ UxS, where relevancy is determined by the object state vector parameters such as object location. Each set $A_i$ contains a null or empty object state vector, which may be updated by the $i^{th}$ OA agent, thereby creating a new object state vector in $R^{OSV}$ This new object state vector will also be added to any of the resource subsets of the other OA agents, collectively denoted $A_{-i}=\{A_1, A_2, \ldots, A_{i-1}, A_{i+1}, \ldots, A_n\}$, if the new object is relevant to the associated OA agents' UxSs. From the object state vector set $A_i$, the $i^{th}$ OA agent chooses a single object state vector to update per patterns of feature vectors stored in the agent's UxS local FV database, denoted $a_i$ where $a_i \in A_i$. The set of object state vector choices of the n OA agents in my force/tactical group of UxSs is termed the action profile and denoted $a=\{a_1, a_2, \ldots, a_n\}$. Associated with the $i^{th}$ agent is a utility function $U_i(a)$, which for later convenience may be equivalently denoted $U_i(a_i, a_{-i})$ where the set $a_{-i}=\{a_1, a_2, \ldots, a_{i-1}, a_{i+1}, \ldots, a_n\}$. The $i^{th}$ OA agent seeks to maximize its utility by its choice of $a_i$. Note that the $i^{th}$ OA agent's utility depends also upon the choices contained in the set $a_{-i}$ of all the other OA agents in the exemplary force/tactical group of UxSs. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the OA agents when the game is initially played, it must be learned by the agents over time by repeated game playing. Therefore, the OA agents operate over time, during which they learn the optimum action profile a. This means they learn which object state vectors should be updated and by which OA agents. This means that the $i^{th}$ OA agent's object state vector choice $a_i(t)$ at time t is generated by an update policy function $\pi_i$. For example, a simple update policy function $\pi_i$ is one that returns the $a_i$ that maximizes $U_i(a_i, a_{-i}(t-1))$. Thus we have two important design choices, $U_i$ and $\pi_i$ for each OA agent. The overall expectation is that repeated application of $\pi_i$, which makes use of $U_i$, will produce a sequence of action profiles a(t) that converges upon $a^{NE}$. In addition to the utility functions $U_i$ of the individual OA agents, the hosting force/tactical group of n UxSs has a global objective W(a) which should be maximized. The force/tactical group's global objective is that the most important object state vectors in the group-distributed OSV database are updated with the newest information from the n local FV databases. Therefore, the set of all OA agent utility functions $\{U_i\}_{i \in N}$ and update policies $\{\pi_i\}_{i \in N}$ should work together to optimize W for my force/tactical group of UxSs. In particular, at Step 701, game players are provided. At Step 703, a game objective provided that includes optimal update of OSV database which is distributed across a force/tactical group. At Step 705, game resources are determined including OSVs in group distributed OSV databases (across a force tactical group). At Steps 711 through 721 the OA Agents play games to determine each OA Agent's utility for OSV selection and updating until a determination is reached for suitability of each OA Agent to update a given OSV; then each OA Agent is designated to update a specific OSV; at Step 721, SRL processing is used for recognizing patterns in a local FV database.

Figure 11D:
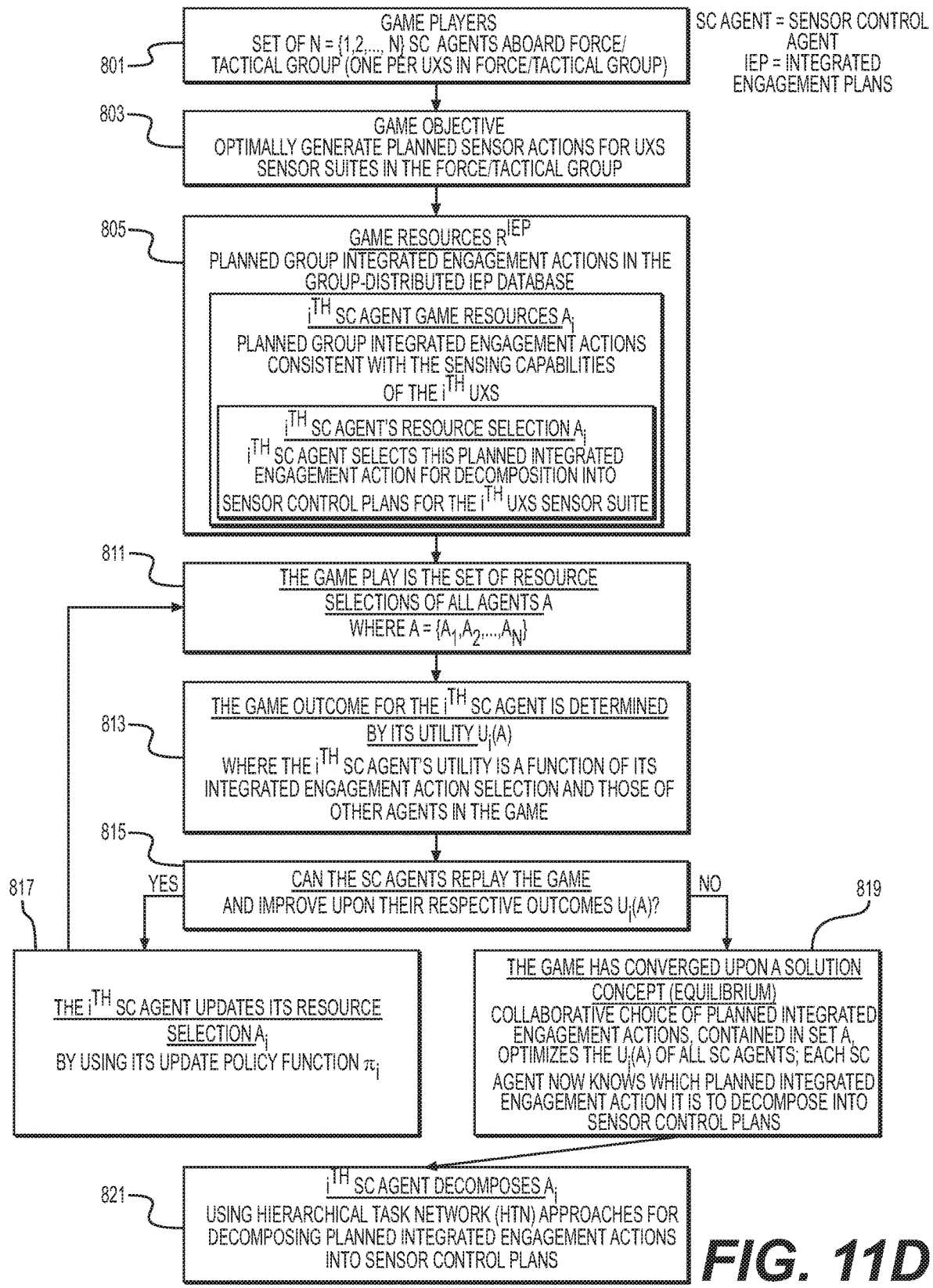
FIG. 11D shows an exemplary game execution sequence of an exemplary sensor control agent.

FIG. 11D shows an exemplary sensor control game, played by a sensor control (SC agent population within a single force/tactical group of UxSs. A Level 1 SC Agent is discussed. An exemplary force/tactical group can include a set $N=\{1, 2, \ldots, n\}$ of UxSs, each hosting a single SC agent. A SC agent decomposes relatively high-level planned group integrated engagement actions into specific planned sensor actions for my sensor suite. The exemplary SC agent then stores/updates these planned sensor actions in a local SCP database. The n SC agents in my force/tactical group of n UxSs interact with each other to extract planned group integrated engagement actions from a group-distributed integrated engagement plans (IEP) database, which is a distributed database accessible to all sensor, weapon, and platform control agents (SC, WC, and PC agents) within a force/tactical group. This exemplary interaction can take a form of a game in which the SC agents are the players. The game resources can include a set of planned group integrated engagement actions in the group-distributed IEP database, denoted $R^{IEP}$ A subset of these resources, denoted $A_i$, can be the allowable resource selections of the $i^{th}$ SC agent on the $i^{th}$ UxS in a given force/tactical group. This means the $i^{th}$ SC agent is able to extract planned group integrated engagement actions in the set $A_i \in 2^{R^{IEP}}$. Combined, all n of the SC agents may extract the planned group integrated engagement actions contained in $A=\{A_i | i=1, 2, \ldots, n\}$, and these planned group integrated engagement actions constitute a subset of $R^{IEP}$. The set A does not necessarily contain all the planned group integrated engagement actions in $R^{IEP}$, and a specific planned group integrated engagement action in $R^{IEP}$ may be contained in more than one of the subsets $A_i$. The planned group integrated engagement actions in $A_i$ derive from the sensing capabilities of the $i^{th}$ UxS in my force/tactical group. These sensing capabilities are a function of both the sensors aboard the $i^{th}$ UxS and the positioning/location of the $i^{th}$ UxS within my force/tactical group. From the planned group integrated engagement actions set $A_i$, the $i^{th}$ SC agent chooses a single planned group integrated engagement action to decompose into sensor control plans for the sensor suite aboard the $i^{th}$ UxS in my force/tactical group, denoted $a_i$ where $a_i \in A_i$. The set of planned group integrated engagement action choices of the n SC agents in my force/tactical group of UxSs is termed the action profile and denoted $a=\{a_1, a_2, \ldots, a_n\}$. Associated with the $i^{th}$ agent is a utility function $U_i(a, V_i)$, which for later convenience may be equivalently denoted $U_i(a_i, a_{-i}, V_i)$ where the set $a_{-i}=\{a_1, a_2, \ldots, a_{i-1}, a_{i+1}, \ldots, a_n\}$. The $i^{th}$ SC agent seeks to maximize its utility by its choice of $a_i$. Note that the $i^{th}$ SC agent's utility depends also upon the choices contained in the set $a_{-i}$ of all the other SC agents in my force/tactical group of UxSs. Furthermore, the $i^{th}$ SC agent's utility depends upon a subset of $R^{OSV}$, with members denoted $V_i$, which is a subset of object state vectors contained in the group-distributed OSV database of battlespace objects potentially accessible to the sensor suite of the $i^{th}$ UxS. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the SC agents when the game is initially played, it must be learned by the agents over time by repeated game playing. Therefore, the SC agents operate over time, during which they learn the optimum action profile a. This means they learn which planned group integrated engagement actions to decompose into sensor control plans and by which SC agents. This means that the $i^{th}$ SC agent's planned group integrated engagement action choice $a_i(t)$ at time t is generated by an update policy function $\pi_i$. For example, a simple update policy function $\pi_i$ is one that returns the $a_i$ that maximizes $U_i(a_i, a_{-i}(t-1), V_i)$. Thus we have two important design choices, $U_i$ and $\pi_i$ for each SC agent. The overall expectation is that repeated application of $\pi_i$, which makes use of $U_i$, will produce a sequence of action profiles a(t) that converges upon $a^{NE}$. In addition to the utility functions $U_i$ of the individual SC agents, the hosting force/tactical group of n UxSs has a global objective W(a) which should be maximized. The force/tactical group's global objective is that the most important planned group integrated engagement actions in the group-distributed IEP database are optimally decomposed for sensing and allocated to the group's UxSs, in light of the most critical battlespace objects identified in the group-distributed OSV database. Therefore, the set of all SC agent utility functions $\{U_i\}_{i \in N}$ and update policies $\{\pi_i\}_{i \in N}$ should work together to optimize W for my force/tactical group of UxSs. Generally, at Step 803, a game objective of optimally generating planned sensor actions for UxS sensor suites in the force/tactical group is set. At Step 805 and 811, game resources provided and accessed to include a planned group of integrated engagement actions in the group distributed IEP database where an agent selects relevant planned integrated engagement actions for decomposition into sensor control plans for a given UxS sensor suite. At Steps 811 through 819, agents determine their utility as a function of its integrated engagement action selection in relation to the determined utility of other agents in the game. At Step 819, the game has converged on a solution or equilibrium set of choices of planned integrated engagement actions at which point each SC Agent has selected or been aligned with a particular planned integrated action it is to decompose into sensor control plans. At step 821, the selected SC Agents use HTM approaches to decompose selected or designated planned integrated engagement plans into sensor control plans.

Figure 11E:
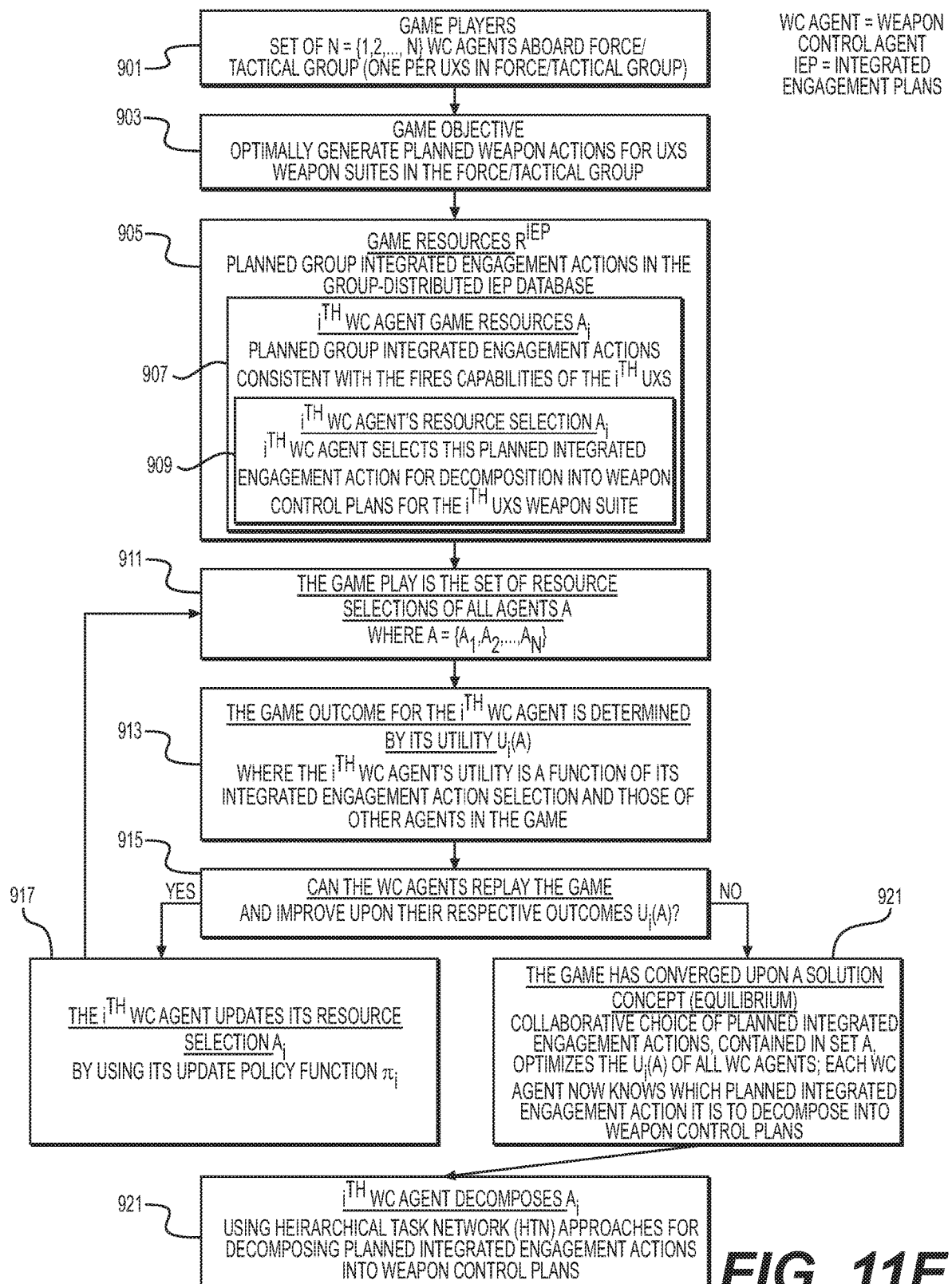
FIG. 11E shows an exemplary game execution sequence of an exemplary weapon (or effector) control agent.

FIG. 11E shows a disclosure of an exemplary weapon control (WC) game, played by the WC agent population within a single force/tactical group of UxSs. A Level 1 WC Agent is discussed. An exemplary force/tactical group consists of a set N={1, 2, ..., n} of UxSs, each hosting a single WC agent. A WC agent decomposes relatively high-level planned group integrated engagement actions into specific planned weapon actions for my weapon suite. A WC agent then stores/updates these planned weapon actions in a local WCP database. The n WC agents in the force/tactical group of n UxSs interact with each other to extract planned group integrated engagement actions from the group-distributed integrated engagement plans (IEP) database, which is a distributed database accessible to all sensor, weapon, and platform control agents (SC, WC, and PC agents) within the force/tactical group. This exemplary interaction takes the form of a game in which the WC agents are the players. The game resources include a set of planned group integrated engagement actions in the group-distributed IEP database, denoted $R^{IEP}$. A subset of these resources, denoted $A_i$, is the allowable resource selections of the $i^{th}$WC agent on the $i^{th}$ UxS in my force/tactical group. This means the $i^{th}$ WC agent is able to extract planned group integrated engagement actions in the set $A_i \in 2^{R^{IEP}}$ Combined, all n of the WC agents may extract the planned group integrated engagement actions contained in $A = \{A_i | i=1, 2, \ldots, n\}$, and these planned group integrated engagement actions make up a subset of $R^{IEP}$. The set A does not necessarily contain all the planned group integrated engagement actions in $R^{IEP}$, and a specific planned group integrated engagement action in $R^{IEP}$ may be contained in more than one of the subsets $A_i$. The exemplary planned group integrated engagement actions in $A_i$ derive from the targeting/fires capabilities (kinetic and electronic) of the $i^{th}$ UxS in my force/tactical group. These targeting/fires capabilities are a function of both the weapons aboard the $i^{th}$ UxS and the positioning/location of the $i^{th}$ UxS within my force/tactical group. From the planned group integrated engagement actions set $A_i$, the $i^{th}$ WC agent chooses a single planned group integrated engagement action to decompose into weapon control plans for the weapon suite aboard the $i^{th}$ UxS in the force/tactical group, denoted $a_i$ where $a_i \in A_i$. The set of planned group integrated engagement action choices of the n WC agents in a given force/tactical group of UxSs is termed the action profile and denoted $a=\{a_1, a_2, \ldots, a_n\}$. Associated with the $i^{th}$ agent is a utility function $U_i(a, V_i)$, which for later convenience may be equivalently denoted $U_i(a_i, a_{-i}, V_i)$ where the set $a_{-i}=\{a_1, a_2, \ldots, a_{i-1}, a_{i+1}, \ldots, a_n\}$. The $i^{th}$ WC agent seeks to maximize its utility by its choice of $a_i$. Note that the $i^{th}$ WC agent's utility depends also upon the choices contained in the set $a_{-i}$ of all the other WC agents in the force/tactical group of UxSs. Furthermore, the $i^{th}$ WC agent's utility depends upon a subset of $R^{OSV}$, with members denoted $V_i$, which is a subset of object state vectors contained in the group-distributed OSV database of battlespace objects that are targets of opportunity/urgency for the weapon suite of the $i^{th}$ UxS. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the WC agents when the game is initially played, it must be learned by the agents over time by repeated game playing. Therefore, the WC agents operate over time, during which they learn the optimum action profile a. This means they learn which planned group integrated engagement actions to decompose into weapon control plans and by which WC agents. This means that the $i^{th}$ WC agent's planned group integrated engagement action choice $a_i(t)$ at time t is generated by an update policy function $\pi_i$. For example, a simple update policy function $\pi_i$ is one that returns the $a_i$ that maximizes $U_i(a_i, a_{-i}(t-1), V_i)$. Thus we have two important design choices, $U_i$ and $\pi_i$ for each WC agent. The overall expectation is that repeated application of $\pi_i$, which makes use of $U_i$, will produce a sequence of action profiles a(t) that converges upon $a^{NE}$. In addition to the utility functions $U_i$ of the individual WC agents, the hosting force/tactical group of n UxSs has a global objective W(a) which should be maximized. The force/tactical group's global objective is that the most important planned group integrated engagement actions in the group's distributed IEP database are optimally decomposed for targeting/fires and allocated to the group's UxSs, in light of the most critical battlespace objects identified in the group-distributed OSV database. Therefore, the set of all WC agent utility functions $\{U_i\}_{i \in N}$ and update policies $\{\pi_i\}_{i \in N}$ should work together to optimize W for my force/tactical group of UxSs.

Figure 11F:
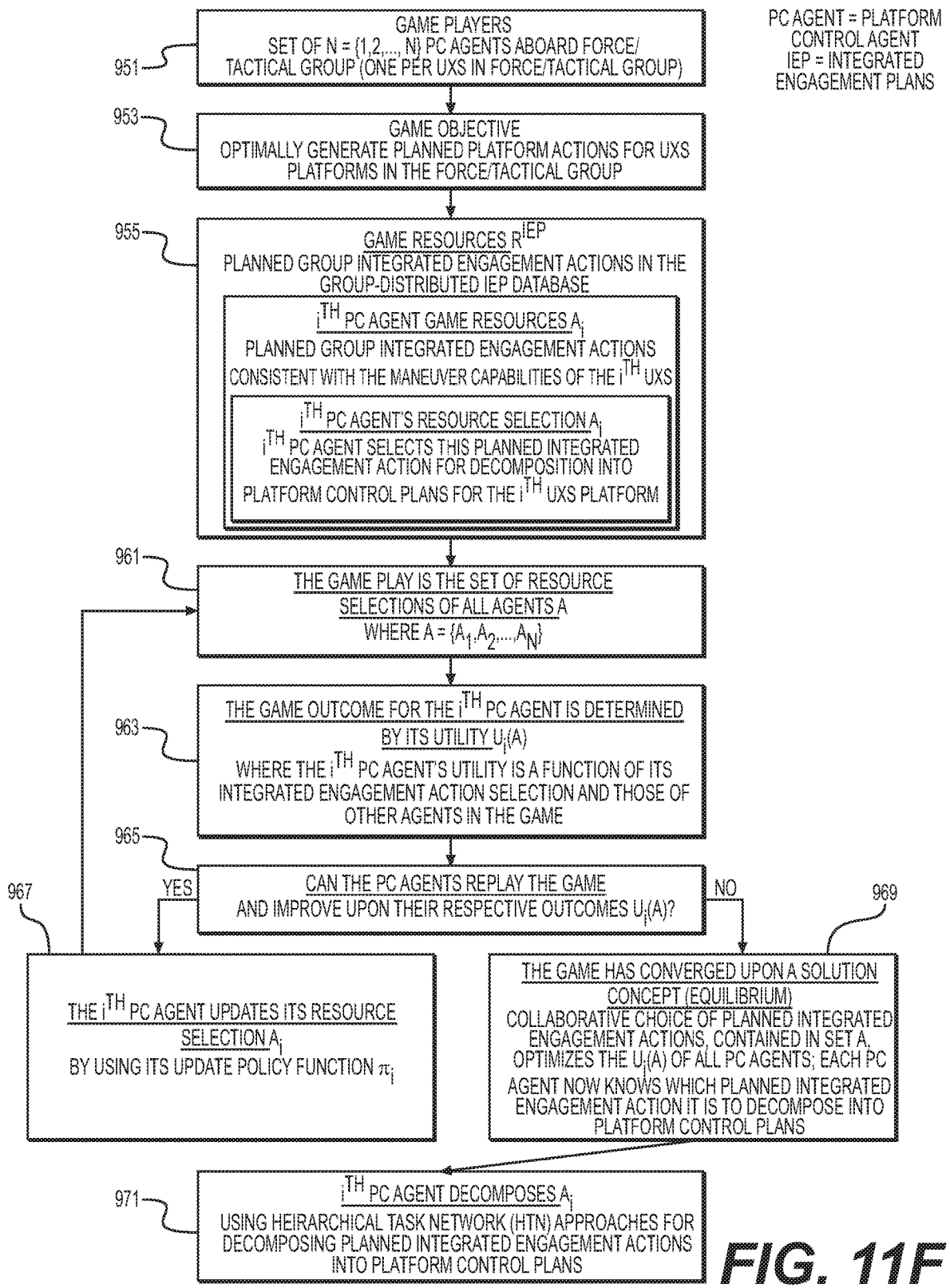
FIG. 11F shows an exemplary game execution sequence of an exemplary platform control agent.

At FIG. 11F, a platform control (PC) game processing description is shown. In this example, a Level 1 platform control (PC) agent discussed. An exemplary force/tactical group can include a set N={1, 2, ..., n} of UxSs, each hosting a single PC agent. My PC agent decomposes relatively high-level planned group integrated engagement actions into specific planned platform actions for my UxS platform. My PC agent then stores/updates these planned platform actions in my local PCP database. The n PC agents in an exemplary force/tactical group of n UxSs interact with each other to extract planned group integrated engagement actions from the group-distributed integrated engagement plans (IEP) database, which is a distributed database accessible to all sensor, weapon, and platform control agents (SC, WC, and PC agents) within the exemplary force/tactical group. This interaction takes the form of a game in which the PC agents are the players. The game resources includes of the set of planned group integrated engagement actions in the group-distributed IEP database, denoted $R^{IEP}$. A subset of these resources, denoted $A_i$, is the allowable resource selections of the $i^{th}$ PC agent on the $i^{th}$ UxS platform in the exemplary force/tactical group. This means the $i^{th}$ PC agent is able to extract planned group integrated engagement actions in the set $A_i \in 2^{R^{IEP}}$ Combined, all n of the PC agents may extract the planned group integrated engagement actions contained in $A=\{A_i | i=1, 2, \ldots, n\}$, and these planned group integrated engagement actions constitute a subset of $R^{IEP}$. The set A does not necessarily contain all the planned group integrated engagement actions in $R^{IEP}$, and a specific planned group integrated engagement action in $R^{IEP}$ may be contained in more than one of the subsets $A_i$. The planned group integrated engagement actions in $A_i$ derive from the positioning/maneuver capabilities of the $i^{th}$ UxS platform in my force/tactical group. From the planned group integrated engagement actions set $A_i$, the $i^{th}$ PC agent chooses a single planned group integrated engagement action to decompose into platform control plans for the $i^{th}$ UxS platform in my force/tactical group, denoted $a_i$ where $a_i \in A_i$. The set of planned group integrated engagement action choices of the n PC agents in my force/tactical group of UxSs is termed the action profile and denoted $a=\{a_1, a_2, \ldots, a_n\}$. Associated with the $i^{th}$ agent is a utility function $U_i(a, V_i)$, which for later convenience may be equivalently denoted $U_i(a_i, a_{-i}, V_i)$ where the set $a_{-i}=\{a_1, a_2, \ldots, a_{i-1}, a_{i+1}, \ldots, a_n\}$. The $i^{th}$ PC agent seeks to maximize its utility by its choice of $a_i$. Note that the $i^{th}$ PC agent's utility depends also upon the choices contained in the set $a_{-i}$ of all the other PC agents in the exemplary force/tactical group of UxSs. Furthermore, the $i^{th}$ PC agent's utility depends upon a subset of $R^{OSV}$, with members denoted $V_i$, which is a subset of object state vectors contained in the group-distributed OSV database of battlespace objects that share the local battlespace vicinity with the $i^{th}$ UxS. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the PC agents when the game is initially played, it must be learned by the agents over time by repeated game playing. Therefore, the PC agents operate over time, during which they learn the optimum action profile a. This means they learn which planned group integrated engagement actions to decompose into platform control plans and by which PC agents. This means that the $i^{th}$ PC agent's planned group integrated engagement action choice $a_i(t)$ at time t is generated by an update policy function $\pi_i$. For example, a simple update policy function $\pi_i$ is one that returns the $a_i$ that maximizes $U_i(a_i, a_{-i}(t-1), V_i)$. Thus we can have two important design choices, $U_i$ and $\pi_i$ for each PC agent. The overall expectation is that repeated application of $\pi_i$, which makes use of $U_i$, will produce a sequence of action profiles a(t) that converges upon $a^{NE}$. In addition to the utility functions $U_i$ of the individual PC agents, the hosting force/tactical group of n UxSs has a global objective W(a) which should be maximized. The force/tactical group's global objective is that an exemplary most important planned group integrated engagement actions in the group-distributed IEP database are optimally decomposed for individual platform positioning/maneuver and allocated to the group's UxSs, in light of the most critical battlespace objects identified in the group-distributed OSV database. Therefore, the set of all PC agent utility functions $\{U_i\}_{i \in N}$ and update policies $\{\pi_i\}_{i \in N}$ should work together to optimize W for a particular force/tactical group of UxSs. In particular, at Step 951, game player are selected or designated as discussed above. At Step 953, a game objective is set as discussed above. At Step 955, game resources are provided and selection is executed where a given PC Agent selects planned integrated engagement actions. At Step 955, game resources are set and PC Agents select planned integrated engagement actions for decomposition into platform control plans for a given UxS. At Steps 961 through 969, the PC Agents play games to determine PC agent utility of their integrated action selections in comparison each Agent to converge upon a solution or equilibrium so that each PC Agent knows which planned integrated engagement action it is best suited to decompose into platform control actions. At Step 971, designated PC Agent (S) perform decomposition processing using HTN approaches for decomposing planned integrated engagement actions into platform control plans.

Figure 11G:
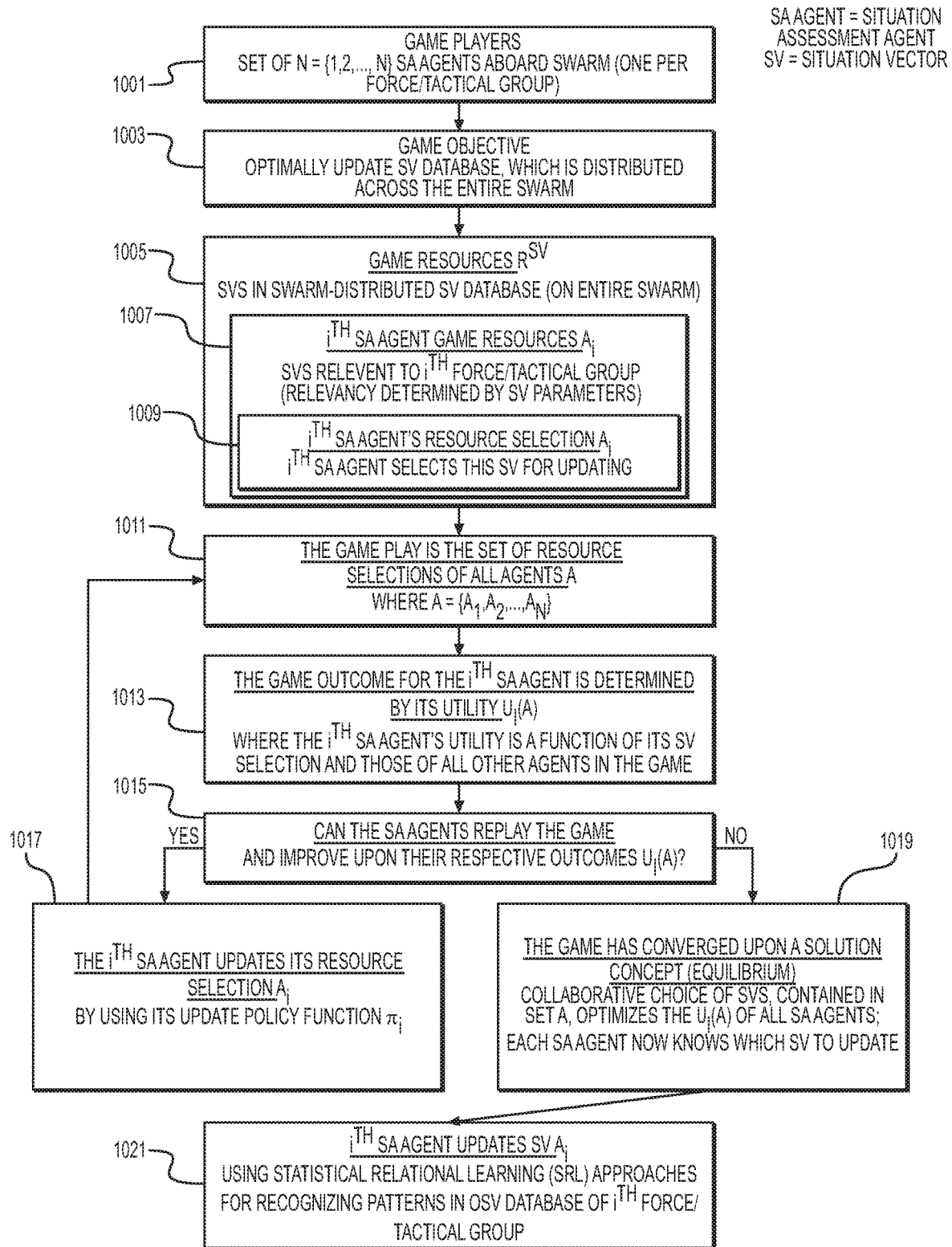
FIG. 11G shows an exemplary game execution sequence of an exemplary situation assessment agent.

FIG. 11G show an exemplary situation vector (SV) update game, played by a Situation Assessment (SA) Agent population across a swarm of force/tactical groups. An exemplary force/tactical UxS group hosts a single Level 2 situation assessment (SA) agent. This SA agent utilizes the computing resources of all the UxSs in its force/tactical group, and is an AI agent based on parallel message-passing processes. While the force tactical group hosts one of these parallel SA agent processes, the SA agent's computational load is shared by all the UxSs in the force/tactical group. Because of its parallel design, this SA agent is robust to marginal loss of members of my force/tactical group. The swarm in its entirety can include a set $N=\{1, 2, \ldots, n\}$ of force/tactical groups, each in this example hosting a single SA agent. My group's SA agent composes situation vectors from patterns of object state vectors contained in my group-distributed OSV database. The n SA agents in the entire swarm of force tactical groups interact with each other to update the swarm-distributed situation vectors (SV) database, which is a distributed database accessible to the swarm's SA agents. This interaction takes the form of a game in which the SA agents are the players. The game resources includes a set of situation vectors contained in the swarm-distributed SV database, denoted $R^{SV}$. A subset of these resources, denoted $A_i$, is the allowable resource selections for the $i^{th}$ SA agent of the $i^{th}$ force/tactical group in the swarm. This means the $i^{th}$ SA agent is able to update situation vectors in the set $A_i \in 2^{R^{SV}}$ Combined, all n of the SA agents in the swarm of force/tactical groups may update the situation vectors contained in $A=\{A_i | i=1, 2, \ldots, n\}$, and these situation vectors constitute a subset of $R^{SV}$. The set A does not necessarily contain all the situation vectors in $R^{SV}$, and a specific situation vector in $R^{SV}$ may be contained in more than one of the subsets $A_i$. The situation vectors in $A_i$ derive from the situations relevant to the $i^{th}$ force/tactical group, where relevancy is determined by the situation vector parameters such as situation location, situation category/type, and the battlespace objects forming the situational relationships. Each set $A_i$ contains a null or empty situation vector, which may be updated by the $i^{th}$ SA agent, thereby creating a new situation vector in $R^{SV}$. This new situation vector will also be added to any of the resource subsets of the other SA agents, collectively denoted $A_{-i}=\{A_1, A_2, \ldots, A_{i-1}, A_{i+i}, \ldots, A_n\}$, if the new situation is relevant to the associated SA agents' force/tactical groups. From the situation vector set $A_i$, the $i^{th}$ SA agent chooses a single situation vector to update per patterns of object state vectors stored in the agent's force/tactical group group-distributed OSV database, denoted $a_i$ where $a_i \in A_i$. The set of situation vector choices of the n SA agents in the swarm of force/tactical groups of UxSs is termed an action profile and denoted $a=\{a_1, a_2, \ldots, a_n\}$. Associated with the $i^{th}$ agent is a utility function $U_i(a)$, which for later convenience may be equivalently denoted $U_i(a_i, a_{-i})$ where the set $a_{-i}=\{a_1, a_2, \ldots, a_{i-1}, a_{i+1}, \ldots, a_n\}$. The $i^{th}$ SA agent seeks to maximize its utility by its choice of $a_i$. Note that the $i^{th}$ SA agent's utility in this example depends also upon the choices contained in the set $a_{-i}$ of all the other SA agents in the swarm of force/tactical groups. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the SA agents when the game is initially played, it must be learned by the agents over time by repeated game playing. Therefore, the SA agents operate over time, during which they learn the optimum action profile a. This means they learn which situation vectors should be updated and by which SA agents. This means that the $i^{th}$ SA agent's situation vector choice $a_i(t)$ at time t is generated by an update policy function $\pi_i$. For example, a simple update policy function $\pi_i$ is one that returns the $a_i$ that maximizes $U_i(a_i, a_{-i}(t-1))$. Thus we have two important design choices, $U_i$ and $\pi_i$ for each SA agent. The overall expectation is that repeated application of $\pi_i$, which makes use of $U_i$, will produce a sequence of action profiles a(t) that converges upon $a^{NE}$. In addition to the utility functions $U_i$ of the individual SA agents, the entire swarm of n force/tactical groups has a global objective W(a) which should be maximized. The swarm's global objective is that the most important situation vectors in the swarm-distributed SV database are updated with the newest information from the group-distributed OSV databases. Therefore, the set of all SA agent utility functions $\{U_i\}_{i \in N}$ and update policies $\{\pi_i\}_{i \in N}$ should work together to optimize W for the entire swarm. At Step 1001, game players are designated as discussed above. At Step 1003, game objective(s) are set as discussed above. At Step 1005, game resources are set and SA Agent resource selection processing commences where SA Agent(s) select SVs for update. At Step 1011 through 1019, game processing commences where the game outcome is determined by a utility function module where each SA Agent's utility with respect to a given SV is evaluated until the game converges on a solution or equilibrium where each SA Agent knows which SV to update. At Step 1021, designated SA Agents update associated SVs using SRL approaches for recognizing patterns in an associated OSV database of a force tactical group.

Figure 11H:
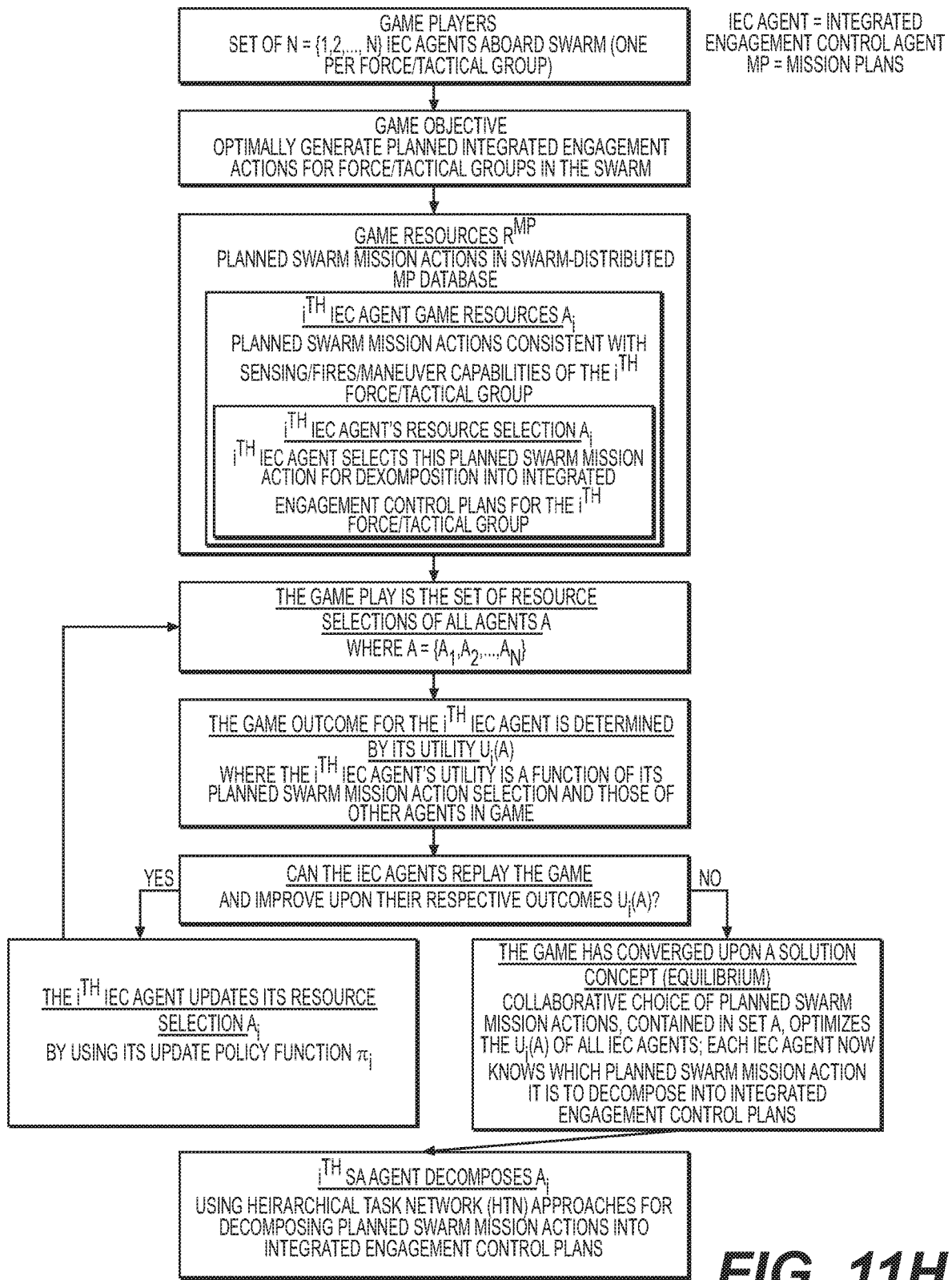
FIG. 11H shows an exemplary game execution sequence of an exemplary integrated engagement control agent.

FIG. 11H shows a game processing for integrated engagement control (IEC) Agents in accordance with one embodiment of the invention. A force/tactical UxS group hosts a single Level 2 (IEC) agent. This exemplary IEC agent utilizes the computing resources of all the UxSs in the exemplary force/tactical group, and is an AI agent based on parallel message-passing processes. While a given force tactical group hosts one of these parallel IEC agent processes, the IEC agent's computational load is shared by all the UxSs in the force/tactical group. Because of its parallel design, this IEC agent is robust to marginal loss of members of the force/tactical group. The swarm in its entirety includes a set $N=\{1, 2, \ldots, n\}$ of force/tactical groups of, each hosting a single IEC agent. The group's IEC agent decomposes relatively high-level planned swarm mission actions into specific planned group integrated engagement actions for my force/tactical group. The group's IEC agent then stores/updates these planned group integrated engagement actions in my group-distributed IEP database. The n IEC agents in the entire swarm of force/tactical groups interact with each other to extract planned swarm mission actions from the swarm-distributed mission plans (MP) database, which is a distributed database accessible to the swarm's IEC agents. This interaction takes the form of a game in which the IEC agents are the players. The game resources can include a set of planned swarm mission actions in the swarm-distributed MP database, denoted $R^{MP}$. A subset of these resources, denoted $A_i$, is the allowable resource selections of the $i^{th}$ IEC agent of the $i^{th}$ force/tactical group in the swarm. This means the $i^{th}$ IEC agent is able to extract planned swarm mission actions in the set $A_i \in 2^{R^{MP}}$. Combined, all n of the IEC agents in the swarm of force/tactical groups may extract the planned swarm mission actions contained in $A=\{A_i | i=1, 2, \ldots, n\}$, and these planned swarm mission actions constitute a subset of $R^{MP}$. The set A does not necessarily contain all the planned swarm mission actions in $R^{MP}$, and a specific planned swarm mission action in $R^{MP}$ may be contained in more than one of the subsets $A_i$. The planned swarm mission actions in $A_i$ derive from the sensing, fires, and positioning/maneuver capabilities of the $i^{th}$ force/tactical group in the swarm. From the planned swarm mission actions set $A_i$, the $i^{th}$ IEC agent chooses a single planned swarm mission action to decompose into integrated engagement plans for the $i^{th}$ force/tactical group in the swarm, denoted $a_i$ where $a_i \in A_i$. The set of planned swarm mission action choices of the n IEC agents in the swarm of force/tactical groups of UxSs is termed the action profile and denoted $a=\{a_1, a_2, \ldots, a_n\}$. Associated with the $i^{th}$ agent is a utility function $U_i(a, V_i)$, which for later convenience may be equivalently denoted $U_i(a_i, a_{-i}, V_i)$ where the set $a_{-i}=\{a_1, a_2, \ldots, a_{i-1}, a_{i+1}, \ldots, a_n\}$. The $i^{th}$ IEC agent seeks to maximize its utility by its choice of $a_i$. Note that the $i^{th}$ IEC agent's utility depends also upon the choices contained in the set $a_{-i}$ of all the other IEC agents in the swarm of force/tactical groups. Furthermore, the $i^{th}$ IEC agent's utility depends upon a subset of $R^{SV}$, with members denoted $V_i$, which is a subset of situation vectors contained in the swarm-distributed SV database of situations that are directly relevant (in terms of situation location, situation category/type, and the battlespace objects forming the situational relationships) to the $i^{th}$ force/tactical group. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the IEC agents when the game is initially played, it must be learned by the agents over time by repeated game playing. Therefore, the IEC agents operate over time, during which they learn the optimum action profile a. This means they learn which planned swarm mission actions to decompose into integrated engagement control plans and by which IEC agents. This means that the $i^{th}$ IEC agent's planned swarm mission action choice $a_i(t)$ at time t is generated by an update policy function $\pi_i$. For example, a simple update policy function $\pi_i$ is one that returns the $a_i$ that maximizes $U_i(a_i, a_{-i}(t-1), V_i)$. Thus we can have two important design choices, $U_i$ and $\pi_i$ for each IEC agent. The overall expectation is that repeated application of $\pi_i$, which makes use of $U_i$, will produce a sequence of action profiles a(t) that converges upon $a^{NE}$. In addition to the utility functions $U_i$ of the individual IEC agents, the entire swarm of n force/tactical groups can have as a global objective W(a) which should be maximized. The swarm's global objective is that the most important planned swarm mission actions in the swarm-distributed MP database are optimally decomposed for group sensing, fires, and positioning/maneuver, and allocated to the swarm's force/tactical groups, in light of the most critical situations in the swarm-distributed SV database. Therefore, the set of all IEC agent utility functions $\{U_i\}_{i \in N}$ and update policies $\{\pi_i\}_{i \in N}$ should work together to optimize W for the entire swarm.

Figure 11I:
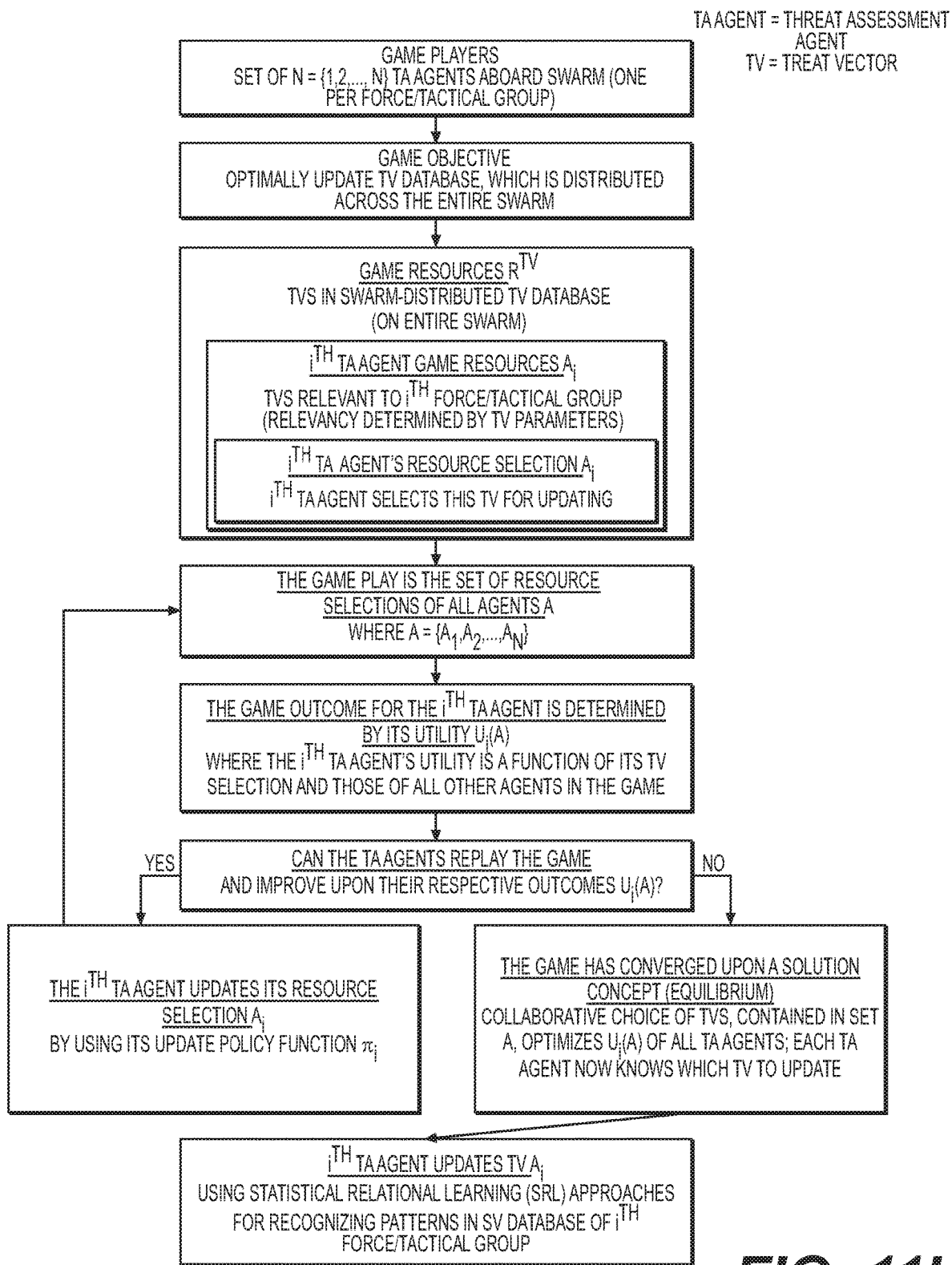
FIG. 11I shows an exemplary game execution sequence of an exemplary threat assessment agent.

FIG. 11I shows an exemplary description of a Threat Assessment (TA) Agent game overview. A force/tactical UxS group hosts a single Level 3 threat assessment (TA) agent. This TA agent utilizes the computing resources of all the UxSs in my force/tactical group, and is an AI agent based on parallel message-passing processes. While the force/tactical group hosts one of these parallel TA agent processes, the TA agent's computational load is shared by all the UxSs in the force/tactical group. Because of its parallel design, this TA agent is robust to marginal loss of members of my force/tactical group. The swarm in its entirety consists of a set N={1, 2, . . . , n} of force/tactical groups, each hosting a single TA agent. The group's TA agent composes threat vectors from patterns of situation vectors contained in the swarm-distributed SV database. The n TA Agents in the entire swarm of force tactical groups interact with each other to update the swarm-distributed threat vectors (TV) database, which is a distributed database accessible to the swarm's TA agents. This interaction takes the form of a game in which the TA agents are the players. The game resources can include a set of threat vectors contained in the swarm-distributed TV database, denoted $R^{TV}$. A subset of these resources, denoted $A_i$, is the allowable resource selections for the $i^{th}$ TA agent of the $i^{th}$ force/tactical group in the swarm. This means the $i^{th}$ TA agent is able to update situation vectors in the set $A_i \in 2^{R^{TV}}$ Combined, all n of the TA agents in the swarm of force/tactical groups may update the threat vectors contained in A={$A_i$|i=1, 2, . . . , n}, and these threat vectors constitute a subset of $R^{TV}$. The set A does not necessarily contain all the threat vectors in $R^{TV}$, and a specific threat vector in $R^{TV}$ may be contained in more than one of the subsets $A_i$. The threat vectors in $A_i$ derive from the threats relevant to the $i^{th}$ force/tactical group, where relevancy is determined by the threat vector parameters such as impact magnitude/urgency, threat category/type, and the causally interdependent battlespace situations forming the spatial/time sequence that constitutes the threat. Each set $A_i$ contains a null or empty threat vector, which may be updated by the $i^{th}$ TA agent, thereby creating a new threat vector in $R^{TV}$. This new threat vector will also be added to any of the resource subsets of the other TA agents, collectively denoted $A_{-i}$={$A_1, A_2, \ldots, A_{i-1}, A_{i+1}, \ldots, A_n$}, if the new threat is relevant to the associated TA agents' force/tactical groups. From the threat vector set $A_i$, the $i^{th}$ TA agent chooses a single threat vector to update per patterns of situation vectors relevant to the $i^{th}$ force/tactical group that are stored in the swarm-distributed SV database, denoted $a_i$ where $a_i \in A_i$. Relevancy of a situation vector to a force/tactical group in at least some embodiments can be determined by the situation vector parameters such as situation location, situation category/type, and the battlespace objects forming the situational relationships. The exemplary set of threat vector choices of the n TA agents in the swarm of force/tactical groups of UxSs is termed the action profile and denoted a={$a_1, a_2, \ldots, a_n$}. Associated with the $i^{th}$ agent is a utility function $U_i(a)$, which for later convenience may be equivalently denoted $U_i(a_i, a_{-i})$ where the set $a_{-i}$={$a_1, a_2, \ldots, a_{i-1}, a_{i+1}, \ldots, a_n$}. The $i^{th}$ TA agent seeks to maximize its utility by its choice of $a_i$. Note that the $i^{th}$ TA agent's utility depends also upon the choices contained in the set $a_{-i}$ of all the other TA agents in the swarm of force/tactical groups. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the TA agents when the game is initially played, it must be learned by the agents over time by repeated game playing. Therefore, the TA agents operate over time, during which they learn the optimum action profile a. This means they learn which threat vectors should be updated and by which TA agents. This means that the $i^{th}$ TA agent's threat vector choice $a_i(t)$ at time t is generated by an update policy function $\pi_i$. For example, a simple update policy function $\pi_i$ is one that returns the $a_i$ that maximizes $U_i(a_i, a_{-i}(t-1))$. Thus we have two important design choices, $U_i$ and $\pi_i$ for each TA agent. The overall expectation is that repeated application of $\pi_i$, which makes use of $U_i$, will produce a sequence of action profiles a(t) that converges upon $a^{NE}$. In addition to the utility functions $U_i$ of the individual TA agents, the entire swarm of n force/tactical groups has a global objective W(a) which should be maximized. The swarm's global objective is that the most important threat vectors in the swarm-distributed TV database are updated with the newest information from the swarm-distributed SV database. Therefore, the set of all TA agent utility functions $\{U_i\}_{i \in N}$ and update policies $\{\pi_i\}_{i \in N}$ should work together to optimize W for the entire swarm.

Figure 11J:
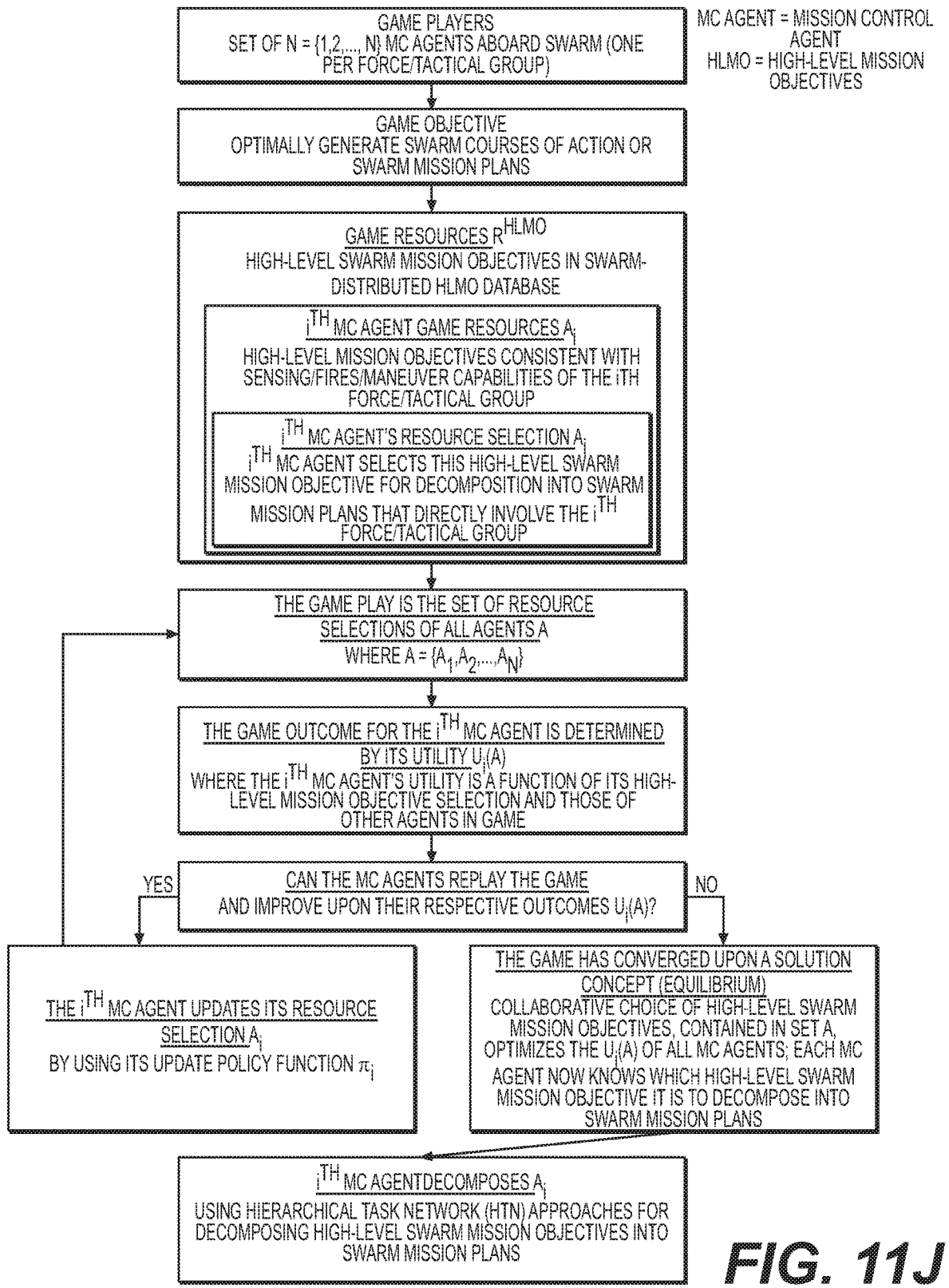
FIG. 11J shows an exemplary game execution sequence of an exemplary mission control agent.

FIG. 11J shows a description of mission control (MC) Agent game processing or overviews. An exemplary force/tactical UxS group hosts a single Level 3 MC agent. This MC agent utilizes the computing resources of all the UxSs in the force/tactical group, and is an AI agent based on parallel message-passing processes. While the force/tactical group hosts one of these parallel MC agent processes, the MC agent's computational load is shared by all the UxSs in the force/tactical group. Because of its parallel design, the exemplary MC agent is robust to marginal loss of members of the force/tactical group. The swarm in its entirety consists of a set N={1, 2, . . . , n} of force/tactical groups, each hosting a single MC agent. This exemplary group's MC agent decomposes high-level swarm mission objectives into planned swarm courses of action or swarm mission plans that involve my force/tactical group. My group's MC agent then stores/updates these mission action plans in the swarm-distributed MP database. The n MC agents in the entire swarm of force/tactical groups interact with each other to extract high-level swarm mission objectives from the swarm-distributed high-level mission objectives (HLMO) database, which is a distributed database accessible to the swarm's MC agents. This interaction takes the form of a game in which the MC agents are the players. The game resources can include a set of high-level swarm mission objectives in the swarm-distributed HLMO database, denoted $R^{HLMO}$. A subset of these resources, denoted $A_i$, is the allowable resource selections of the $i^{th}$MC agent of the $i^{th}$ force/tactical group in the swarm. This means the $i^{th}$ MC agent is able to extract high-level swarm mission objectives in the set $A_i \in 2^{R^{HLMO}}$. Combined, all n of the MC agents in the swarm of force/tactical groups may extract the high-level swarm mission objectives contained in A={$A_i$|i=1, 2, . . . , n}, and these high-level swarm mission objectives constitute a subset of $R^{HLMO}$. The set A does not necessarily contain all the high-level swarm mission objectives in $R^{HLMO}$, and a specific high-level swarm mission objective in $R^{HLMO}$ may be contained in more than one of the subsets $A_i$. The high-level swarm mission objectives in $A_i$ derive from the sensing, fires, and positioning/maneuver capabilities of the $i^{th}$ force/tactical group in the swarm. From the high-level swarm mission objectives set $A_i$, the $i^{th}$ MC agent chooses a single high-level swarm mission objective to decompose into planned swarm courses of action or swarm mission plans that directly involve the $i^{th}$ force/tactical group in the swarm, denoted $a_i$ where $a_i \in A_i$. The set of high-level swarm mission objective choices of the n MC agents in the swarm of force/tactical groups of UxSs is termed the action profile and denoted $a=\{a_1, a_2, \ldots a_n\}$. Associated with the $i^{th}$ agent is a utility function $U_i(a, V_i)$, which for later convenience may be equivalently denoted $U_i(a_i, a_{-i}, V_i)$ where the set $a_{-i}=\{a_1, a_2, \ldots, a_{i-1}, a_{i+1}, \ldots, a_n\}$. The $i^{th}$ MC agent seeks to maximize its utility by its choice of $a_i$. Note that the $i^{th}$ MC agent's utility depends also upon the choices contained in the set $a_{-i}$ of all the other MC agents in the swarm of force/tactical groups. Furthermore, the exemplary $i^{th}$ MC agent's utility depends upon a subset of $R^{TV}$, with members denoted $V_i$ which is a subset of threat vectors contained in the swarm-distributed TV database of threats that are directly relevant (in terms of impact magnitude/urgency, threat category/type, and the causally interdependent battlespace situations forming the spatial/time sequence that constitutes the threat) to the $i^{th}$ force/tactical group. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the MC agents when the game is initially played, it must be learned by the agents over time by repeated game playing. Therefore, the MC agents operate over time, during which they learn the optimum action profile a. This means they learn which high-level swarm mission objectives to decompose into planned swarm courses of action or swarm mission plans and by which MC agents. This means that the $i^{th}$ MC agent's high-level swarm mission objective choice $a_i(t)$ at time t is generated by an update policy function $\pi_i$. For example, a simple update policy function $\pi_i$ is one that returns the $a_i$ that maximizes $U_i(a_i, a_{-i}(t-1), V_i)$. Thus we have two important design choices, $U_i$ and $\pi_i$ for each MC agent. The overall expectation is that repeated application of $\pi_i$, which makes use of $U_i$, will produce a sequence of action profiles a(t) that converges upon $a^{NE}$. In addition to the utility functions $U_i$ of the individual MC agents, the entire swarm of n force/tactical groups has a global objective W(a) which should be maximized. The swarm's global objective is that the most important high-level swarm mission objectives in the swarm-distributed HLMO database are optimally decomposed into swam courses of action and mission plans, in light of the most critical threats in the swarm-distributed TV database. Therefore, the set of all MC agent utility functions $\{U_i\}_{i \in N}$ and update policies $\{\pi_i\}_{i \in N}$ should work together to optimize W for the entire swarm.

Figure 11K:
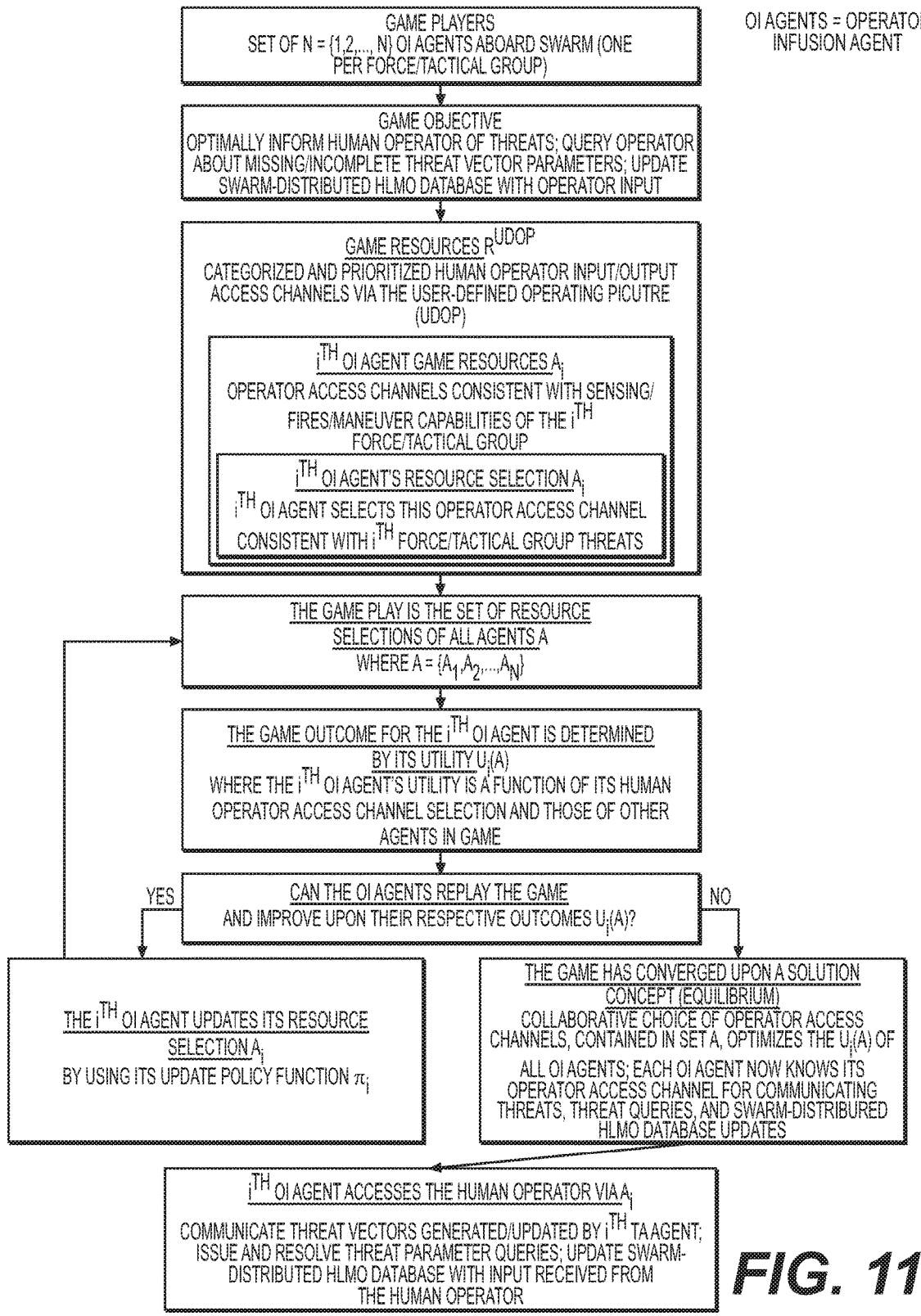
FIG. 11K shows an exemplary game execution sequence of an exemplary operator infusion agent.

FIG. 11K shows an exemplary description of an Operator Infusion (OI) Agents game in accordance with one exemplary embodiment of the invention. An exemplary force/tactical UxS group hosts a single Level 5 OI Agent. In at least one embodiment, an exemplary force/tactical group's OI Agent can have the following functions or processing subroutines: access the swarm-distributed TV database, analyze threat vectors formulated/updated by my force/tactical group's TA agent, and prepare presentation of these impacts/threats to the human operator; formulate queries to the human operator about missing/incomplete/inaccurate threat vector parameters; update the swarm-distributed HLMO database with input generated by the human operator; communicate with the human operator regarding these matters. In at least some embodiments, exemplary human operator responses to the OI agent queries can be used to update the swarm-distributed TV database and to facilitate agent learning (active advice-seeking). In this embodiment, this OI Agent utilizes the computing resources of all the UxSs in the force/tactical group, and is an AI agent based on parallel message-passing processes. While a force/tactical group hosts one of these parallel OI agent processes, the OI agent's computational load is shared by all the UxSs in the force/tactical group. Because of its parallel design, this exemplary OI Agent is robust to marginal loss of members of my force/tactical group. This exemplary swarm in its entirety can be made up of a set $N=\{1, 2, \ldots, n\}$ of force/tactical groups, each hosting a single OI Agent. The exemplary n OI agents in the entire swarm of force tactical groups interact with each other to access the human operator. This exemplary interaction takes the form of a game in which the OI agents are the players. The game resources can include a set of operator input/output access channels, via the user-defined operating picture (UDOP), denoted $R^{UDOP}$. A subset of these resources, denoted $A_i$, is the allowable resource selections for the $i^{th}$ OI agent of the $i^{th}$ force/tactical group in the swarm. This means the $i^{th}$ OI agent is able to access the human operator via UDOP channels in the set $A_i \in 2R^{UDOP}$. Combined, all n of the OI agents in the swarm of force/tactical groups may access the human operator via the channels contained in $A=\{A_i | i=1, 2, \ldots, n\}$, and these channels constitute a subset of $R^{UDOP}$. The set A does not necessarily contain all the access channels in $R^{UDOP}$ and a specific channel in $R^{UDOP}$ may be contained in more than one of the subsets $A_i$. The exemplary access channels in $A_i$ derive from the sensing, fires, and positioning/maneuver capabilities of the $i^{th}$ force/tactical group in the swarm. From the UDOP access channel set $A_i$, the exemplary $i^{th}$ OI agent chooses a single channel consistent with the level of threats/impacts directly involving the $i^{th}$ force/tactical group in the swarm, denoted $a_i$ where $a_i \in A_i$. The set of UDOP access channel choices of the n OI agents in the swarm of force/tactical groups of UxSs is termed the action profile and denoted $a=\{a_1, a_2, \ldots, a_n\}$. Associated with the $i^{th}$ agent is a utility function or program $U_i(a, V_i)$, which for later convenience may be equivalently denoted $U_i(a_i, a_{-i}, V_i)$ where the set $a_{-i}=\{a_1, a_2, \ldots, a_{i-1}, a_{i+1}, \ldots, a_n\}$. The exemplary $i^{th}$ OI agent seeks to maximize its utility by its choice of $a_i$. Note that the $i^{th}$ OI agent's utility depends also upon the choices contained in the set $a_{-i}$ of all the other OI agents in the swarm of force/tactical groups. Furthermore, the $i^{th}$ OI agent's utility depends upon a subset of $R^{TV}$, with members denoted $V_i$, which is a subset of threat vectors contained in the swarm-distributed TV database of threats that have been updated by the $i^{th}$ force/tactical group's TA agent. Yet to be determined are the functional properties of the utilities $U_i$, but it is anticipated that if all the $U_i$ may be represented by a single potential, then a Nash equilibrium solution concept $a=a^{NE}$ exists. Because this solution concept is not known to the OI agents when the game is initially played, it must be learned by the agents over time by repeated game playing. Therefore, the OI agents operate over time, during which they learn the optimum action profile a. This means they learn which UDOP channels should be used to access the human operator and by which OI agents. This means that the $i^{th}$ OI agent's UDOP channel choice $a_i(t)$ at time t is generated by an update policy function or program $\pi_i$. For example, a simple update policy function $\pi_i$ is one that returns the $a_i$ that maximizes $U_i(a_i, a_{-i}(t-1), V_i)$. Thus we have two important design choices, $U_i$ and $\pi_i$ for each UI agent. The overall expectation is that repeated application of $\pi_i$, which makes use of $U_i$, will produce a sequence of action profiles a(t) that converges upon $a^{NE}$. In addition to the utility functions $U_i$ of the individual OI agents, the entire swarm of n force/tactical groups has an exemplary global objective W(a) which should be maximized. The swarm's global objective is that the most important threat vectors and related queries get to the human operator, and the most critical new/updated high-level swarm mission objectives are received from the human operator, both in a timely and efficient fashion. Therefore, the set of all OI agent utility functions $\{U_i\}_{i \in N}$ and update policies $\{\pi_i\}_{i \in N}$ should work together to optimize W for the entire swarm.

Figure 12B:
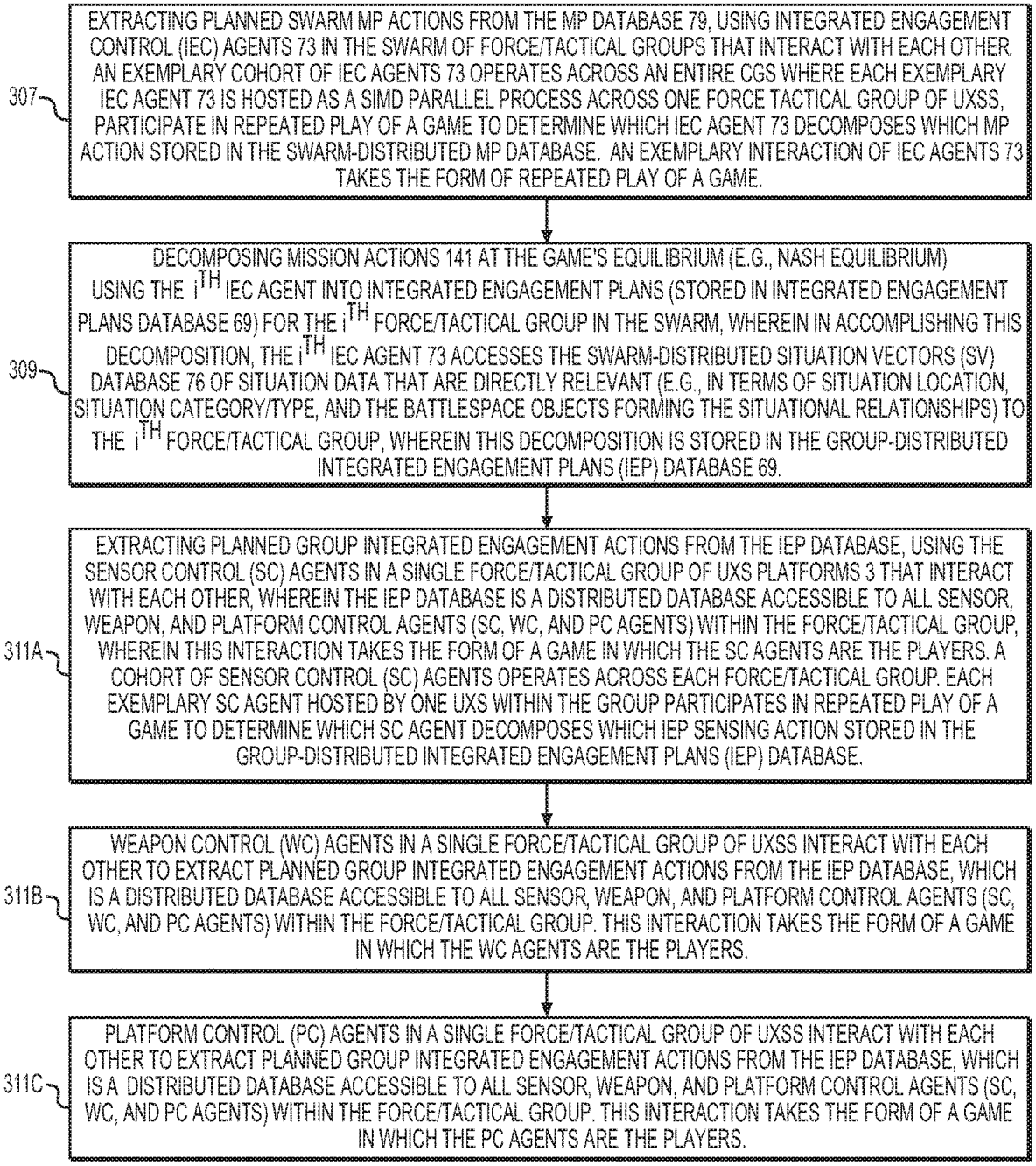

FIG. 12A shows an exemplary method in accordance with one embodiment of the invention. Step 301: Inputting or updating, using an Operator Control Station 33, new or updated high-level mission objectives data 131 that are transmitted or communicated to the operator infusion SIMD agents 85 across a plurality of platforms 3A, 3B, 3C, etc within either a designated force/tactical group comprising a plurality of the UxS platforms 3 or all of the UxS platforms 3 within a swarm which in turn updates the swarm-distributed high-level mission objectives (HLMO) database 89 on all UxS platforms 3 or UxS platforms within one or more designated force/tactical groups, where the mission objectives 131 include an effect on a target or targets or entities and a target or entity identification with a target or entity location or one or more patterns that can be associated with the target, targets or entities, e.g., a target image or pattern usable by a sensor for pattern matching with the target image or pattern, where the exemplary effect can be a condition change or interaction associated with the target such as, e.g., destruction, damage, disruption of entity or target function, control over the target or entity, movement, observation, manipulation of the target or entity, repair, modification, replacement, positioning, orientation, engagement with one or more elements of the target e.g., a camera, communication system, a tool, an equipment item, etc. An exemplary mission objective data file can include one or more higher level actions and constraints on actions, (e.g. rules of engagement, collateral damage limits, etc). Note that an exemplary overall intended effect of an exemplary swarm mission is a transition of an operating environment, e.g., battlespace, from its pre-mission state to a goal state desired by a human operator at mission end. In this embodiment, a HLMO is one of several distinct stages or steps within this transition. Like plan actions, an exemplary HLMO is specified by its preconditions and effects. Like actions, HLMOs are subject to ordering constraints and to pairwise causal linkage. The exemplary HLMO set may be totally or partially ordered, depending upon the needs and wishes of the human operator. Unlike lower level actions, the exemplary HLMO set does not specify how swarm sensors, weapons, UxS platforms, and force/tactical groups are to bring about the desired battlespace transition, but only what the transition steps should look like. Step 303: Extracting high-level swarm mission objectives from the HLMO database 89, which is a distributed database accessible to the swarm's mission control (MC) SIMD agents 91, using mission control (MC) SIMD agents 91 in the entire swarm of force/tactical groups (one MC SIMD agent per group) interact with each other. This interaction takes the form of a game in which the MC SIMD agents 91 are the players. An exemplary CGS comprises a cohort, team or collection of MC SIMD agents 91 where each MC SIMD agent 91 is hosted in parallel across one force/tactical group of UxSs and participates in repeated play of a game to determine which MC SIMD agent 91 decomposes which HLMO stored in the swarm-distributed HLMO database 89. At Step 305: Decomposing high level swarm mission objectives at a game equilibrium (e.g., Nash equilibrium) point, using an $i^{th}$ MC SIMD agent 91, into planned swarm courses of action or swarm mission plans that directly involve the $i^{th}$ force/tactical group in the swarm, wherein in accomplishing this decomposition, the $i^{th}$ MC SIMD agent 91 accesses swarm-distributed threat vectors (TV) database 83 of threats that are directly relevant (in terms of impact magnitude/urgency, threat category/type, and the causally interdependent battlespace situations forming the spatial/time sequence that constitutes the threat) to the $i^{th}$ force/tactical group, wherein a resulting decomposition is stored in the swarm-distributed mission plans (MP) database 79. In an exemplary game, each exemplary MC SIDM agent 91 seeks to maximize its utility function. An exemplary MC SIMD agent's 91 utility function quantifies relevancy of a HLMO to the agent's force/tactical group. Relevance of a HLMO to a MC SIMD agent 91 derives from self-interest of a given MC SIMD agent's 91 force/tactical group. An extent to which a HLMO could be achieved by a given operational capability of the agent's force/tactical group, coupled with an extent to which the HLMO counters or neutralizes a threat(s) relevant to the group, determines relevancy of the HLMO to the MC SIMD agent 91. (in at least one embodiment, the exemplary MC SIDM agent 91 accesses threats in the Threat Vector Database 83) Because all MC SIMD agents 91 contribute to the swarm-distributed mission plans (MP) database 79, overall swarm mission planning is accomplished as an aggregation of self-interested mission planning efforts by each individual force/tactical group. When repeated play of a given MC SIMD agent 91 game converges upon equilibrium (e.g., Nash equilibrium) in which each MC SIMD agent's 91 utility function is optimized (e.g., a value of a given utility function is maximized), the MC SIMD agent 91 game play ceases. Each MC SIMD agent 91 in the cohort now knows which HLMO to decompose into a subset of lower-level actions of a given MP. A subset of a given MP (MP subset) comprises a set of MP actions that describe how a typical force/tactical group will function to implement an associated HLMO. Linking of all the MP subsets developed by all participating MC SIMD agents 91 (in accordance with the HLMO set) form a completed MP. An exemplary swarm's resources include its force/tactical groups that can different resources including different effectors, sensors, platforms, etc. A swarm level MP includes MP subsets describing deployment and activities of the swarm's participating force/tactical groups throughout mission execution. Except for special circumstances, a MP action typically will not specify which particular force/tactical group should execute a given action. A MP action will involve maneuver, positioning, posturing, sensing, and/or engagement activities of a force/tactical group. A swarm or completed MP can include an assembly or stitching together of all individual HLMO decompositions (e.g., decomposed user defined objectives that define an action (e.g., remove or move an identified element from a location) into many MP subsets that each define MP plan actions)) produced by the swarm's MC SIMD agents 91. These HLMO decompositions and the assembled MP are stored in the swarm-distributed MP database. To form the complete MP, the various HLMO decompositions are stitched together according to the ordering constraints and causal links of the original HLMOs FIG. 12B shows a continuation of the method shown in FIG. 12A. Step 307: Extracting planned swarm MP actions from the MP database 79, using integrated engagement control (IEC) agents 73 in the swarm of force/tactical groups that interact with each other. An exemplary cohort of IEC agents 73 operates across an entire CGS where each exemplary IEC agent 73 is hosted as a SIMD parallel process across one force tactical group of UxSs, participate in repeated play of a game to determine which IEC agent 73 decomposes which MP action stored in the swarm-distributed MP database. Step 309: Decomposing mission actions 141 at the game's equilibrium (e.g., Nash equilibrium) using the $i^{th}$ IEC agent into integrated engagement plans (stored in integrated engagement plans database 69) for the $i^{th}$ force/tactical group in the swarm, wherein in accomplishing this decomposition, the $i^{th}$ IEC agent 73 accesses the swarm-distributed situation vectors (SV) database 76 of situation data that are directly relevant (e.g., in terms of situation location, situation category/type, and the battlespace objects forming the situational relationships) to the $i^{th}$ force/tactical group, wherein this decomposition is stored in the group-distributed integrated engagement plans (IEP) database 69.

In one embodiment IEC's program's 73 game, each exemplary IEC agent 73 seeks to maximize its utility function. This exemplary IEC agent's 73 utility function quantifies relevancy of a MP action (drawn from MP Library 79 via decomposition of high level actions or objectives to a lower level action or mission plan as shown in FIGS. 6A and 6B) to the IEC agent's 73 force/tactical group. In at least one embodiment, relevancy of a given MP action to an IEC agent 73 derives from "self-interest" of the IEC agent's 73 force/tactical group. The extent to which a potentially selectable or candidate MP action stored in the MP Library 79 could be immediately achieved by an operational capability of the IEC agent's 73 force/tactical group (e.g., a particular sensor, equipment item or effector, etc on a given UxS or collection of UxS), coupled with an extent to which a given MP action addresses or responds to a timely situation(s) relevant to the group, determines the relevancy of the MP action to the IEC agent 73. (In various embodiments, an IEC agent 73 accesses situations (e.g., relationships between multiple objects in a given environment of interest or designated geographic or area) in the situation vector database 76). When a collection of SIMD IEC parallel processes collectively making up an IEC agent 73 engaging in parallel processing across UxS' in a given force tactical group engage in repeated play of an exemplary IEC agent game (see above) between different IEC agents 73 hosted by different force tactical groups converges upon equilibrium (e.g., Nash equilibrium) in which each IEC agent's 73 utility function is optimized, the game play ceases. Each IEC agent 73 in the cohort now knows which MP action to decompose into the lower-level actions of an integrated engagement plan (IEP). An integrated engagement plan describes how a single mission plan action is implemented by a specified force/tactical group of autonomous systems within the CGS. A tactical group of autonomous systems including integrated sensing, fires, and platform resources. The sensing and fires resources are platform mounted. The actions of an integrated engagement plan are specified for either suites of sensors, suites of weapons, or platforms. While a single mission plan action focuses on a specific undertaking by a typical tactical group, the corresponding integrated engagement plan describes in detail what the sensor suites, weapon suites, and platforms within a specified force/tactical group do to execute this undertaking. A force/tactical group's resources are its sensor suites. weapon suites, and platforms on which are mounted these suites. An integrated engagement plan (IEP) describes the deployment and activities of the sensing suites, fires suites, and platforms within a single force/tactical group throughout the execution of a single MP action. In at least one embodiment, an IEP action can be one of three possible action types: sensing action which addresses a sensor suite aboard a single UxS within the specified force/tactical group; fires action which addresses a weapon suite aboard a single UxS within the specified force/tactical group; a platform action which addresses a single UxS platform within the specified force/tactical group. An exemplary MP decomposition library, the reference resource used by IEC agents in constructing IEPs, supports MP action decomposition into IEPs including of these three action types. Except for special circumstances, an IEP action typically will not specify which particular sensor suite, weapon suite, or platform within the specified force/tactical group should execute the IEP action. Within the IEP, several simultaneous actions will coordinate sensing, fires, and platform control among multiple sensor suites, weapon suites, and platforms within the group.

Continuing in FIG. 12B, Step 311*b*: Weapon control (WC) agents in a single force/tactical group of UxSs interact with each other to extract planned group integrated engagement actions from the IEP database, which is a distributed database accessible to all sensor, weapon, and platform control agents (SC, WC, and PC agents) within the force/tactical group. This interaction takes the form of a game in which the WC agents are the players. A cohort of WC agents operate each force/tactical group. Each WC agent is hosted by one UxS within the group and participates in repeated play of a game to determine which WC agent decomposes which IEP fires action stored in the group-distributed integrated engagement plans (IEP) database. Step 311*c*: Platform control (PC) agents in a single force/tactical group of UxSs interact with each other to extract planned group integrated engagement actions from the IEP database, which is a distributed database accessible to all sensor, weapon, and platform control agents (SC, WC, and PC agents) within the force/tactical group. This interaction takes the form of a game in which the PC agents are the players. A cohort of PC agents is disposed aboard a single force/tactical group, wherein each PC agent is hosted by one UxS within the group, and participate in repeated play of a game (described above) to determine which PC agent decomposes which IEP platform action stored in the group-distributed integrated engagement plans (IEP) database.

Figure 12C:
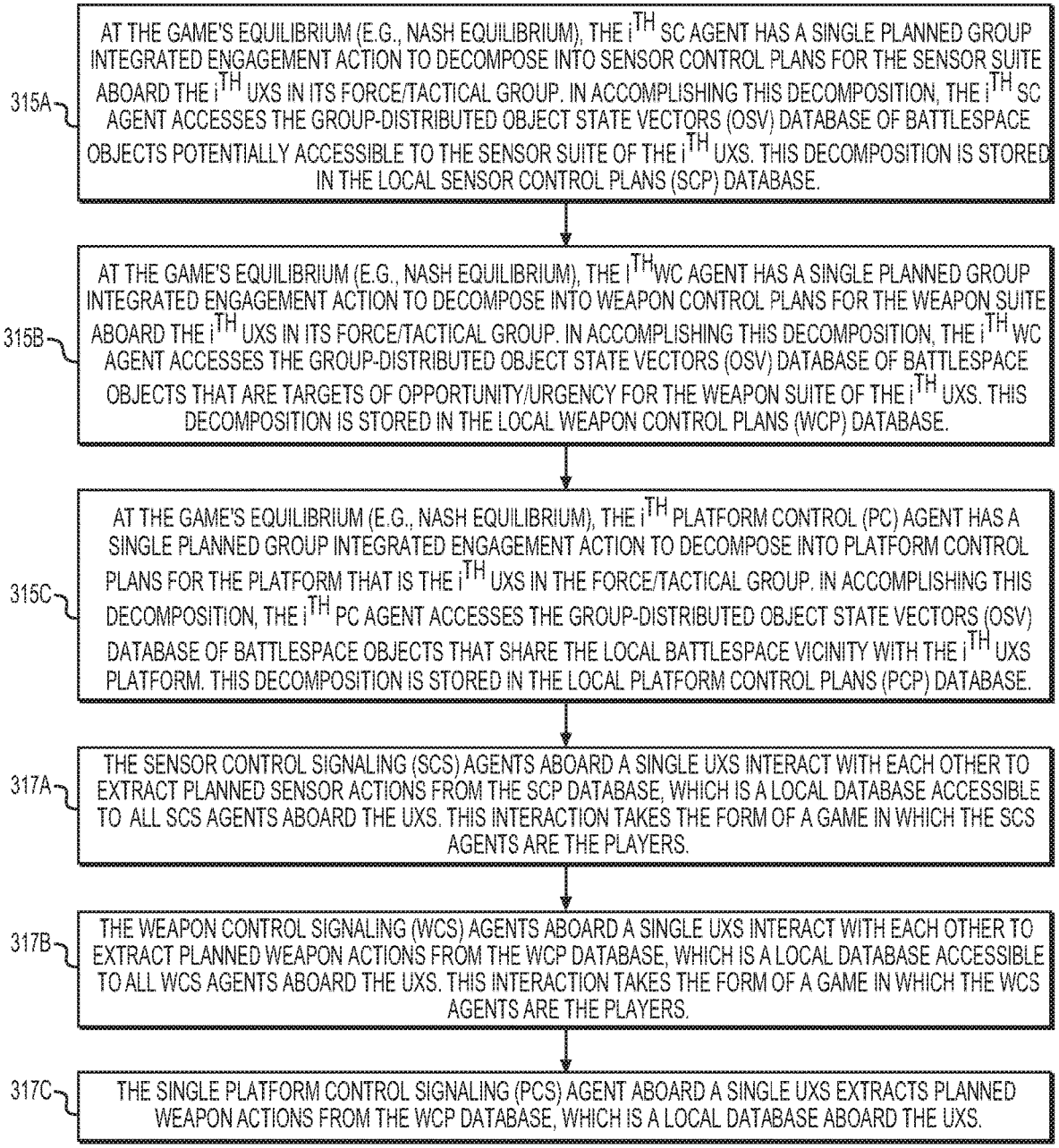

FIG. 12C shows a continuation of the FIGS. 12A and 12B method. Step 315*a*: At the game's equilibrium (e.g., Nash equilibrium), the $i^{th}$ SC agent has a single planned group integrated engagement action to decompose into sensor control plans for the sensor suite aboard the $i^{th}$ UxS in its force/tactical group. In accomplishing this decomposition, the $i^{th}$ SC agent accesses the group-distributed object state vectors (OSV) database of battlespace objects potentially accessible to the sensor suite of the $i^{th}$ UxS. This decomposition is stored in the local sensor control plans (SCP) database. In an exemplary SC agent game, each SC agent seeks to maximize its utility function. The exemplary SC agent's utility function quantifies relevancy of an IEP sensing action to information associated with the agent's UxS (e.g., sensor type/capability associated with a given UxS, location of UxS with respect to a target for sensor operation, weather conditions impacting the sensor's ability to function, undesirability of detection by a particular sensor type, e.g., active emitter that can be detected by surveillance systems, ability of a given sensor to produce needed outputs under a given set of conditions, etc). Relevancy of an IEP sensing action to a SC agent derives from the self-interest of the agent's UxS. The extent to which an IEP sensing action could be immediately achieved by the sensing capability of the SC agent's UxS, coupled with the extent to which the IEP sensing action focuses upon an object state(s) relevant to the agent's UxS, determines the relevancy of the IEP sensing action to the SC agent. (The SC agent accesses object states in the object state vector database.) When a repeated play of the game converges upon equilibrium (e.g., Nash equilibrium) in which each SC agent's utility function is optimized, the game play ceases. Each SC agent in the cohort now knows which IEP sensing action to decompose into the lower-level actions of a sensor control plan (SCP). A sensor control plan describes how a single integrated engagement plan sensing action is implemented by a specified UxS within the force/tactical group to which the IEP applies. A UxS hosts a platform-mounted sensor suite. While a single IEP sensing action focuses on a specific undertaking by a typical sensor suite, the corresponding sensor control plan describes in detail what the sensors aboard a specified UxS do to execute this undertaking. A UxS's sensing resources are its individual sensors. A SCP provides spatial locations requiring sensing (angular coordinates and range), sensing spectral requirements, and timing of activation states for the sensors aboard a single UxS throughout execution of a single IEP sensing action. Except for special circumstances, a SCP action typically will not specify which specific sensor aboard the UxS should execute the SCP action. Within the SCP, several simultaneous actions will coordinate sensing among multiple sensors aboard the single UxS.

Referring back to FIG. 12C, Step 315$b$: At the game's equilibrium (e.g., Nash equilibrium), the $i^{th}$ WC agent has a single planned group integrated engagement action to decompose into weapon control plans for the weapon suite aboard the $i^{th}$ UxS in its force/tactical group. In accomplishing this decomposition, the $i^{th}$ WC agent accesses the group-distributed object state vectors (OSV) database of battlespace objects that are targets of opportunity/urgency for the weapon suite of the $i^{th}$ UxS. This decomposition is stored in the local weapon control plans (WCP) database. In an exemplary WC agent game, each WC agent seeks to maximize its utility function. An exemplary WC agent's utility function quantifies relevancy of an IEP fires action to the agent's UxS. The relevancy of an IEP fires action to a WC agent derives from the self-interest of the agent's UxS. The extent to which an IEP fires action could be immediately achieved by the fires capability of the WC agent's UxS, coupled with the extent to which the IEP fires action addresses and engages an object state(s) relevant to the agent's UxS, determines the relevancy of the IEP fires action to the WC agent. (The WC agent accesses object states in the object state vector database).

At Step 315$c$: At the game's equilibrium (e.g., Nash equilibrium), the $i^{th}$ platform control (PC) agent has a single planned group integrated engagement action to decompose into platform control plans for the platform that is the $i^{th}$ UxS in the force/tactical group. In accomplishing this decomposition, the $i^{th}$ PC agent accesses the group-distributed object state vectors (OSV) database of battlespace objects that share the local battlespace vicinity with the i UxS platform. This decomposition is stored in the local platform control plans (PCP) database. In an exemplary PC agent game, each PC agent seeks to maximize its utility function. The PC agent's utility function quantifies the relevancy of an IEP platform action to the agent's UxS. The relevancy of an IEP platform action to a PC agent derives from the self-interest of the agent's UxS. The extent to which an IEP platform action could be immediately achieved by the maneuvering capability of the PC agent's UxS, coupled with the extent to which the IEP platform action relates to an object state(s) local to the agent's UxS, determines the relevancy of the IEP platform action to the PC agent. (The PC agent accesses object states in the object state vector database.) When the repeated play of the game converges upon equilibrium (e.g., Nash equilibrium) in which each PC agent's utility function is optimized, the game play ceases. Each PC agent in the cohort now knows which IEP platform action to decompose into the lower-level actions of a platform control plan (PCP). A platform control plan describes how a single integrated engagement plan platform action is implemented by a specified UxS within the force/tactical group to which the IEP applies. A UxS includes a single platform (on which are mounted the UxS sensor and weapon suites). While a single IEP platform action focuses on a specific undertaking by a typical UxS platform, the corresponding platform control plan describes in detail what a specified UxS platform does to execute this undertaking. A UxS's platform resource is the physical mechanism by which the UxS maneuvers within the battlespace. A platform control plan provides the battlespace locations requiring occupation (lat/long or MGRS coordinates and orientation) and the timing of positioning and posture of a single UxS platform throughout execution of a single IEP platform action.

Step 317$a$: The sensor control signaling (SCS) agents aboard a single UxS interact with each other to extract planned sensor actions from the SCP database, which is a local database accessible to all SCS agents aboard the UxS. This interaction takes the form of a game in which the SCS agents are the players. An exemplary cohort of sensor control signaling (SCS) agents is provided aboard a single UxS where each SCS agent is exclusively associated with one physical sensor mounted on the UxS platform, participate in repeated play of a game to determine which SCS agent decomposes which SCP action into sequenced servo/actuator control signals for the agent's associated physical sensor. The SCP actions are stored in the local sensor control plans (SCP) database aboard the UxS.

Step 317$b$: The weapon control signaling (WCS) agents aboard a single UxS interact with each other to extract planned weapon actions from the WCP database, which is a local database accessible to all WCS agents aboard the UxS. This interaction takes the form of a game in which the WCS agents are the players. An exemplary cohort of weapon control signaling (WCS) agents is provided aboard a single UxS. Each exemplary WCS agent is exclusively associated with one physical weapon mounted on the UxS platform, participate in repeated play of a game to determine which WCS agent decomposes which WCP action into sequenced servo/actuator control signals for the agent's associated physical weapon. The WCP actions are stored in the local weapon control plans (WCP) database aboard the UxS.

Step 317$c$: The single platform control signaling (PCS) agent aboard a single UxS extracts planned weapon actions from the WCP database, which is a local database aboard the UxS. An exemplary single platform control signaling (PCS) agent aboard a single UxS, exclusively associated with the UxS platform, decomposes each PCP action into sequenced servo/actuator control signals for the agent's UxS platform. The PCP actions are stored in the local platform control plans (PCP) database aboard the UxS.

Figure 12D:
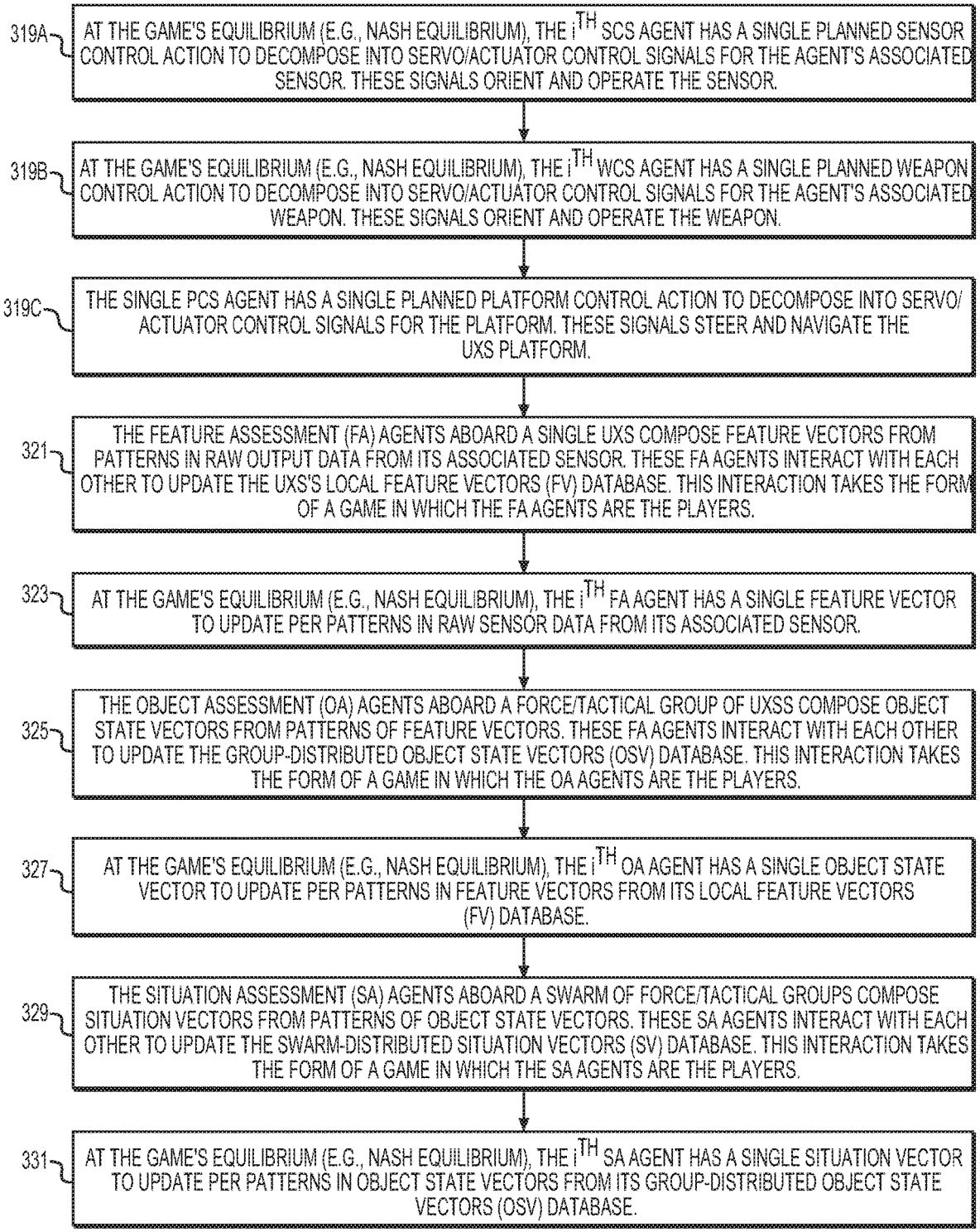

FIG. 12D shows a continuation of the method shown in FIGS. 12A-12C. Step 319$a$: At the game's equilibrium (e.g., Nash equilibrium), the $i^{th}$ SCS agent has a single planned sensor control action to decompose into servo/actuator control signals for the agent's associated sensor. These signals orient and operate the sensor. In an exemplary SCS agent game, each SCS agent seeks to maximize its utility function. The SCS agent's utility function quantifies the relevancy of a SCP action to the agent's physical sensor. Exemplary relevancy of a SCP action to a SCS agent derives from the self-interest of the agent's physical sensor. The extent to which a SCP action could be immediately achieved by the agent's sensor determines the relevancy of the SCP action to the agent. Each SCS agent generates sequenced servo/actuator control signals for its own sensor, which the agent outputs to the sensor. When the repeated play of the game converges upon equilibrium (e.g., Nash equilibrium) in which each SCS agent's utility function is optimized, the game play ceases. Each SCS agent in the cohort now knows which SCP action to decompose into sequenced servo/actuator control signals to orient and operate its own sensor. While a single SCP action focuses on a specific undertaking by a typical sensor aboard the UxS, the corresponding servo/actuator control signals guide a specific sensor to execute this undertaking. Step 319b: At the game's equilibrium (e.g., Nash equilibrium), the î'th WCS agent has a single planned weapon control action to decompose into servo/actuator control signals for the agent's associated weapon. These signals orient and operate the weapon (or effector). In the WCS agent game, each WCS agent seeks to maximize its utility function. The WCS agent's utility function quantifies the relevancy of a WCP action to the agent's physical weapon. The relevancy of a WCP action to a WCS agent derives from the self-interest of the agent's physical weapon. The extent to which a WCP action could be immediately achieved by the agent's weapon determines the relevancy of the WCP action to the agent. Each WCS agent generates sequenced servo/actuator control signals for its own weapon, which the agent outputs to the weapon. When the repeated play of the game converges upon equilibrium (e.g., Nash equilibrium) in which each WCS agent's utility function is optimized, the game play ceases. Each WCS agent in the cohort now knows which WCP action to decompose into sequenced servo/actuator control signals to orient and operate its own weapon. While a single WCP action focuses on a specific undertaking by a typical weapon aboard the UxS, the corresponding servo/actuator control signals guide a specific weapon to execute this undertaking. Step 319c: The single PCS agent has a single planned platform control action to decompose into servo/actuator control signals for the platform. These signals steer and navigate the UxS platform. A single PCS agent decomposes each PCP action into sequenced servo/actuator control signals to steer and navigate its physical platform. While a single PCP action describes a specific undertaking by the UxS platform, the corresponding servo/actuator control signals guide the platform to execute this undertaking. Step 321: The feature assessment (FA) agents aboard a single UxS compose feature vectors from patterns in raw output data from its associated sensor. These FA agents interact with each other to update the UxS's local feature vectors (FV) database. This interaction takes the form of a game in which the FA agents are the players. The cohort of FA agents aboard a single UxS, each exclusively associated with a single sensor aboard the UxS, participate in repeated play of a game to determine which FA agent updates which feature vector (FV) stored in the local UxS FV database. This game discussed above. In the exemplary FA agent game, each FA agent seeks to maximize its utility function. The FA agent's utility function quantifies the relevancy of a FV to the agent. The relevancy of a FV to a FA agent primarily derives from the unique pixel data output of the agent's sensor. The extent to which the unique pixel data of the agent's sensor are likely to improve a FV, determines the relevancy of the FV to the agent. Step 323: At the game's equilibrium (e.g., Nash equilibrium), the î'th FA agent has a single feature vector to update per patterns in raw sensor data from its associated sensor. When repeated play of a FA agent game converges upon equilibrium (e.g., Nash equilibrium) in which each FA agent's utility function is optimized, the game play ceases. Each FA agent in the cohort now knows which FV to update. A FA agent identifies or recognizes patterns in the unique pixel output of its associated sensor, and uses these patterns to update the agent's selected FV. Step 325: The object assessment (OA) agents aboard a force/tactical group of UxSs compose object state vectors from patterns of feature vectors. These FA agents interact with each other to update the group-distributed object state vectors (OSV) database. This interaction takes the form of a game in which the OA agents are the players. The exemplary cohort of object assessment (OA) agents aboard a single force tactical group of UxSs, each hosted by one UxS, participate in repeated play of a game to determine which OA agent updates which object state vector (OSV) stored in the group-distributed OSV database. An example of this game is discussed above. In the exemplary OA agent game, each OA agent seeks to maximize its utility function. The OA agent's utility function quantifies the relevancy of an OSV to the agent. The relevancy of a OSV to an OA agent primarily derives from the unique feature vector data available to the OA agent. The extent to which the unique feature vector data available to the OA agent are likely to improve an OSV, determines the relevancy of the OSV to the OA agent. Step 327: At the game's equilibrium (e.g., Nash equilibrium), the $i^{th}$ OA agent has a single object state vector to update per patterns in feature vectors from its local feature vectors (FV) database. When the repeated play of the OA agent game converges upon equilibrium (e.g., Nash equilibrium) in which each OA agent's utility function is optimized, the game play ceases. Each OA agent in the cohort now knows which OSV to update. An OA agent identifies or recognizes patterns in the unique FV data in the local UxS FV database, and uses these patterns to update the agent's selected OSV. Step 329: The situation assessment (SA) agents aboard a swarm of force/tactical groups compose situation vectors from patterns of object state vectors. These SA agents interact with each other to update the swarm-distributed situation vectors (SV) database. This interaction takes the form of a game in which the SA agents are the players. The cohort of situation assessment (SA) agents aboard the entire CGS, each hosted by one force/tactical group of UxSs, participate in repeated play of a game to determine which SA agent updates which situation vector (SV) stored in the swarm-distributed SV database. An example of this game is discussed above. In the SA agent game, each SA agent seeks to maximize its utility function. The SA agent's utility function quantifies the relevancy of a SV to the agent. The relevancy of a SV to an OA agent primarily derives from the unique object state vector data available to the SA agent. The extent to which the unique object state vector data available to the SA agent are likely to improve a SV, determines the relevancy of the SV to the SA agent. Step 331: At the game's equilibrium (e.g., Nash equilibrium), the î'th SA agent has a single situation vector to update per patterns in object state vectors from its group-distributed object state vectors (OSV) database. When the repeated play of the SA agent game converges upon equilibrium (e.g., Nash equilibrium) in which each SA agent's utility function is optimized, the game play ceases. Each SA agent in the cohort now knows which SV to update. A SA agent identifies or recognizes patterns in the unique OSV data in the force/tactical group distributed OSV database, and uses these patterns to update the agent's selected SV.

Figure 12E:
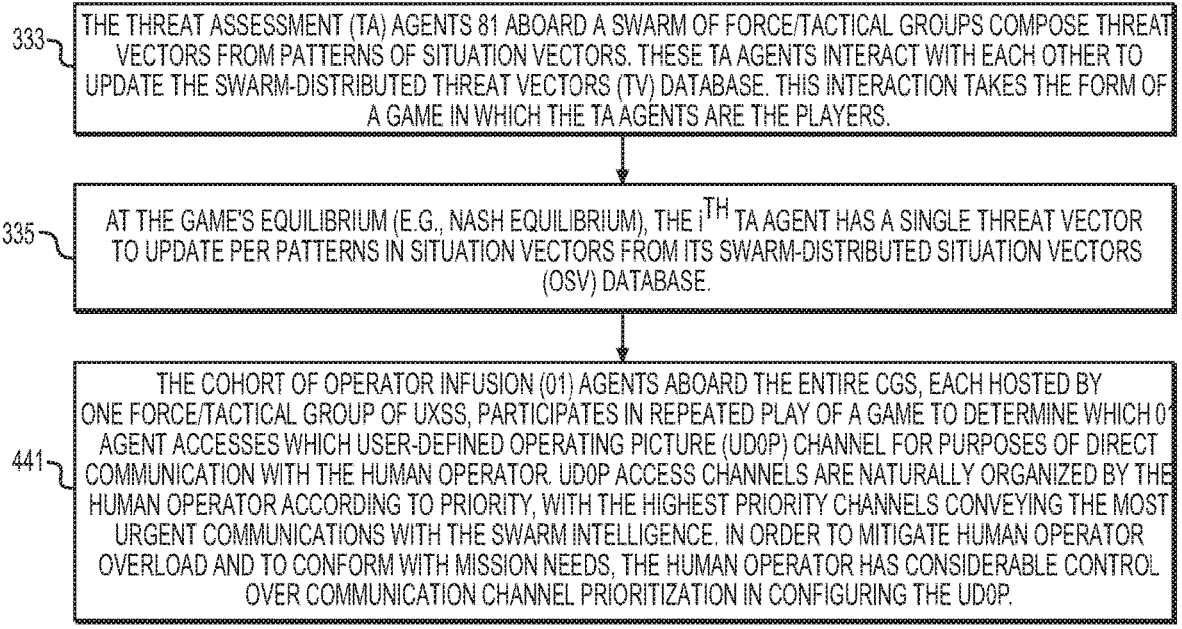

FIG. 12E shows a continuation of the method shown in FIGS. 12A-12D. Step 333: The threat assessment (TA) agents 81 aboard a swarm of force/tactical groups compose threat vectors from patterns of situation vectors. These TA agents interact with each other to update the swarm-distributed threat vectors (TV) database. This interaction takes the form of a game in which the TA agents are the players. An exemplary cohort of threat assessment (TA) agents aboard the entire CGS, each hosted by one force/tactical group of UxSs, participate in repeated play of a game to determine which TA agent updates which threat vector (TV) stored in the swarm-distributed TV database. An example of this game is discussed above. In the TA agent game, each TA agent seeks to maximize its utility function. The TA agent's utility function quantifies the relevancy of a TV to the agent. The relevancy of a TV to a TA agent derives from the self-interest of the agent's force/tactical group. The relevancy of a TV to a TA agent does not derive from any unique data available to the agent, for all TA agents enjoy equal access to the swarm-distributed SV database. The extent to which a threat challenges the operational capability of the TA agent's force/tactical group, determines the relevancy of the TV to the TA agent. Step 335: At the game's equilibrium (e.g., Nash equilibrium), the $i^{th}$ TA agent has a single threat vector to update per patterns in situation vectors from its swarm-distributed situation vectors (OSV) database. When repeated play of the TA agent game converges upon equilibrium (e.g., Nash equilibrium) in which each TA agent's utility function is optimized, the game play ceases. Each TA agent in the cohort now knows which TV to update. A TA agent identifies or recognizes patterns in the SV data in the swarm distributed SV database, and uses these patterns to update the agent's selected TV. Step 441: The cohort of operator infusion (OI) agents aboard the entire CGS, each hosted by one force/tactical group of UxSs, participates in repeated play of a game to determine which OI agent accesses which user-defined operating picture (UDOP) channel for purposes of direct communication with the human operator. UDOP access channels are naturally organized by the human operator according to priority, with the highest priority channels conveying the most urgent communications with the swarm intelligence. In order to mitigate human operator overload and to conform with mission needs, the human operator has considerable control over communication channel prioritization in configuring the UDOP. Each exemplary OI Agent has five functionalities: Access the swarm-distributed threat vector (TV) database, analyze threat vectors formulated/updated by the force/tactical group's threat assessment (TA) agent, and prepare graphical/textual/aural presentations of these impacts/threats to the human operator. Receive active advice-seeking situational queries from the force/tactical group's situation assessment (SA) agent, and prepare graphical/textual/aural presentations of this query intended for the human operator. The OI agent will subsequently receive the human operator's response/preference with respect to this situational query. The OI agent will relay the operator's response/preference back to the SA agent. Receive active advice-seeking threat queries from the force/tactical group's threat assessment (TA) agent, and prepare graphical/textual/aural presentations of this query intended for the human operator. The OI agent will subsequently receive the human operator's response/preference with respect to this threat query. The OI agent will relay the operator's response/preference back to the TA agent. Receive active advice-seeking mission planning queries from the force/tactical group's mission control (MC) agent, and prepare graphical/textual/aural presentations of this query intended for the human operator. The OI agent will subsequently receive the human operator's response/preference with respect to this mission planning query. The OI agent will relay the operator's response/preference back to the MC agent. Receive active advice-seeking integrated engagement planning queries from the force/tactical group's integrated engagement control (IEC) agent, and prepare graphical/textual/aural presentations of this query intended for the human operator. The OI agent will subsequently receive the human operator's response/preference with respect to this integrated engagement planning query. The OI agent will relay the operator's response/preference back to the IEC agent. In the OI agent game, each OI agent seeks to maximize its utility function. The OI agent's utility function quantifies the relevancy of a UDOP access channel to the agent. The relevancy of a UDOP access channel to an OI agent primarily derives from the agent's urgency for communication with the human operator. For threat vectors and active advice-seeking queries that substantially impact the immediate continued operational capability of the OI agent's force/tactical group, a high-priority channel is highly relevant. For less urgent threat vectors and queries, the OI agent's utility is optimized by selection of a lower-priority UDOP channel. When the repeated play of the OI agent game converges upon equilibrium (e.g., Nash equilibrium) in which each OI agent's utility function is optimized, the game play ceases. Each OI agent in the cohort now knows which UDOP access channel to utilize for the agent's immediate human operator communication needs.

Although the invention has been described in detail with reference to certain preferred embodiments, variations and modifications exist within the spirit and scope of the invention as described and defined in the following claims.

The invention claimed is:
1. A complex adaptive command guided swarm system comprising:
 a first command and control section comprising a user interface, a computer system, a network interface, and a plurality of command and control systems executable on the computer system; and
 a plurality of networked swarm of semi-autonomously agent controlled system of systems platforms (SAASoSPs), each of the plurality of SAASoSPs comprising:
 a second command and control section;
 one or more sensors;
 a network communication section configured to communicate with at least the first command and control section and one or more other SAASoSPs of the plurality of SAASoSPs; and
 one or more equipment systems configured to create a physical effect on an object or an environment external to the SAASoSP;
 wherein the second command and control section includes:
 at least one information fusion agent configured to mine and process information that originates in the environment external to the SAASoSP, the information including features including patterns recognized within a set of pixel vectors, objects including patterns recognized within a set of feature vectors, situations including patterns recognized within a set of object state vectors, and impacts or threats including patterns recognized within a set of situation vectors;

at least one control diffusion agent configured to generate control actions based, in part, on the information collected and processed by the at least one information fusion agent and disseminate the control actions within the SAASoSP; and at least one operator infusion agent configured to receive a range of operator inputs via the first command and control section including at least a range of high level mission objective data;

wherein the second control and command system is configured to operate using active advice-seeking learning logic using a combination of active learning and advice-seeking learning, wherein each SAASoSP of the plurality of SAASoSPs is configured to solicit or query for advice from a human operator via the first control and command system during either training of the complex adaptive command guided swarm system or execution of a mission, including configuration to receive input of advice from the human operator concerning one or more complex domains of interest and/or concerning broad characterizations of entire regions of one or more data input spaces.

2. The complex adaptive command guided swarm system of claim 1, wherein the at least one information fusion agent includes a combination of symbolic machine learning (ML) and probabilistic ML configured for data mining and pattern recognition.

3. The complex adaptive command guided swarm system of claim 2, wherein the combination of symbolic machine learning (ML) and probabilistic ML further includes a combination of Bayesian graphical models with first-order logic.

4. The complex adaptive command guided swarm system of claim 1, wherein the plurality of SAASoSPs are configured to share multiple memories or data stores in a distributed database among the plurality of SAASoSPs using respective parallel processing units, wherein the distributed database includes a plurality of storage devices that are not all attached to a common processor.

5. The complex adaptive command guided swarm system of claim 1, wherein the network communication section is further configured to interact using at least one single instruction, multiple data (SIMD) processing agent across one or more of the plurality of SAASoSPs.

6. The complex adaptive command guided swarm system of claim 1, wherein the at least one information fusion agent is configured to utilize at least one SIMD processing agent to determine a threat or impact assessment based, in part, on the mined and processed information.

7. The complex adaptive command guided swarm system of claim 1, wherein the at least one information fusion agent or at least one control diffusion agent is configured to use statistical relational learning (SRL).

8. The complex adaptive command guided swarm system of claim 1, wherein the SRL includes use of a Markov Logic Network (MLN).

9. The complex adaptive command guided swarm system of claim 1, wherein each SAASoSP includes one or more movement and propulsion systems.

10. The complex adaptive command guided swarm system of claim 9, wherein the movement and propulsion systems includes one or more of wings, a quadcopter, a mobile floating platform, an underwater movement platform, or a space movement platform.

11. The complex adaptive command guided swarm system of claim 1, wherein the one or more equipment systems include one more of a weapon, an actuator, a gripper, a laser, a projectile firing system, a capture system, a drilling system, mining equipment, a measuring system, a sensor, or a material handling system.

12. The complex adaptive command guided swarm system of claim 1, wherein the active advice-seeking learning logic includes statistical relational learning (SRL).

13. The complex adaptive command guided swarm system of claim 1, wherein second control and command system is further configured to received multiple input information and respond to the multiple input information.

14. The complex adaptive command guided swarm system of claim 13, wherein the response by the second control and command system to the multiple input information includes responding to broad characterization by the human operator concerning entire regions of input space by targeting the entire regions of input space using the active advice-seeking learning logic.

15. A method of operating a complex adaptive command guided swarm system comprising:

supplying a first command and control section comprising a user interface, a computer system, a network interface, and a plurality of command and control systems executable on the computer system; and supplying a plurality of networked swarm of semi-autonomously agent controlled system of systems platforms (SAASoSPs), each of the plurality of SAASoSPs comprising:

a second command and control section;

one or more sensors;

a network communication section configured to communicate with at least the first command and control section and one or more other SAASoSPs of the plurality of SAASoSPs; and one or more equipment systems configured to create a physical effect on an object or an environment external to the SAASoSP;

wherein the second command and control section is configured to implement:

at least one information fusion agent configured to mine and process information that originates in the environment external to the SAASoSP, the information including features including patterns recognized within a set of pixel vectors, objects including patterns recognized within a set of feature vectors, situations including patterns recognized within a set of object state vectors, and impacts or threats including patterns recognized within a set of situation vectors;

at least one control diffusion agent configured to generate control actions based, in part, on the information collected and processed by the at least one information fusion agent and disseminate the control actions within the SAASoSP; and at least one operator infusion agent configured to receive a range of operator inputs via the first command and control section including at least a range of high level mission objective data;

wherein the second control and command system is configured to operate using active advice-seeking learning logic using a combination of active learning and advice-seeking learning, wherein each SAASoSP of the plurality of SAASoSPs is configured to solicit or query for advice from a human operator via the first control and command system during either training of the complex adaptive command guided swarm system or execution of a mission, including configuration to receive input of advice from the human operator concerning one or more complex domains of interest and/or concerning broad characterizations of entire regions of one or more data input spaces.

16. The method of claim 15, wherein the at least one information fusion agent implements a combination of symbolic machine learning (ML) and probabilistic ML configured for data mining and pattern recognition.

17. The method of claim 16, wherein the combination of symbolic machine learning (ML) and probabilistic ML further includes a combination of Bayesian graphical models with first-order logic.

18. The method of claim 15, wherein the second control and command system is further configured to receive multiple input information and respond to the multiple input information.

* * * * *